(12) United States Patent
Pilcher

(10) Patent No.: US 10,234,077 B1
(45) Date of Patent: Mar. 19, 2019

(54) LIQUID EVACUATION SYSTEM

(71) Applicant: Nick Allen Pilcher, Perryton, TX (US)

(72) Inventor: Nick Allen Pilcher, Perryton, TX (US)

( * ) Notice: Subject to any disclaimer, the term of this patent is extended or adjusted under 35 U.S.C. 154(b) by 221 days.

(21) Appl. No.: 15/269,681

(22) Filed: Sep. 19, 2016

Related U.S. Application Data

(60) Provisional application No. 62/220,461, filed on Sep. 18, 2015, provisional application No. 62/220,387, filed on Sep. 18, 2015, provisional application No. 62/220,559, filed on Sep. 18, 2015, provisional application No. 62/220,755, filed on Sep. 18, 2015, provisional application No. 62/220,763, filed on Sep. 18, 2015, provisional application No. 62/220,769, filed on Sep. 18, 2015.

(51) Int. Cl.
*F17D 3/01* (2006.01)
*F16T 1/38* (2006.01)
*F17D 1/07* (2006.01)

(52) U.S. Cl.
CPC .............. *F17D 3/01* (2013.01); *F16T 1/38* (2013.01); *F17D 1/07* (2013.01)

(58) Field of Classification Search
CPC .............. F17D 1/07; F17D 3/01; F16T 1/38
See application file for complete search history.

(56) References Cited

U.S. PATENT DOCUMENTS

| | | | |
|---|---|---|---|
| 2,895,305 A | 7/1959 | Reed | |
| 3,203,351 A | 8/1965 | Gillis | |
| 3,396,793 A | 8/1968 | Piper et al. | |
| 3,678,997 A | 7/1972 | Barchard | |
| 6,629,566 B2 * | 10/2003 | Liknes | E21B 43/122 166/325 |
| 7,231,945 B2 * | 6/2007 | King | G01N 3/12 141/83 |
| 7,555,935 B2 * | 7/2009 | Baillargeon | B67D 7/3209 73/40 |
| 7,784,548 B2 * | 8/2010 | Wilson | E21B 43/38 166/370 |
| 8,528,648 B2 | 9/2013 | Zupanick | |

(Continued)

FOREIGN PATENT DOCUMENTS

| | | |
|---|---|---|
| GB | 907607 | 10/1962 |
| JP | 2006348814 | 12/2006 |

*Primary Examiner* — Timothy L Maust
(74) *Attorney, Agent, or Firm* — James F. Lea, III; Gable Gotwals

(57) ABSTRACT

A system for automatically evacuating liquids from natural gas pipelines. An embodiment may be used for associated drip vessels and other containers and gas wells. The system includes a tank, a compressor, and an electric generator system. The system evacuates liquid from a pipeline by creating a pressure differential between the pipeline and the tank. When adequate pressure differential is achieved, liquids flow into the tank from the pipeline. When liquids are removed, the system shuts down and awaits a run signal. The system is suited for remote locations, due, in part, to the use of an automatic generator capable of providing power to the compressor and to the CPU as necessary. Liquid removal may be determined by measuring tank pressure at time intervals and determining a rate of change of tank pressure for indicating blow through. The system utilizes the same pipeline tap for liquid removal and gas injection.

9 Claims, 30 Drawing Sheets

(56) References Cited

U.S. PATENT DOCUMENTS

| | | | |
|---|---|---|---|
| 2004/0163726 A1* | 8/2004 | Nanaji | B65D 90/28 |
| | | | 141/67 |
| 2008/0289720 A1* | 11/2008 | Takano | F17C 5/007 |
| | | | 141/82 |
| 2016/0230519 A1* | 8/2016 | Leniek, Sr. | E21B 43/122 |

* cited by examiner

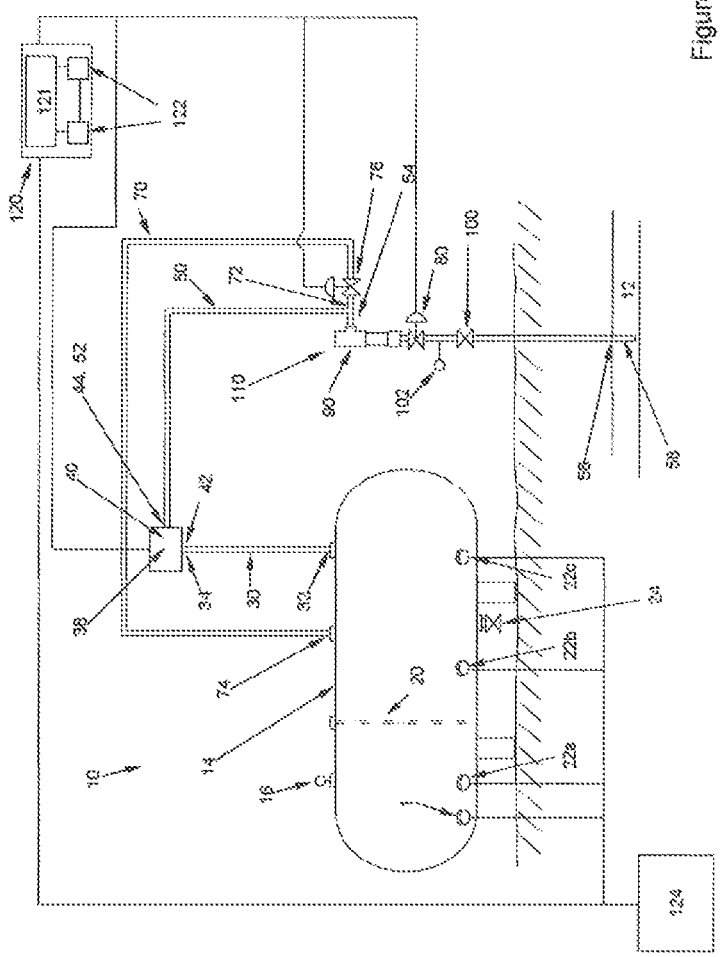

Basic ALES

Figure 4
Tank Pressure Rate of Change Profile For 500 Gallon Tank
Short Time Interval K Values for Counter Registers V2022 and V3004
500 Gallon Tank

| Gallons of Liquid in Tank | Gallons of Gas in Tank | Tank Liquid Level in Pct. | Tank Liquid Depth in Inches | Largest Working K Value with 1 Sample | Largest Working K Value with 2 Samples | Largest Working K Value with 3 Samples | Largest Working K Value with 4 Samples | Largest Working K Value with 5 Samples | Largest Working K Value with 6 Samples | Largest Working K Value with 7 Samples | Largest Working K Value with 8 Samples |
|---|---|---|---|---|---|---|---|---|---|---|---|
| | | 0% | 0 in. | 2 | 2 | 2 | 2 | 2 | 1 | 1 | None |
| | | 10% | 2.5 in. | 3 | 2 | 2 | 2 | 2 | 2 | None | None |
| | | 25% | 7.5 in. | 3 | 3 | 2 | 2 | 2 | None | None | None |
| | | 50% | 13.5 in. | 5 | 4 | 4 | None | None | None | None | None |
| | | 75% | 19.5 in. | 8 | 2 | None | None | None | None | None | None |
| | | N/A | 22.0 in. | 8 | None | None | None | None | None | None | None |
| | | 100% | 25.5 in. | None | | | | | | | |
| | | Hi Lvl. SD. | 28.7 in. | | | | | | | | |

These are the numbers written to register V2022 and they are the "number of .1 psi change per second in the Tank Pressure". The 8 means .8 psi rise in Tank Pressure per second. The 4 means .4 psi rise in Tank Pressure per second.

These are the numbers written to register V3004 and they are the "number of 3 second time periods required in the rate of change permissive calculation for each particular tank liquid level". That means if the value is 6, then six 3 second time periods are required, or 18 seconds for the permissive.

Tank Pressure Rate of Change With Liquid Flowing

Test conducted with water. Less dense fluids such as condensate / liquid hydrocarbons will result in greater Tank Pressure Rate Of Change levels than the water tested.

| 500 Gallon Tank | | |
|---|---|---|
| Tank Level in Percent | Tank Level in Inches | Tank Pressure Rate of Change in PSI per Minute |
| 0 | 0 | .4 PSI per Minute |
| 50 | 14 | .6 PSI per Minute |
| 75 | 20 | .8 PSI per Minute |

| 1000 Gallon Tank | | |
|---|---|---|
| Tank Level in Percent | Tank Level in Inches | Tank Pressure Rate of Change in PSI per Minute |
| 0 | | |
| 50 | | |
| 75 | | |

Figure 5

ALES Vapor Prevention Unit

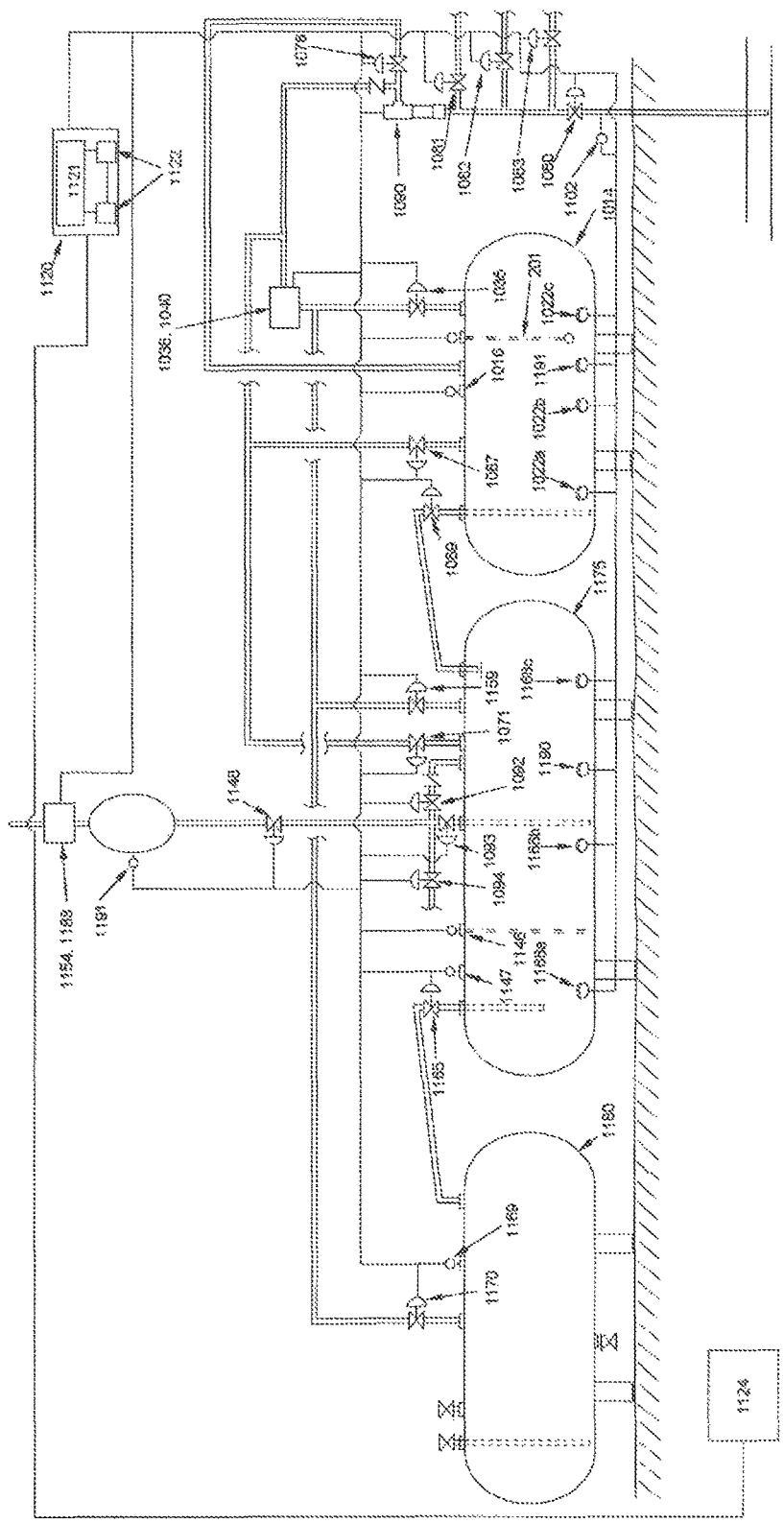

ALES Vapor Prevention Unit Component List

1014 Tank, 250 or 500 gallon
1016 Tank pressure transducer
1018 ALES tank temperature sensor
1022 ALES tank heating elements
1024 ALES tank manual drain line
1030 Tank evacuation line 1 (comp. suct. line)
1032 Tank evacuation line 1 (first end)
1033 Tank evacuation line 1 intermediate juncture
1034 Tank evacuation line 1 (second end)
1035 ALES tank evacuatin valve
1038 Electric motor to power compressor
1040 Compressor
1042 Compressor intake
1044 Compressor discharge
1050 Flow passageway 1
1052 Flow passageway 1 upper end
1054 Flow passageway 1 intermediate juncture 2
1056 Flow passageway 1 lower end
1060 Flow passageway 1 intermediate juncture 1
1061 Flow passageway 2 upper end
1062 Flow 2 passageway
1063 Flow passageway 2 intermediate juncture
1064 Flow passageway 3 upper end
1065 Flow passageway 3
1066 Flow passageway 3 lower end
1067 ALES tank discharge valve
1068 Tank evacuation line 2 (first end)
1069 Flow passageway lower end
1070 Liquid flow line 1
1071 Aging tank discharge valve
1072 Liquid flow line 1 input end
1074 Liquid flow line 1 output end
1076 Liquid flow line 1 liquid flow valve
1080 Isolation valve
1081 Scruber dump valve 1
1082 Scruber dump valve 2
1083 Scruber dump valve 3
1084 Liquid flow line 2
1085 Liquid flow line 2 outlet end
1086 Liquid flow line 2 aging tank entrance
1087 Liquid flow line 2 ALES tank entrance
1088 Liquid flow line 2 inlet
1089 Liquid flow line 2 liquid flow valve
1090 Flow Through Switch
1091 Diffuser
1092 Water drain back valve
1093 Water line isolation valve
1094 Water line flow valve
1095 Air line 2 outlet end
1096 Water line intermediate juncture 1
1097 Water line intermediate juncture 2
1098 Water drain back line first end
1099 Water line aging tank entrance
1100 Tank evacuation line 3
1102 Tubing pressure transducer
1110 Valve pressure flow assembly
1120 Control panel
1121 CPU
1122 Battery
1124 Generator
1141 Water drain back line second end
1142 Water drain back line

Figure 7C

1143 Water line water tank entrance
1144 Water line
1145 Water tank
1146 Aging tank level transducer
1147 Aging tank pressure transducer
1148 Air valve
1149 Air line 2
1150 Air line 2 first end
1151 Air line volume tank
1152 Air line 1 second end
1153 Airline 1 first end
1154 Air Compressor
1155 Air compressor suction line second end
1156 Air compressor suction line
1157 Air compressor suction line first end
1158 Tank evacuation line 3 first end
1159 Aging tank evacuation valve
1160 Tank evacuation line 3 second end
1161 Liquid flow line 3
1162 Liquid flow line 3 aging tank entrance
1163 Liquid flow line 3 outlet end
1164 Liquid flow line 3 inlet end
1165 Liquid flow line 3 liquid flow valve
1166 Aging tank manual drain line
1167 Condensate tank manual drain valve
1168 Aging tank heating elements
1169 Condensate tank pressure transducer
1170 Condensate tank evacuation valve
1171 Condensate tank manual unload equalization valve
1172 Condensate tank manual unload siphon valve
1173 Condensate tank manual unload siphon entrance
1174 Condensate tank manual unload siphon line inlet
1175 Aging tank
1176 Tank evacuation line 2
1177 Tank evacuation line 2 second end
1178 Water line outlet end
1180 Condensate tank
1181 Aging tank total level
1182 Aging tank cut level
1185 ALES Vapor Prevention Unit
1186 Water tank load line
1187 Water tank vent to atmosphere
1188 Electric motor to power air compressor
1189 Water line inlet end
1190 Aging tank temperature sensor
1191 Air volume tank pressure transducer
1192 Tank evacuation line 2 intermediate juncture
1193 Air line 1
1194 Air compressor discharge
1195 Air compressor intake
1196 Condensate tank manual unload siphon line outlet end
1197 Condensate tank manual unload siphon line
1198 Condensate tank manual unload equalization valve condensate tank entrance
1199 Flow passageway 1 check valve
1200 Water drain back line check valve
1201 ALES tank level indicator
1202 Location of optional valve in tank evacuation line 2
1203 Location of optional valve in flow passageway 1

Figure 7D

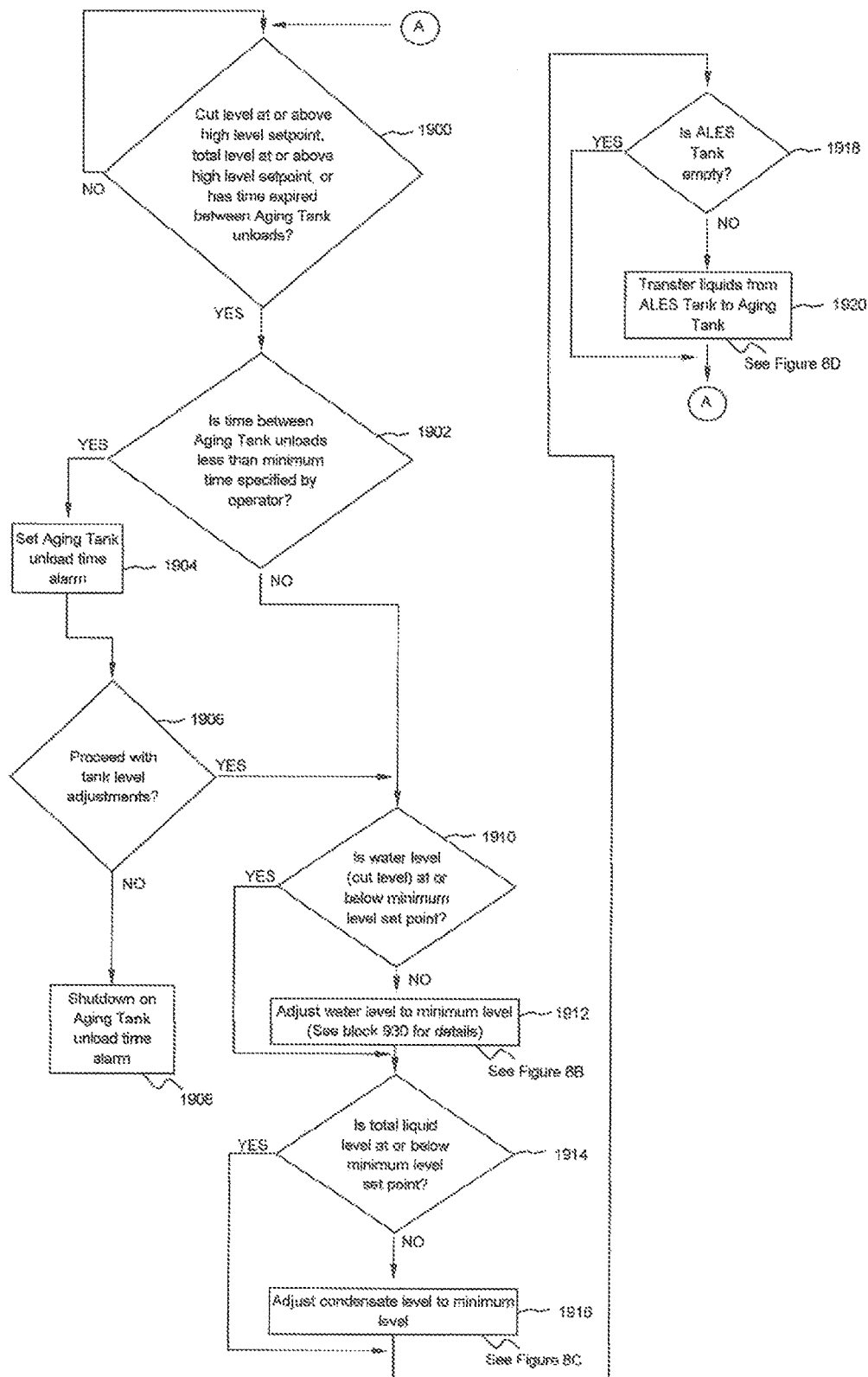

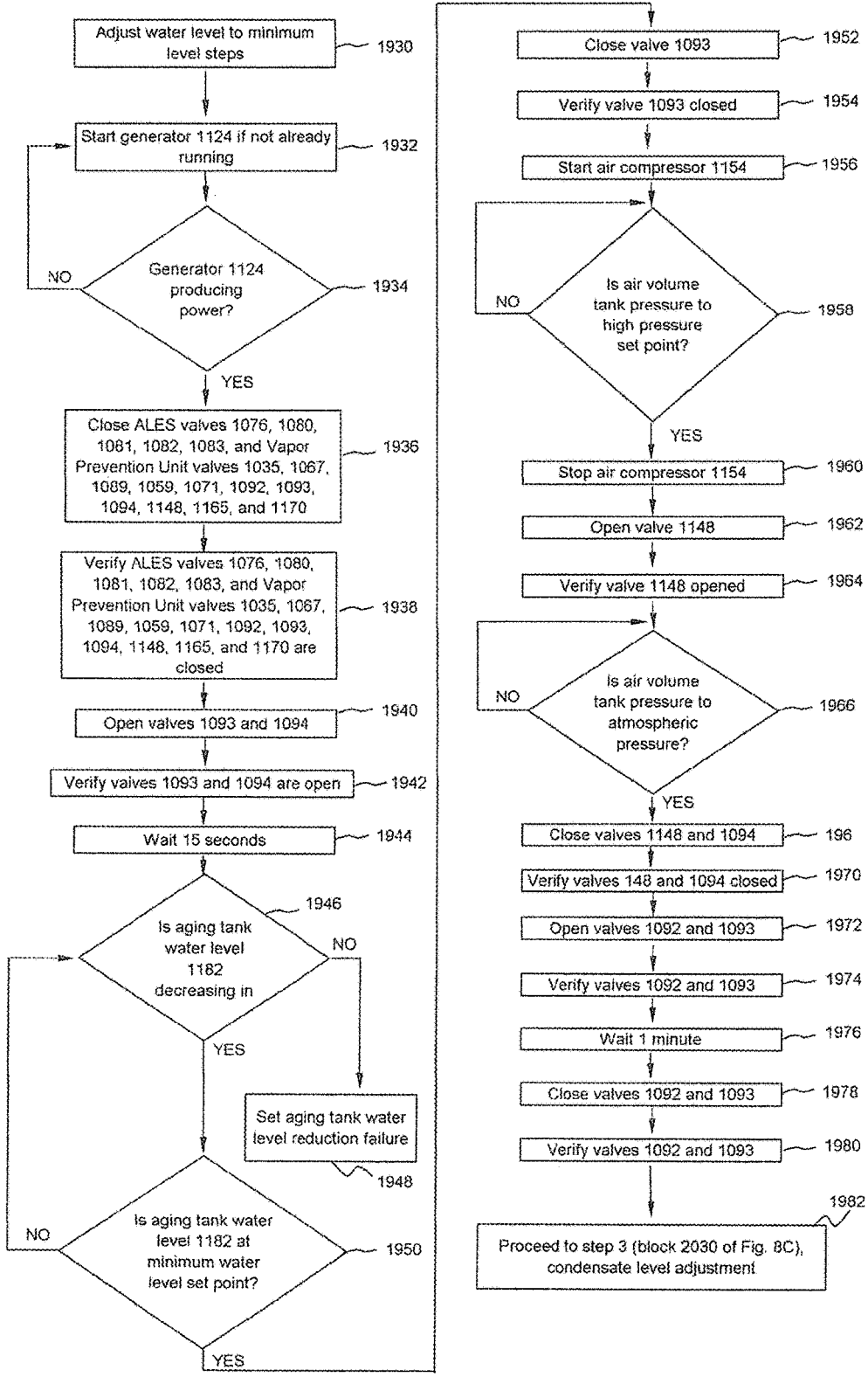

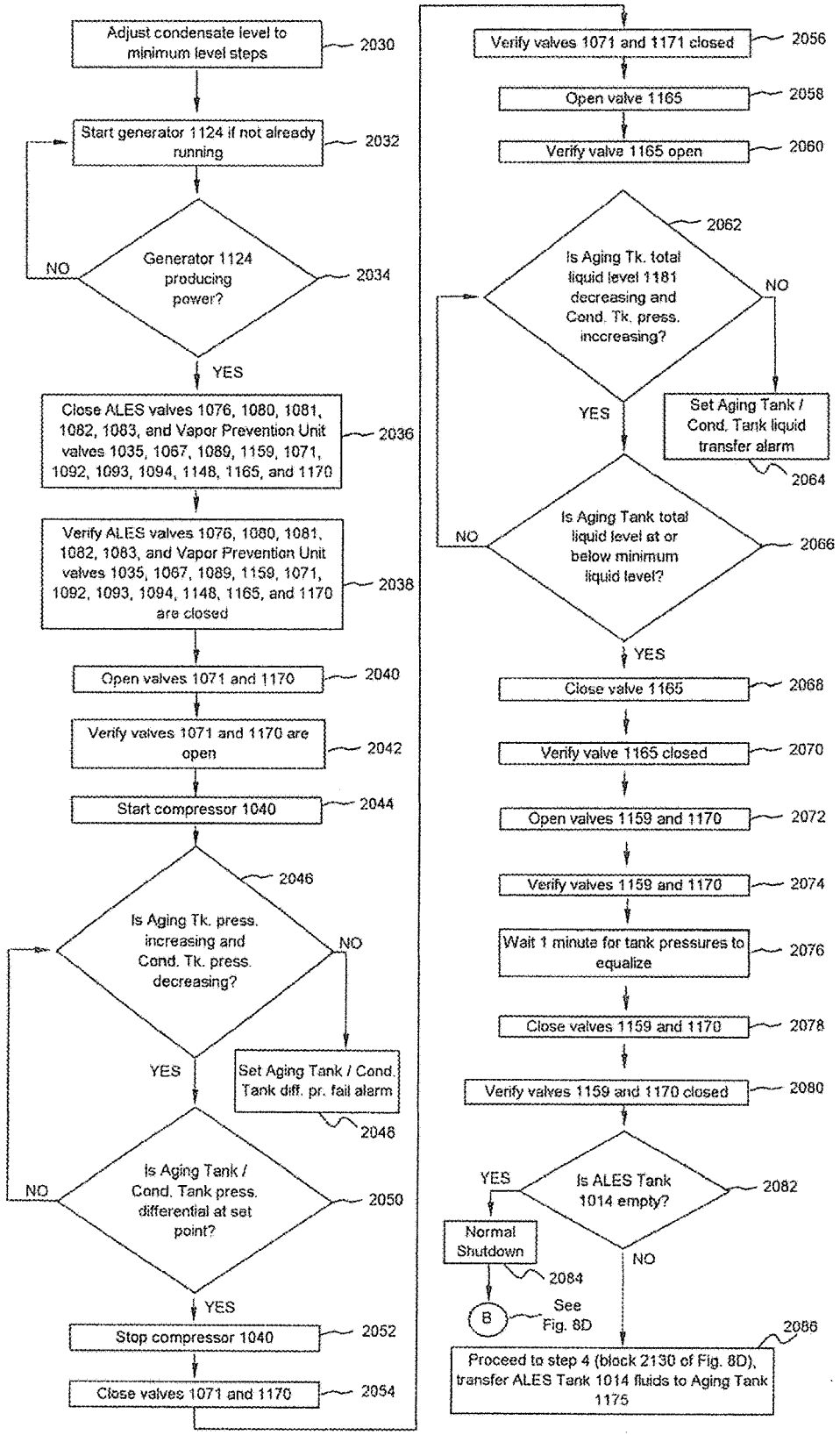
Figure 8C    ALES Vapor Prevention Unit

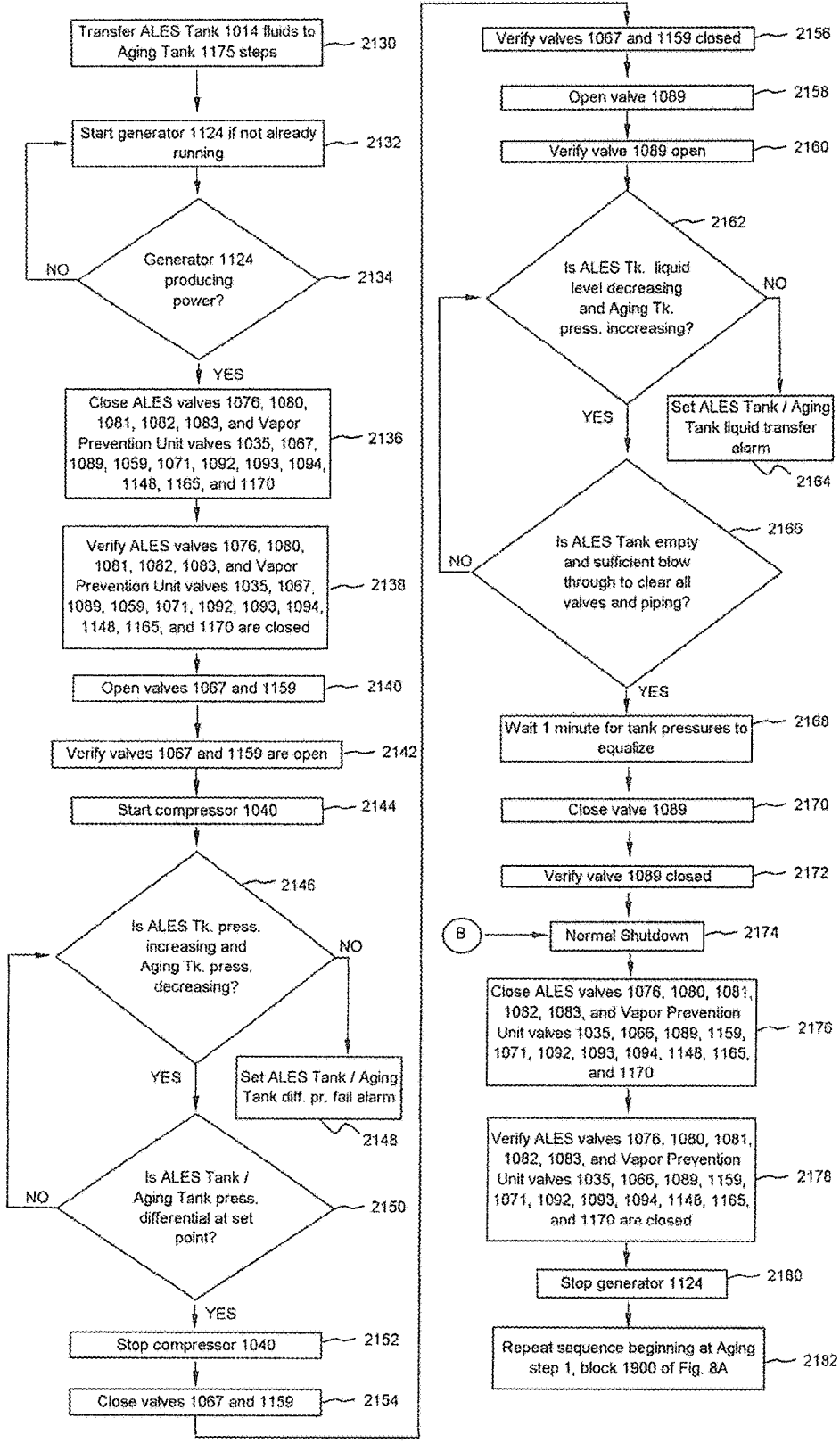
Figure 8D  ALES Vapor Prevention Unit

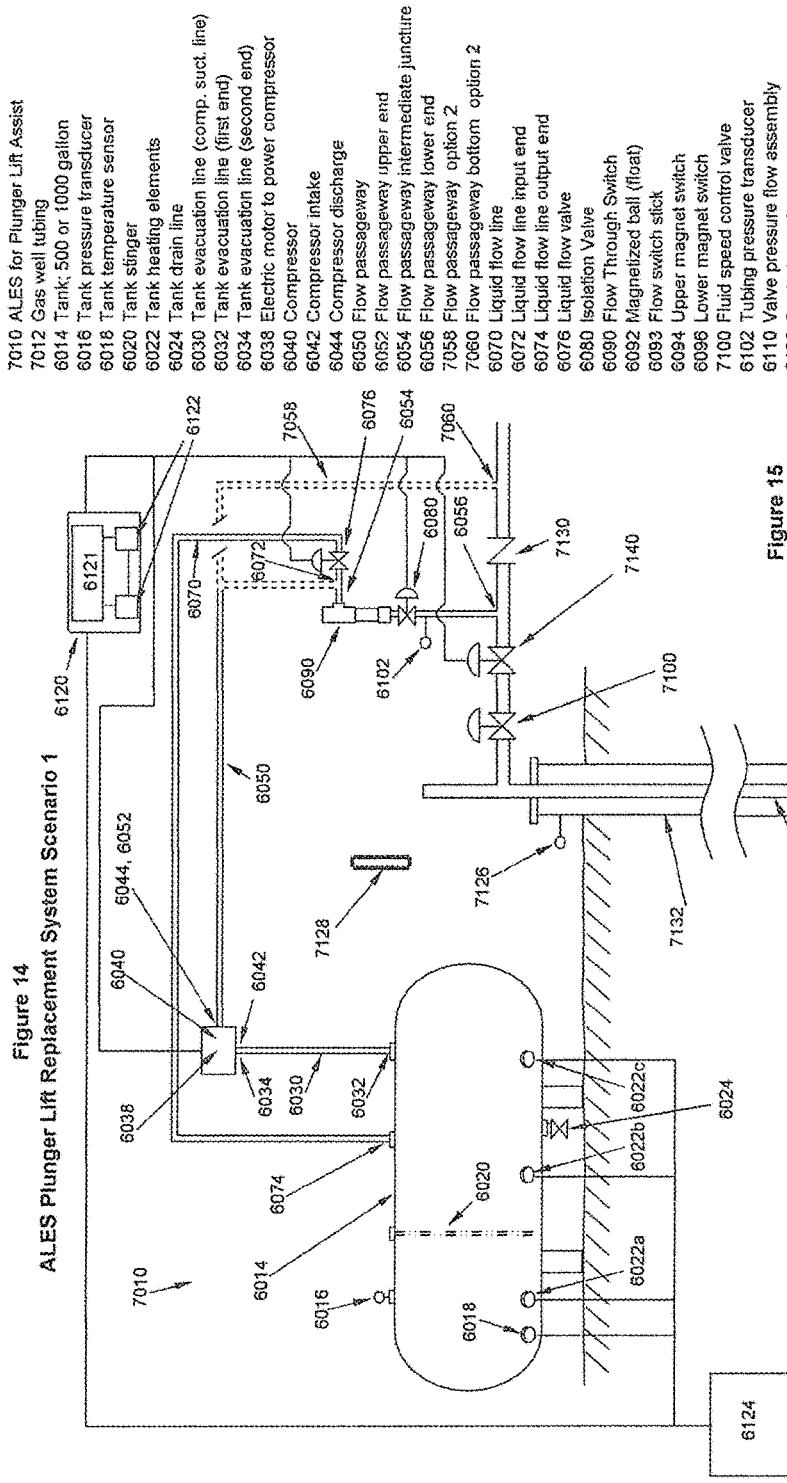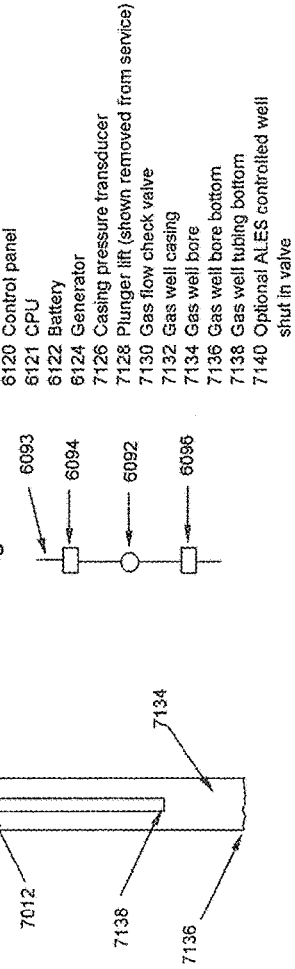

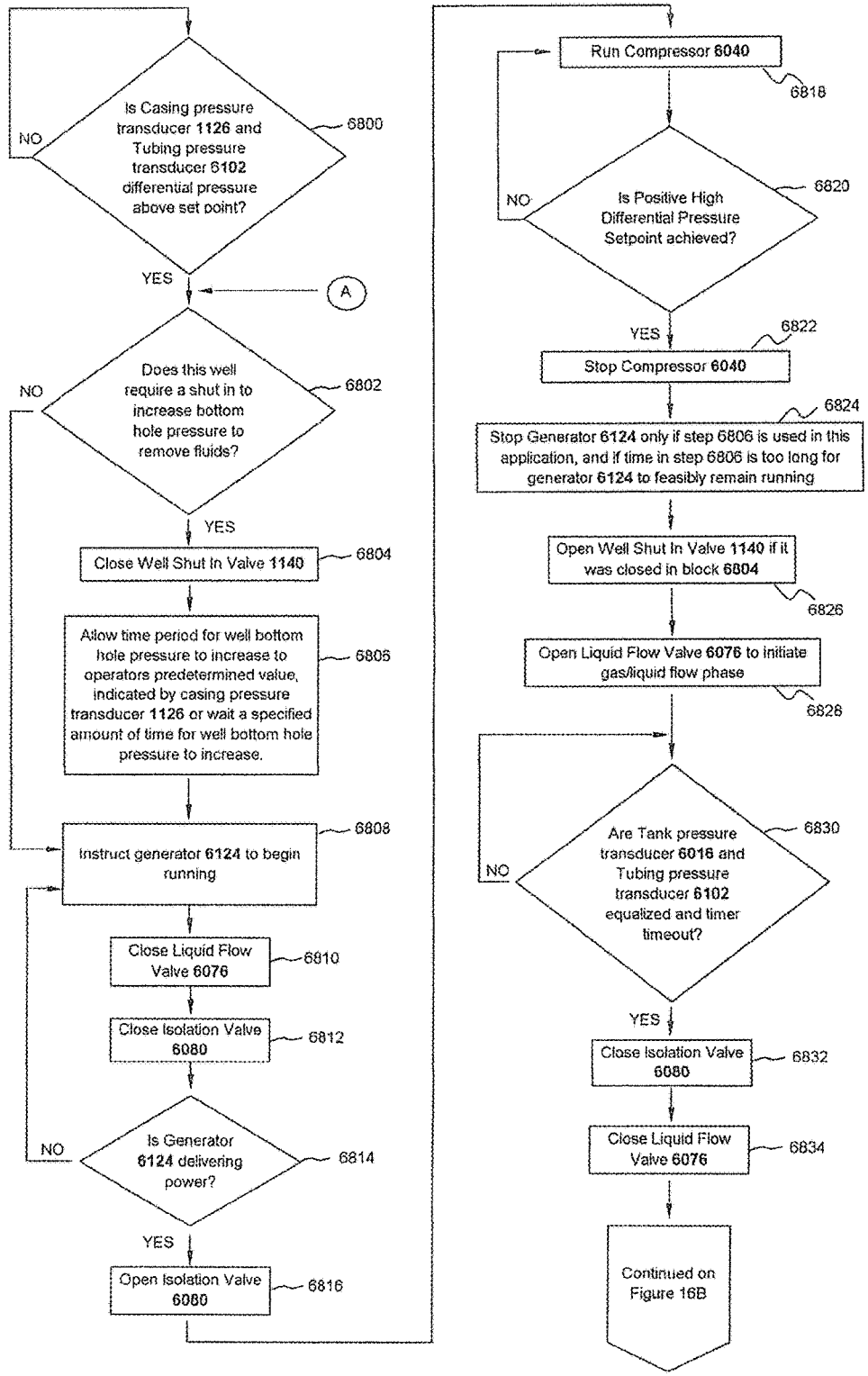

ALES Plunger Lift Replacement Scenario 1

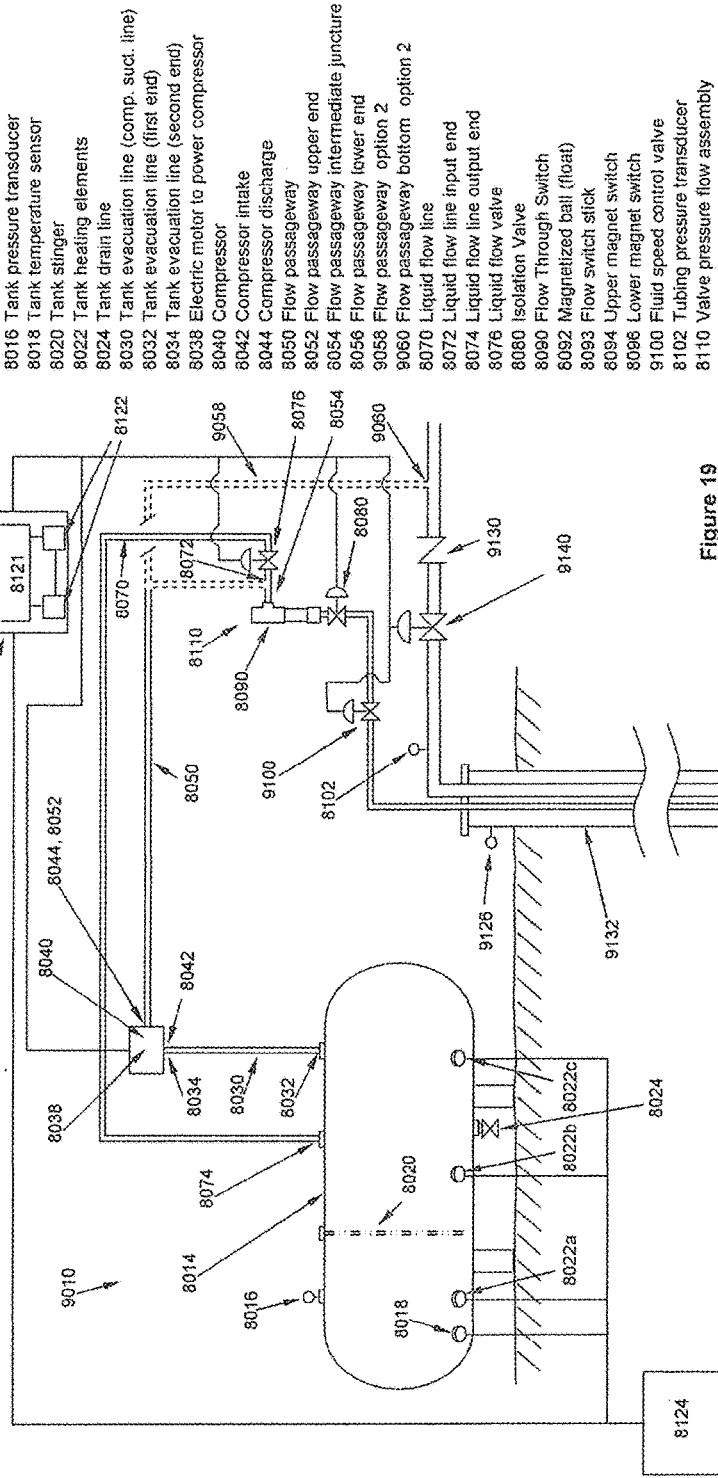
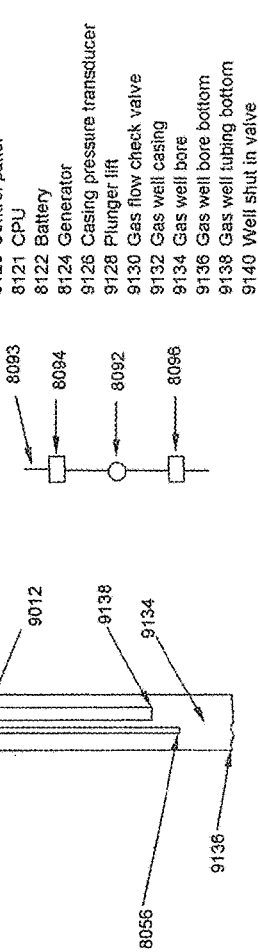
Figure 18
ALES Plunger Lift Replacement System Scenario 2
Figure 19

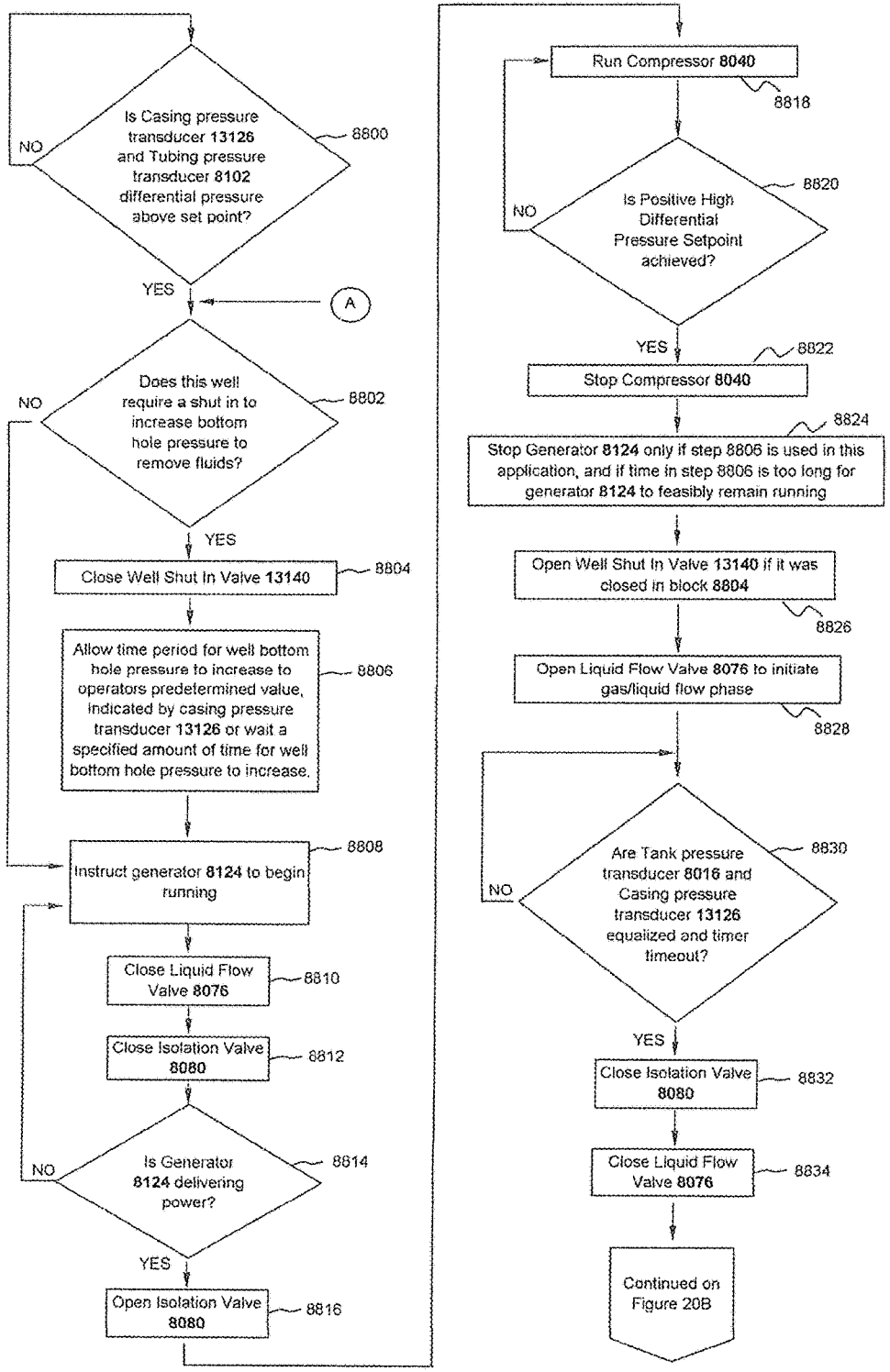

ALES Plunger Lift Replacement Scenario 2

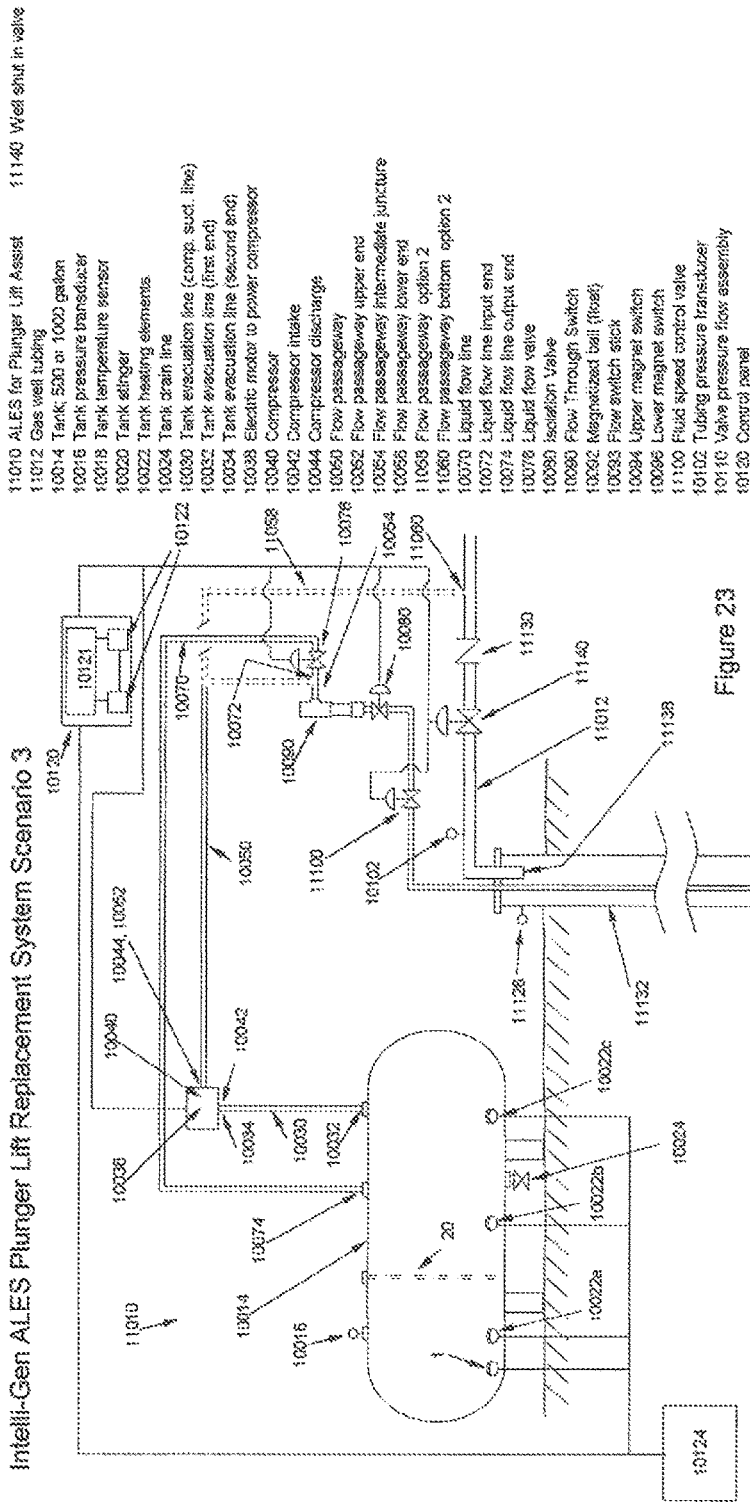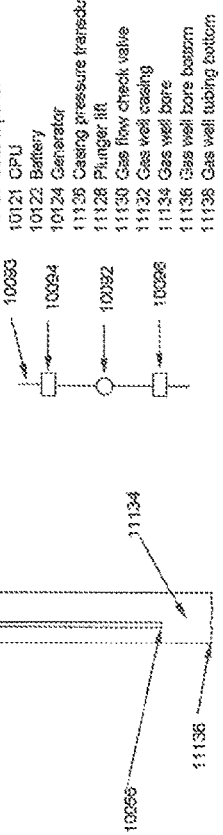

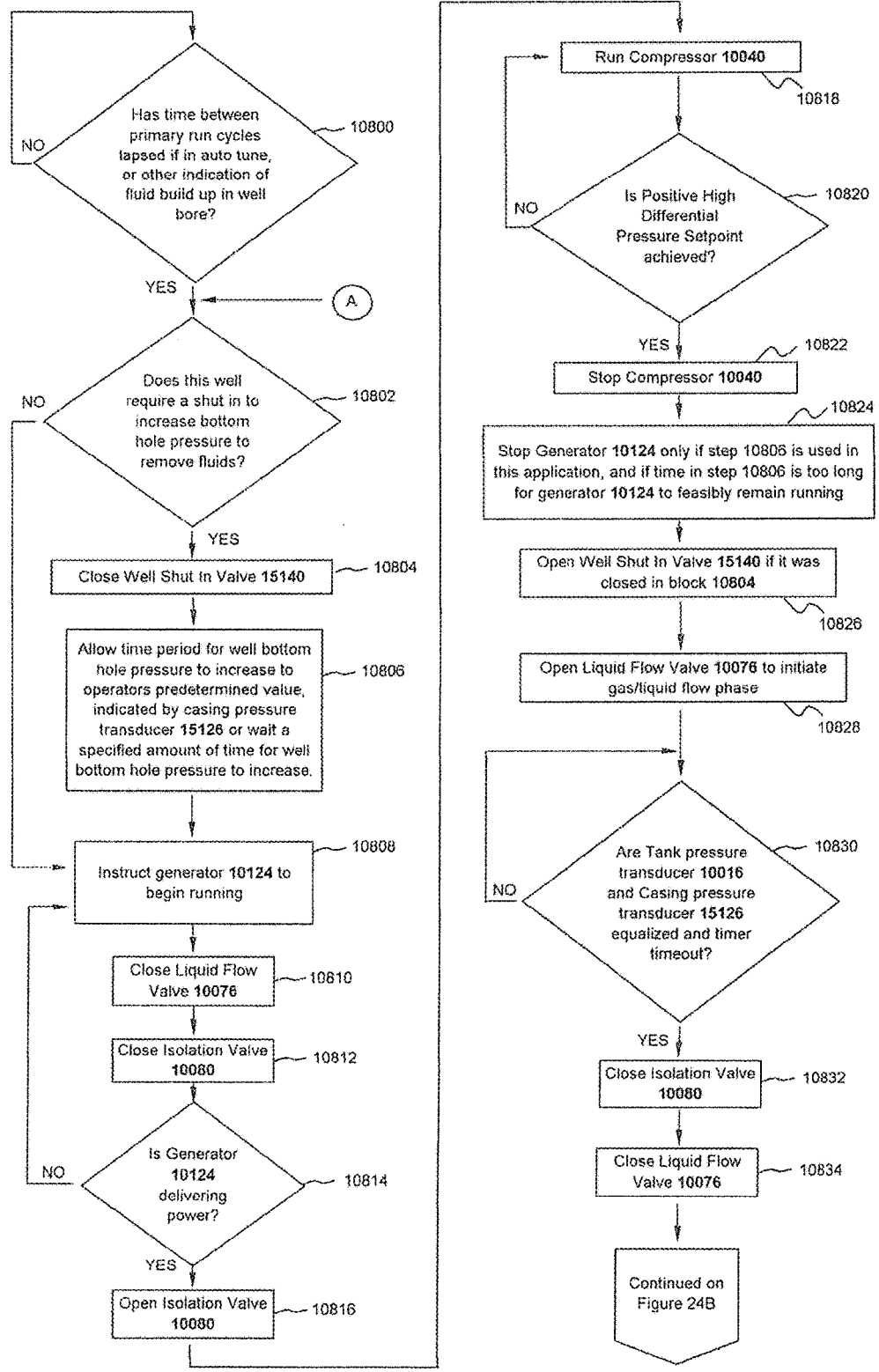

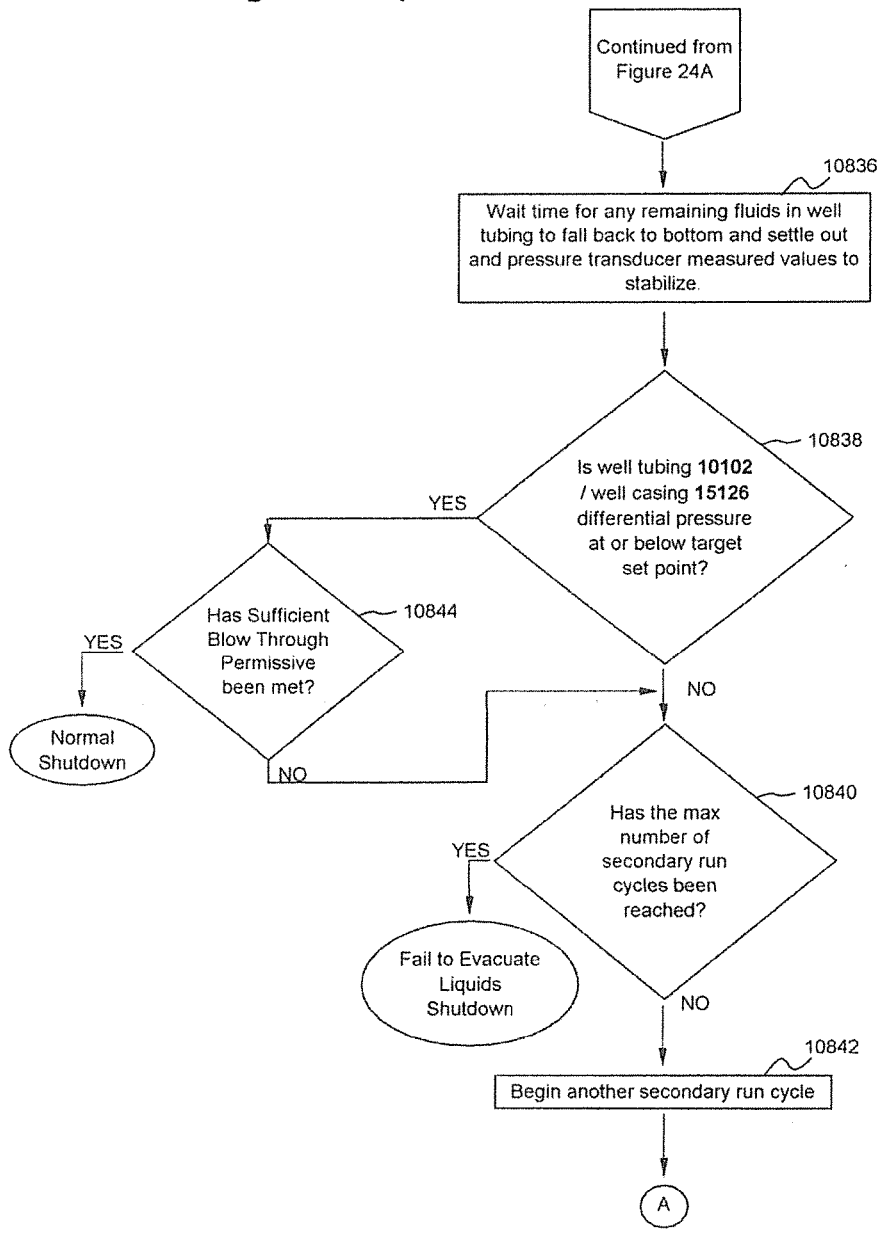

LIQUID EVACUATION SYSTEM

CROSS REFERENCE TO RELATED APPLICATIONS

This application claims the priority of U.S. Provisional Patent Application No. 62/220,559, titled "AUTOMATIC LIQUID EVACUATION SYSTEM," filed Sep. 18, 2015, U.S. Provisional Patent Application No. 62/220,461, titled "AUTOMATIC LIQUID EVACUATION SYSTEM AND VAPOR PREVENTION UNIT," filed Sep. 18, 2015, U.S. Provisional Patent Application No. 62/220,387, titled "AUTOMATIC LIQUID EVACUATION SYSTEM FOR PLUNGER LIFT ASSIST," filed Sep. 18, 2015, U.S. Provisional Patent Application No. 62/220,755, titled "AUTOMATIC LIQUID EVACUATION SYSTEM FOR PLUNGER LIFT REPLACEMENT SCENARIO 1", filed Sep. 18, 2015, U.S. Provisional Patent Application No. 62/220,763, titled "AUTOMATIC LIQUID EVACUATION SYSTEM FOR PLUNGER LIFT REPLACEMENT SCENARIO 2," filed Sep. 18, 2015, and U.S. Provisional Patent Application No. 62/220,769, titled "AUTOMATIC LIQUID EVACUATION SYSTEM FOR PLUNGER LIFT REPLACEMENT SCENARIO 3," the contents of each of which are hereby incorporated by reference.

FIELD OF THE INVENTION

The invention relates to an automatic liquid evacuation system for removing liquids from a pipeline or wellbore. More particularly, in one embodiment, the invention relates to a system capable of operating in remote area that relies on pressure differential to induce liquid flow and which utilizes the same pipeline tap for liquid removal and gas injection.

BACKGROUND OF THE INVENTION

Gas pipelines are used to transport compressed natural gas. One difficultly associated with transporting gas in a gas pipeline relates to the collection of fluids in low spots in the pipeline. The fluids are typically the result of condensate and may be water, liquid hydrocarbons or a mixture of both. Once the fluid level is high enough to block the flow of gas through the pipeline, then gas transport becomes less efficient. Consequently, pipeline owners periodically send trucks out to pipeline low spots so that the fluids can be evacuated. This method of fluid evacuation is costly and inefficient, e.g., the cost to deploy a truck for collection may be $200/day and may result in the recovery of only a half barrel of liquid. This recovery may be required as often as daily. Another method of fluid removal is via a pigging process. However, periodic pigging may not be possible due to line design, low pipe pressure, or prohibitive pipeline material.

Therefore, a need exists to evacuate fluids that is more cost efficient. In particular, a "continuous" fluid evacuation, i.e., fluid evacuation not requiring manual intervention via a deliquification by dip truck or pipeline pig will reduce costs and improve efficiency.

During oil and natural gas production and transportation processes, water, condensate and/or liquid hydrocarbons are separated from the oil or natural gas. If these fluids are collected and transferred to a tank or container that is open to the atmosphere, harmful compounds contained in the condensate/liquid hydrocarbon portion of the fluid mixture are allowed to enter the air when the condensate vaporizes at atmospheric pressure. These compounds entering the atmosphere are a huge issue with government environmental quality regulating agencies as well as natural gas well and oil and natural gas pipeline operators. There is equipment designed to recompress these vapors called vapor recovery units, but energy contained in the condensate is more valuable in a liquid state than in a gaseous state. There are also substantial costs associated with the vapor recovery process, which does not facilitate returning the vapors to a liquid, it only returns the vapors to a natural gas pipeline or natural gas pipeline related equipment.

Therefore, a need exists to collect, transfer and store these liquids under approximately the same pressures in which they were recovered from the oil or natural gas production or transportation equipment.

Natural gas wells are used to extract natural gas (comprised mostly of methane in its gaseous state) from the earth. One difficultly associated with the extraction of natural gas from the earth via a natural gas well, relates to the collection of fluids in the well bore. The fluids are typically water, hydrocarbons, or a mixture of both. Once the fluid level is high enough to block the flow of gas through the production tubing of the gas well, then gas extraction becomes much less efficient, or even impossible in certain conditions. Consequently, many well owners utilize a plunger lift that consists of a mechanical device that is periodically inserted into the tubing and allowed to drop through the fluid build up, to the bottom of the tubing. The well is then shut in which causes the gas pressure in the well bore to raise to the point in which it overcomes the weight of the fluid build up, the gas production line pressure, and the weight of the plunger itself. When this pressure point is reached, the well is then allowed to flow again, at which time the plunger begins to move upwards in the tubing, forcing the buildup of fluids, now on top of the plunger lift, toward the surface of the earth. Periodically and in certain conditions, the pressure that the well is capable of building on its own is insufficient to overcome the weight of the fluid buildup, and the plunger is unable to be recovered without other means of intervention in the process. The other means of recovering the plunger are sending a truck out to work the plunger up the tubing, a process called "swabbing", or venting the natural gas in the tubing to atmosphere which lowers the pressure above the plunger, allowing it to return to the surface of the earth. Trucks are expensive to utilize, e.g., $170 per hour for as many as 20 to 30 hours. Venting natural gas to atmosphere results in loss of production, is dangerous, and is also detrimental to the environment Therefore, a need exists to automatically assist in fluid evacuation and plunger lift recovery from the well bore.

SUMMARY OF THE INVENTION

I. Automatic Liquid Evacuation System

In one embodiment, the automatic liquid evacuation system of the invention is designed and built to automatically evacuate liquids from a natural gas pipeline. In other embodiments, the system of the invention may be modified for use in the oil pipeline industry, as well as in other mediums, such as associated drip vessels and other containers and even gas wells.

The system of the invention includes three main components, 1) a tank, such as a 500 or 1000 gallon propane tank, with an electric motor driven compressor. The compressor may be powered by a 2 horsepower, three phase electric motor. An example of a preferred compressor is Quincy QTS-3. An example of a preferred electric motor is two horsepower Crown Triton/Hyundai PLP1455SR236 TEFC 230/460 volt three phase; 2) a valve/pressure transducer/ flow switch assembly or valve pressure flow assembly; and 3) an internal combustion engine driven, automatic start/ stop, electric generator system.

The system evacuates liquid from a pipeline via a siphon or equivalent piping configuration, by operating the compressor to create a pressure differential between the pipeline and the tank. When adequate pressure differential is achieved, the valve pressure flow assembly allows liquids to flow into the tank from the pipeline. The system senses when liquids have been removed, then the system shuts down, and waits for another run signal. The system of the invention preferably has temperature control functionality as well.

The system of the invention is uniquely suited for use in remote locations, long distances from utility company power lines. This is due, in part, to the use of an automatic start/stop generator system capable of providing power to the compressor and to the CPU as may be required.

The system of the invention may be used on any type of pipeline such as natural gas, oil or any other medium. Electricity may be used to power the compressor and electronic components. In some embodiments, the electricity is provided by a gas powered generator, such as an automatic start/stop internal combustion engine driven electric generator. An example of a preferred generator is Honda GX 160 engine with Mecc Alte S16W generator.

II. Automatic Liquid Evacuation System and Vapor Prevention Unit

In another embodiment, the vapor prevention system of the invention is designed and built to automatically evacuate the fluids from an automatic liquid evacuation system, separate the water from the condensate/liquid hydrocarbons, and transfer the water to a water storage tank that is vented to atmosphere, while transferring the condensate/liquid hydrocarbons to a pressurized tank. The system is designed to receive, separate, transfer, and store the condensate/liquid hydrocarbons under similar pressures as the pipeline or vessel in which they were originally recovered. It receives and separates the water under the same pressures, but allows the water to be transferred to, and stored in, a standard water storage tank at atmospheric pressure.

In other embodiments, the system of the invention may be modified for use in the gas pipeline industry, the oil pipeline industry, as well as in other mediums, as well as associated drip vessels, containers, and tanks.

The system of the invention includes four main components, 1) a tank, such as a 500 or 1000 gallon propane tank, 2) an electric motor driven air compressor. The air compressor may be powered by a 2 horsepower, three phase electric motor. An example of a preferred compressor is a Quincy QTS-3 compressor. An example of a preferred electric motor is a 2 horsepower, Crown Triton/Hyundai, PLP145SR235, TEFC, 230/460 volt, 3 Phase; 3) a second tank such as a 1000, or 2000 gallon propane tank; and 4) a third water tank, suitable for storing water, such as a 210 to 300 barrel tank rated for atmospheric pressure only. The system utilizes some components of the automatic liquid evacuation system in which it functions in conjunction with, those components include the ALES compressor and associated suction and discharge lines and the ALES tank pressure transducer, along with the CPU and components that power the CPU.

The system receives fluid from the ALES into an Aging tank for separation of the water from the condensate/liquid hydrocarbons. During the aging step of operation, the water level, also referred to as the cut level, is monitored, as well as the total liquid level as the water and condensate are separated in the Aging tank. After sufficient "aging" time, e.g., 6 hours, which ensures adequate separation of the condensate and water, the system goes in to an Aging tank unload step. During this step, the system operates valves to transfer the water to a water storage tank to obtain a minimum water level set point in the Aging tank. The system then operates an air compressor to blow the line clear of water to prevent freezing. The condensate level, or total fluid level, is then checked, and if required, the compressor of the ALES is operated along with a liquid flow valve to create a differential pressure between the Aging tank and the Condensate tank adequate enough to transfer the condensate from the Aging tank to the Condensate tank for storage. The condensate level is brought to a minimum set point and the Aging tank unload step is then complete. The system then evacuates the fluid from the ALES tank by operating the ALES compressor to create a pressure differential between the ALES tank and the Aging tank of the invention. When adequate pressure differential is achieved, the liquid flow valve allows the liquid in the ALES tank to flow to the Aging tank of the invention. The system senses when the fluids have been removed from the ALES tank, then stops the compressor and generator and begins another aging step. The system of the invention preferably has temperature control functionality for the Aging tank only, as the condensate stored in the Condensate tank will not freeze.

The system of the invention is uniquely suited for use in remote locations, long distances from utility company power lines. This is due, in part, to the use of an automatic start/stop generator system capable of providing power to the compressor and to the CPU as may be required.

The system of the invention may be used on any type of pipeline, vessel, container, or tank, such as natural gas, oil, or any other medium, as well as a natural gas well. Electricity may be used to power the compressor and electronic components. In some embodiments, the electricity is provided by a gas powered generator, such as an automatic start/stop internal combustion engine driven electric generator. An example of a preferred generator is a Honda GX 160 engine with a Mecc Alte S16W generator.

III. Automatic Liquid Evacuation System for Plunger Lift Assist

In another embodiment, the automatic liquid evacuation system of the invention is designed and built to automatically assist in fluid evacuation and plunger lift recovery from the well bore.

In other embodiments, the system of the invention may be modified for use in the gas pipeline industry, the oil pipeline industry, as well as in other mediums, as well as associated drip vessels, containers, and tanks.

The system of the invention includes three main components, 1) a tank, such as a 500 or 1000 gallon propane tank, with an electric motor driven compressor. The compressor may be powered by a 2 horsepower, three phase electric motor. An example of a preferred compressor is a Quincy QTS-3 compressor. An example of a preferred electric motor is a 2 horsepower, Crown Triton/Hyundai, PLP145SR235, TEFC, 230/460 volt, 3 Phase; 2) a valve/pressure transducer/ flow switch assembly or valve pressure flow assembly; and 3) an internal combustion engine driven, automatic start/ stop, electric generator system.

The system assists in fluid evacuation and plunger lift recovery from the well bore by operating the compressor to create a pressure differential between the tubing above the fluid and plunger lift, and the tank. When adequate pressure differential is achieved, the valve pressure flow assembly allows tubing gas pressure above the plunger lift, as well as the fluid above the plunger lift, to flow in to the tank from the tubing. The system senses when the plunger lift has been recovered, then shuts down and waits for another run signal. The system of the invention preferably has temperature control functionality as well.

The system of the invention is uniquely suited for use in remote locations, long distances from utility company power lines. This is due, in part, to the use of an automatic start/stop generator system capable of providing power to the compressor and to the CPU as may be required.

The system of the invention may be used on any type of pipeline, vessel, container, tank, such as natural gas, oil, or any other medium, as well as a natural gas well. Electricity may be used to power the compressor and electronic components. In some embodiments, the electricity is provided by a gas powered generator, such as an automatic start/stop internal combustion engine driven electric generator. An example of a preferred generator is a Honda GX 160 engine with a Mecc Alte S16W generator.

IV. Automatic Liquid Evacuation System for Plunger Lift Replacement

In another embodiment, the automatic liquid evacuation system of the invention is designed and built to automatically evacuate the fluids from the natural gas well bore.

In other embodiments, the system of the invention may be modified for use in the gas pipeline industry, the oil pipeline industry, as well as in other mediums, as well as associated drip vessels, containers, and tanks.

The system of the invention includes three main components, 1) a tank, such as a 500 or 1000 gallon propane tank, with an electric motor driven compressor. The compressor may be powered by a 2 horsepower, three phase electric motor. An example of a preferred compressor is a Quincy QTS-3 compressor. An example of a preferred electric motor is a 2 horsepower, Crown Triton/Hyundai, PLP145SR235, TEFC, 230/460 volt, 3 Phase; 2) a valve/pressure transducer/flow switch assembly or valve pressure flow assembly; and 3) an internal combustion engine driven, automatic start/stop, electric generator system.

The system evacuates the fluid from the gas well bore by operating the compressor to create a pressure differential between the well tubing above the fluid and the tank. When adequate pressure differential is achieved, the valve pressure flow assembly allows tubing gas pressure above the fluids to flow in to the tank from the tubing. As the gas above the fluids flows to the lower pressure in the tank, the higher gas pressure below the fluids pushes the fluids up the well tubing into the tank also. The system senses when the fluids have been removed, then shuts down and waits for another run signal. The system of the invention preferably has temperature control functionality as well.

The system of the invention is uniquely suited for use in remote locations, long distances from utility company power lines. This is due, in part, to the use of an automatic start/stop generator system capable of providing power to the compressor and to the CPU as may be required.

The system of the invention may be used on any type of pipeline, vessel, container, tank, such as natural gas, oil, or any other medium, as well as a natural gas well. Electricity may be used to power the compressor and electronic components. In some embodiments, the electricity is provided by a gas powered generator, such as an automatic start/stop internal combustion engine driven electric generator. An example of a preferred generator is a Honda GX 160 engine with a Mecc Alte S16W generator.

BRIEF DESCRIPTION OF THE DRAWINGS

FIG. 1 is a schematic of the automatic liquid evacuation system of the invention.

FIG. 2 is an enlarged schematic of the flow switch of the system of FIG. 1.

FIG. 4 is a chart showing a tank pressure rate of change profile for a 500 gallon tank.

FIG. 5 is a chart showing tank pressure rate of change with liquid flowing in a 500 gallon tank.

FIG. 7B is a schematic of the vapor prevention unit in conjunction with an automatic liquid evacuation system of the invention.

FIG. 7C is a component list of components of FIGS. 7A and 7B.

FIG. 7D is a component list of components of FIGS. 7A and 7B.

FIG. 8A is a flow diagram of the method steps that comprise a run cycle.

FIG. 8B is a flow diagram of the method steps that comprise a run cycle.

FIG. 8C is a flow diagram of the method steps that comprise a run cycle.

FIG. 8D is a flow diagram of the method steps that comprise a run cycle.

FIG. 14 is a schematic of the automatic liquid evacuation system of the invention.

FIG. 15 is an enlarged schematic of the flow switch of the system of FIG. 9.

FIG. 16A is a flow diagram of the method steps that comprise a primary run cycle.

FIG. 18 is a schematic of the automatic liquid evacuation system of the invention.

FIG. 19 is an enlarged schematic of the flow switch of the system of FIG. 18.

FIG. 20A is a flow diagram of the method steps that comprise a primary run cycle.

FIG. 22 is a schematic of the automatic liquid evacuation system of the invention.

FIG. 23 is an enlarged schematic of the flow switch of the system of FIG. 22.

FIG. 24A is a flow diagram of the method steps that comprise a primary run cycle.

FIG. 24B is a flow diagram of the method steps that comprise a primary run cycle.

DETAILED DESCRIPTION OF THE PREFERRED EMBODIMENTS

I. Automatic Liquid Evacuation System

Figure 3:
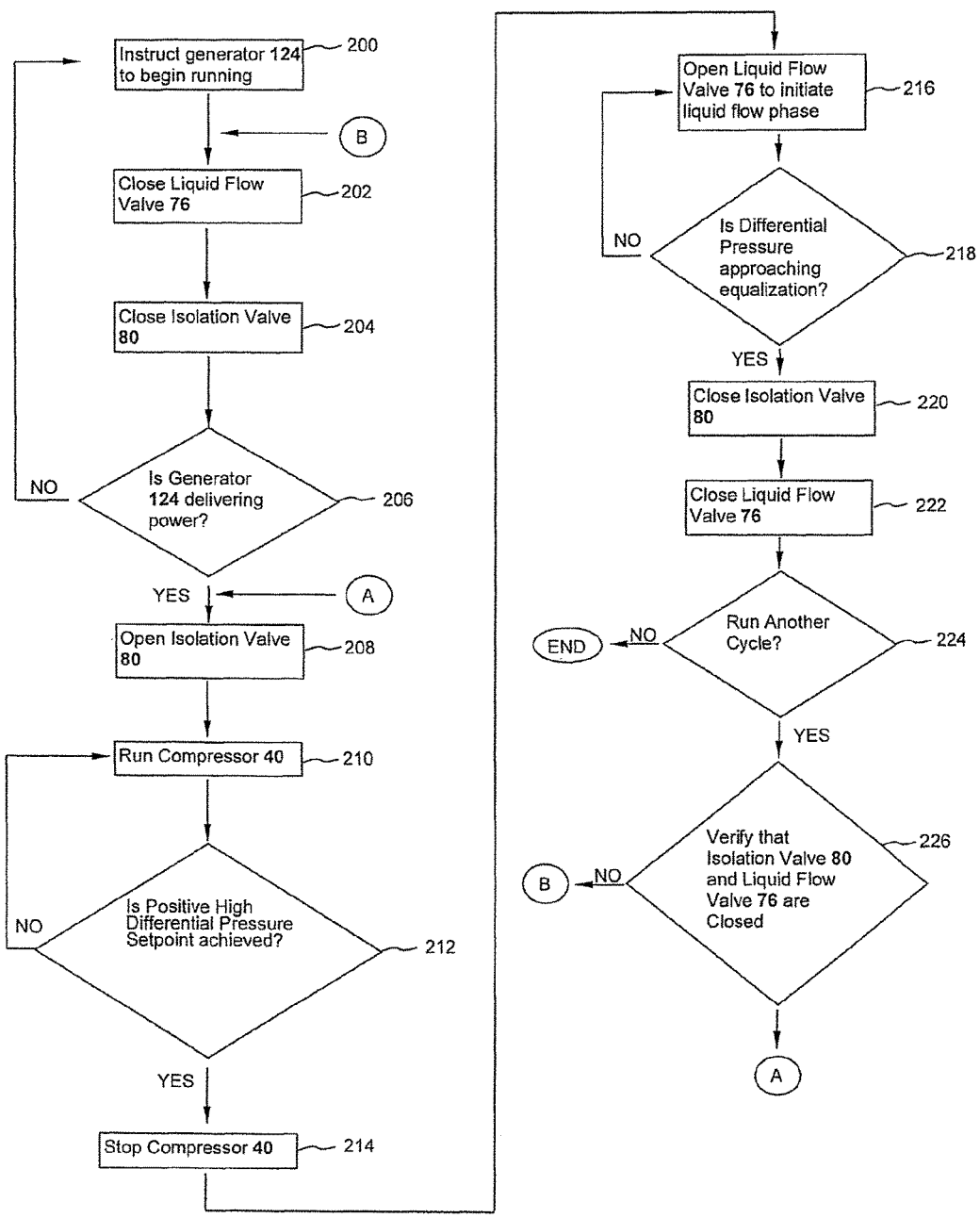
FIG. 3 is a flow diagram of the method steps that comprise a primary cycle.

Referring to FIG. 1, shown is an automatic liquid evacuation system, designated generally 10, for evacuating liquids from pipe 12. Automatic liquid evacuation system 10 includes tank 14 for receiving and storing liquids evacuated from pipe 12. Tank 14 is provided with tank pressure transducer 16 for measuring the pressure in tank 14 and first temperature sensor 18 for measuring the temperature of fluids in tank 14. Tank stinger 20 is provided, as a backup, to facilitate removal of liquids from tank 14. Tank heater 22 is provided for heating liquids in tank 14 when first temperature sensor 18 indicates that ambient temperature poses a freezing risk to liquids in tank 14. In one embodiment, tank heater 22 is comprised of a plurality of tank heater units, e.g., tank heater units 22a, 22b, 22c and 22d. Tank drain line 24 is provided for draining tank 14.

Tank gas evacuation line 30 has first end 32 and second end 34. First end 32 communicates with tank 14.

A motor 38, preferably a variable speed drive, powers compressor 40. Compressor 40 has an intake 42 and a discharge 44. Intake 42 communicates with tank gas evacuation line 30.

Flow passageway 50 has upper end 52, intermediate juncture 54 and lower end 56. Upper end 52 receives gas from second end 34 of tank gas evacuation line 30. Lower end 56 is in communication with pipe 12. Siphon 58 is in communication with lower end 56 of flow passageway 50. Siphon 58 extends into pipe 12.

Liquid flow line 70 has input end 72 and output end 74. Input end 72 is in communication with intermediate juncture 54 of flow passageway 50. Output end 74 is in communication with tank 14. Liquid flow valve 76 is located in liquid flow line 70 for selectively opening or closing liquid flow line 70.

Isolation valve 80 is located on flow passageway 50. Isolation valve 80 is preferably located between intermediate juncture 54 and lower end 56 of flow passageway 50. Isolation valve 80 is provided for selectively isolating liquid flow line 76 and compressor 40 from pipe 12.

In one embodiment, flow through switch 90 located on flow passageway 50. Flow through switch 90 is optional. In a preferred embodiment, flow through switch 90 has a ball 92 that is preferably magnetized. Ball 92 is slidingly received on a vertical shaft or stick 93 and is capable of travel between an upper magnet switch 94 and a lower magnet switch 96. Magnet switches 94, 96 are in communication with CPU 121 for providing an indication of the location of ball 92. In a preferred embodiment, flow through switch 90 is positioned at the location of intermediate juncture 54 so that when liquids are flowing from pipe 12 to tank 14, ball 92 is pushed upwards into contact with upper magnet switch 94. Compressor 40 is preferably provided with check valves to prevent backflow. Valves may also be installed downstream of the compressor 40. Instead, fluid is routed through liquid flow line 70 and into tank 14.

Drip valve 100 is provided on flow passageway 50. Drip valve 100 is preferably located between isolation valve 80 and lower end 56 of flow passageway 50. Drip valve 100 is provided for selectively closing communication with pipe 12.

Pipe pressure transducer 102 is provided on flow passageway 50. Pipe pressure transducer is preferably located between isolation valve 80 and pipe 12.

For purposes of this application, drip valve 100, pipe pressure transducer 102, isolation valve 80, and flow valve 76 comprise valve pressure flow assembly 110. One advantage of valve pressure flow assembly 110 is that it allows discharge from compressor 40 and tank 14 and also allows removal of liquids from pipe 12 through the same siphon 58 or tap on pipe 14.

Control panel 120 is provided for receiving operator commands and for delivering operator commands to CPU 121. CPU 121 is provided for activating various components of system 10, as will be explained below. Battery 122 provides power to control panel 120 and CPU 121. Generator 124 communicates with compressor 40 and tank heater 22 for providing power as may be required and may be used to charge battery 122 as necessary.

ALES Run Cycle Steps:

Referring now to FIGS. 1-3, in one embodiment, automatic liquid evacuation system 10 operates as follows. Control panel 120, powered by battery 122, instructs generator 124 to begin running as indicated by block 200. Liquid flow valve 76 is instructed to close as indicated in block 202.

After a short wait time, e.g., one second after liquid flow valve 76 is closed, isolation valve 80 is instructed to close as indicated in block 204.

After a short wait time, e.g., five seconds for new start and 2 seconds if already running, CPU 121 verifies that generator 124 is delivering power to battery 122, as indicated in block 206. If so, isolation valve 80 is instructed to open, as indicated in block 208. If no, then instructions are again issued to generator 120, as indicated in block 200.

After a short time, e.g., 5 seconds after isolation valve 80 opens, compressor 40 is instructed to start, as indicated in block 210. Compressor 40 will begin to lower pressure within tank 14 via tank gas evacuation line 30.

A tank evacuation wait time is provided for tank evacuation attained to go true. Tank evacuation wait time will vary depending on liquid level within tank 14, speed of compressor 40, and an operator setting of positive high differential pressure between readings provided by tank pressure transducer 16 and pipe pressure transducer 102. Pressure reading from transducers 16 and 102 and communicated to CPU 121. In one example, the positive high differential pressure is set at 9.0 psi differential pressure. Once the positive high differential pressure is achieved, as indicated by block 212, compressor 40 is instructed to stop running, as indicated in block 214.

After a short wait time, e.g., 20 seconds, liquid flow valve 76 is instructed to open, as indicated in block 216, which initiates a liquid flow phase from pipe 12 to tank 14, through liquid flow line 70. Flow through liquid flow line 70 occurs due to the pressure differential between tank 14 and pipe 12, which is measured by monitoring tank pressure transducer 16 and pipe pressure transducer 102, as explained above. The liquid flow phase is permitted until the pressure differential approaches equalization, as indicated in block 218, e.g., until the pressure differential is 1.5 psi, plus a short wait time, e.g., 1 minute. The liquid flow time will vary depending on a volume of liquids in pipe 12, or if no liquids are present in pipe 12. After a desired pressure differential is achieved plus the desired short wait time, isolation valve 80 is instructed to close, as indicated in block 220. Flow valve 76 is also instructed to close, as indicated in block 222.

Upon closure of isolation valve 80 and flow valve 76, a short wait time is implemented, e.g., 10 seconds. At this time a run cycle is complete.

A short wait time is implemented, e.g., 6 seconds, then a decision is made whether to: (1) run another cycle; (2) normal shutdown on drip blow through attained; (3) set drip evacuation failed critical alarm. The decision is represented by block 224. The decision is made based on the following procedure.

Measurements from tank pressure transducer 16 are taken at short intervals, e.g., every second, during the liquid flow phase. CPU 121 uses these measurements to determine a rate of change in the measured value of the tank pressure transducer 16. CPU 121 compares this rate of change with a database of expected rates of change, e.g., when liquids are flowing in the liquid flow phase, a rate of change of 0.1 lbs./min may be expected. However, if the measure rate of change is substantially greater, e.g., 0.2 lbs./sec, then the CPU determines that fluids have been removed from pipe 12 and that blow through has occurred. A rule of thumb is that an increase in pressure rate of change from 0.1 lbs/min to 2 lbs/sec is indicative of a blow through condition. If the substantially greater rate of change is not achieved during the fluid flow cycle, then CPU 121 determines that blow through has not occurred, that fluids still remain in pipe 12 and that a decision to run another cycle should be implemented. Actual pressure rate numbers depend on the level of liquids in tank 14 and on the size of tank 14. Experimental results are shown in FIGS. 4 and 5.

Rate of Change Compression:

Referring to FIG. 4, shown is an example tank pressure rate of change profile for a 500 gallon tank. The numbers in the table of FIG. 4 are the values written to Register V2022 of CPU 121 and they represent the number of 0.1 psi change per second in the tank pressure. The numbers are not the tank/pipeline differential pressure, rather, the number represents the pressure in tank 14. This means that with the tank level at 22", and the starting pipeline/tank pressure differential at about 8.5 psi., the consistent, maximum rate of change in tank pressure observed in testing is 0.8 psi per second. This number becomes a constant for a particular tank size, tank liquid level, and piping configuration, and is written to a storage register, register V2022 of CPU 121. After that, a momentary, instantaneous snapshot of the pressure in tank 14 stored in register V2011 is then added to "storage" register, e.g., register V2022 of CPU 121. The sum of the two is then written out to a "comparison" register, e.g., register V2024. Then the value residing in register V2024 is compared with the current pressure in tank 14, e.g., register V2011, as it is continually rising in value. When the actual tank pressure register, e.g., register V2011 is greater than or equal to the value in register V2024, the logic makes a coil, C260 go high. When C260 goes high, two events take place. First a counter, CT20, is incremented 1 time, and second the logic takes the new tank pressure, register V2011, adds the constant to it again, writes the sum out to register V2024, to begin the comparison process all over again, then coil C260 is set back to low and is ready for the next comparison. Up to this point in the process, nothing is time based. We simply increment a counter each time the pressure increases to the value written in register V2024. That could take up to a minute, or as little as one second, it is irrelevant at this point in the process. All we are after at this point is a counter increment each time the pressure in tank 14 rises to or above the given amount.

At this point, time is factored into the calculation. A set of timers, e.g., timers T152 and T154, are each set to time out after 3 seconds. These timers are "Fast" timers and are preferably very precise, e.g., accurate to a hundredth of a second. As these timers alternate timing and timing out, the counter, e.g., counter CT20, is reset each 3 second interval. When counter CT20 is reset, the "accumulated" value is set back to 0. The logic monitors the "accumulated" value of counter CT20 and when it sees that value equal to or greater than 3, sets another coil, e.g., coil C263, to high. Since counter CT20 only gets reset to 0 every 3 seconds, then if the "accumulated" value of counter CT20 is greater than or equal to 3, that means that during that particular 3 second time period, the "Rate of Change" in tank pressure was at least 0.8 psi per second, which equals 2.4 psi for the 3 second time period.

As shown in the chart of FIG. 4, the higher the liquid level in tank 14, the faster the tank pressure rise and the shorter the time becomes to pipeline/tank pressure equalization. Because of this condition, to get a true indication of Drip Blow Through at the lower liquid levels in tank 14, we have the added benefit of looking at more than just one 3 second time period to determine Drip Blow Through. As shown in the chart of FIG. 4, at 0 percent liquid level in tank 14, significant "rate of change" in tank pressure continues much past one 3 second time period. For seven, 3 second intervals after the beginning of the measurement process, the rate of change is still equal to or greater than 0.1 psi per second, and 0.3 psi in a 3 second time period. A rate of change of 0.1 psi per second, which is 1 psi in 10 seconds, is a significant rate of tank pressure change for this application. This allows the rate of change calculations to be customized for each liquid level in tank 14 to determine very accurately when a Drip Blow Through has occurred at the various tank liquid levels.

This brings us to where more than one 3 second time period is utilized (in the lower tank liquid levels) to determine a Drip Blow Through condition. This is accomplished with a counter, e.g., counter CT22, that counts each time the accumulated value of counter CT20 climbs higher than 3. A "preset" value is written to counter CT22 that is equal to the number of 3 second time periods desired to require in the calculation for a particular liquid level in tank 14. When and if the counter CT22 "counts out", or reaches its preset value, it is then determined whether or not a Drip Blow Through permissive has occurred from the rate of change calculations. To write the number of 3 second time periods required in the calculation, we write a value to register V3004 according to the liquid level of tank 14. This in turn sets the "preset value" of counter CT22 which determines the state of the permissive.

Steps if (1) "Run Another Cycle" is Required and Permitted:

Referring back to FIGS. 1-3, a short wait time is implemented after flow isolation valve 80 and flow valve 76 are verified to be closed. Isolation valve 80 is then instructed to open, as indicated in step 208. Compressor 40 is then instructed to begin running, as indicated in step 210.

The cycle steps described above and which are represented in steps 208 to 224 are repeated. A short wait time is implemented, e.g., 6 seconds, than a decision is made whether to: (1) run another cycle; (2) normal shutdown on drip blow through attained; (3) set drip evacuation failed critical alarm. The decision is made based on the following procedure.

In addition to analyzing pressure transmitter 16 rate of change, flow switch 90 may be consulted to verify that liquids are continuing to flow, i.e., ball 94 will be off of lower magnet switch 96 when liquids are flowing.

Steps if (2) "Normal Shutdown on Drip Blow Through Attained":

If "normal shutdown" is required and permitted, a short generator cool down time, e.g., 60 seconds in implemented, then generator 124 is instructed to shut down.

Steps if "Drip Evacuation Failed Critical Alarm" is Set:

Second valve or isolation valve 80 is immediately opened. Compressor 40 is instructed to begin running. In one embodiment, a variable speed drive is utilized to vary the compressor speed to a desired value. After bottom flow switch 96 is true, a wait period is initiated, e.g. 15 seconds, for liquids to be pushed back into the pipeline 12.

First valve or liquid flow valve 76 is opened and second valve or isolation valve 80 is closed. After second valve or isolation valve 80 is closed, a wait time is initiated, e.g., 15 seconds, for liquids to be pushed back into tank 14. Second valve or isolation valve 80 is then opened and liquid flow valve 76 is then closed. After first valve or liquid flow valve 76 is closed, a wait time is initiated, e.g., 15 seconds, for liquids to be pushed back into pipeline 12.

Compressor 40 is then instructed to stop.

Shut down commences. Second valve or isolation valve 80 is closed and, after a wait time, e.g. 60 seconds, generator 124 is shut down.

The above described procedure is designed to clear liquids from the system before shutting down.

Steps if "Drip Evacuation Failed Critical Alarm" is Set:

If isolation valve 80 develops a leak, then fluids will migrate up out of pipe 12 and into flow passageway 50, where the fluids will unseat ball 92 from lower magnet switch 96, which will be communicated to CPU 121. If ball 92 unseats when automatic liquid evacuation system 10 is in an idle state, then a run cycle should be triggered. After a run cycle, operator should be notified of a, "leaky isolation valve" condition.

Steps of the Heat Cycle:

If a determination is made that tank 14 requires heating, then generator 124 is started.

Liquid flow valve 76 is closed. After a short wait time, e.g., 1 second, isolation valve 80 is closed. After a short wait time, e.g., 5 seconds after voltage received from generator 124 or 1 second if generator 124 is already running, then power is directed to one of tank heaters 22a, 22b, 22c. Each of heat circuits 22a, 22b, and 22c run sequentially for a desired length of time, e.g., 5 minutes. Upon completion of the running of each of heaters 22a, 22b, and 22c, a determination is made whether a pressure relief stage for tank 14 is required.

If it has been determined that pressure relief of tank 14 is required, e.g., if tank pressure is 3 lbs. greater than pressure in pipe 12, then liquid flow valve and isolation valve 80 are opened.

Figure 6:
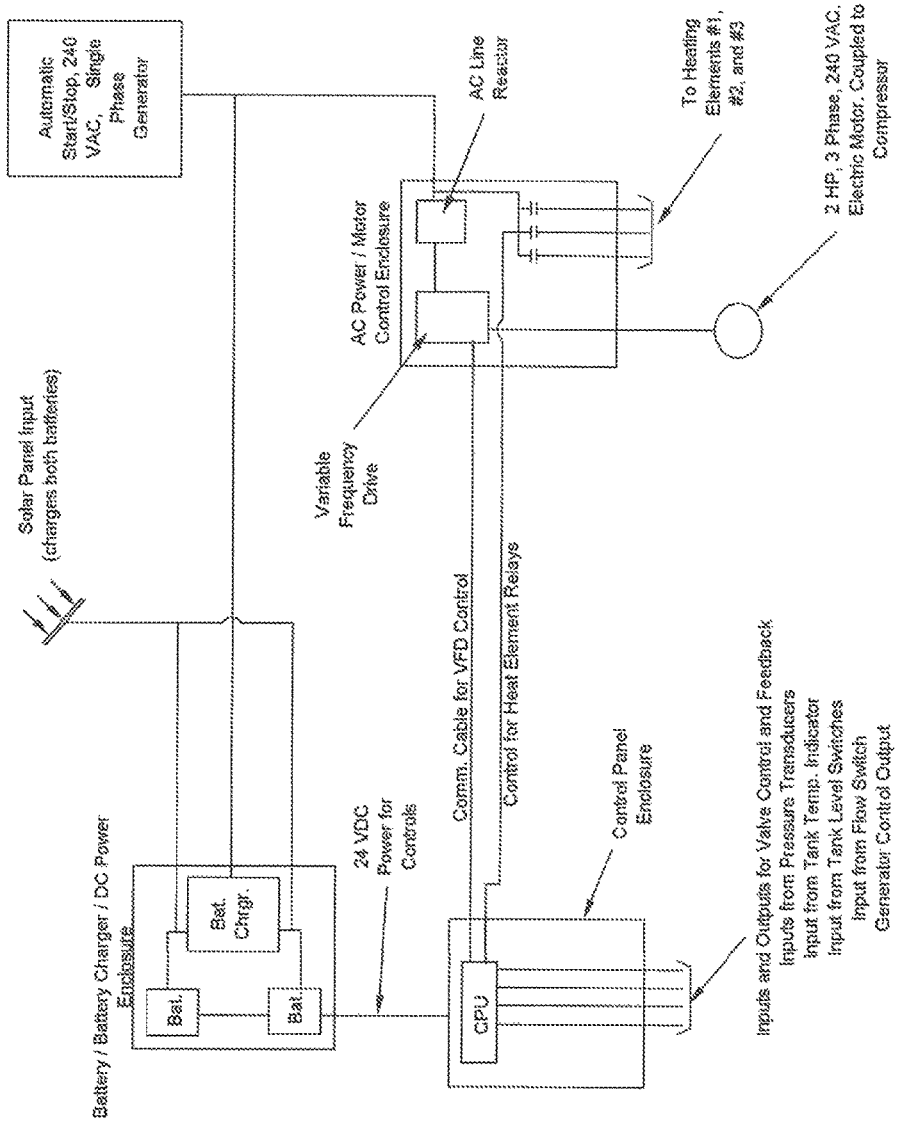
FIG. 6 is an electrical schematic of the automatic liquid evacuation system of the invention.

A wait time is implemented to allow pressure in tank 14 to bleed down to within 2.0 lbs. of the pressure in pipe 12. A wait time, e.g., 2 seconds, is implemented. Then liquid flow valve 76 and isolation valve 80 are closed. Pressure in tank 14 is checked. A determination is made whether temperature in tank 14 has been raised to a pre-determined set point. If the temperature is below the set point, then a secondary heat cycle is initiated. The secondary heat cycle will be run again if necessary until a maximum number of heat cycle runs is achieved or until the temperature in tank 14 is raised to the pre-determined set point. An example electrical schematic of system 10 is shown in FIG. 6.

Benefits:

The application of the invention provides an ability to discharge evacuation gas from tank 14 into pipe 12 and to remove fluids from pipe 12 via the same tap, i.e., at lower end 56 of flow passageway 50.

The method of the invention provides an ability to do multiple secondary run cycles to remove all liquids from pipe 12 during a primary run cycle.

An auto tune feature may be provided wherein times between primary run cycles are adjusted according to liquid flow timer, i.e., the time to complete the liquid flow phase may be noted and compared to an ideal value. If the time to complete the liquid flow phase is longer than the ideal value, then the time between primary run cycles may be shortened. Alternatively, if the time to complete the liquid flow phase is shorter than the ideal value then the time between primary run cycles may be lengthened.

A pipeline blow through determination made by pressure rate of change logic may be customized by logic for each specific tank liquid level.

The use of flow through switch 90 allows for detection of a leak in isolation valve 80.

The use of tank heaters provides an ability to prevent freezing of liquids in tank 14 and to allow emptying of liquids from tank 14 in virtually any conditions.

If liquids remain in drip or valve pressure flow assembly 110 after a failed primary run cycle, valves 76, 80, and compressor 40, operate in a fashion that removes all liquids from above ground assemblies and pushes the fluids back below ground to prevent freezing in housings and valves.

II. Automatic Liquid Evacuation System and Vapor Prevention Unit

Figure 7A:
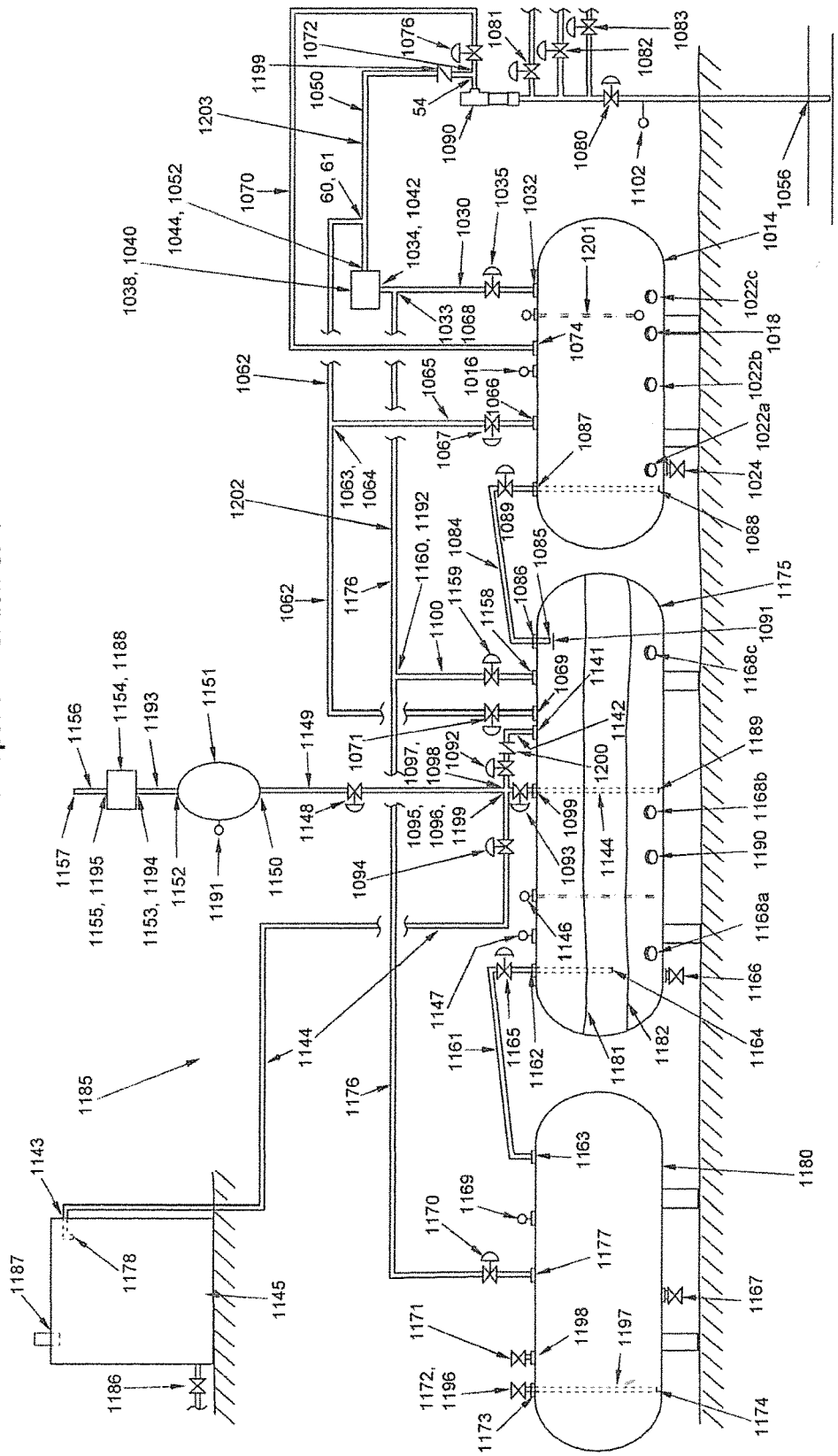
FIG. 7A is a schematic of the vapor prevention unit in conjunction with an automatic liquid evacuation system of the invention.

Referring to FIGS. 7A, 7B, shown is vapor prevention system, designated generally 1185, for evacuating liquids from an automatic liquid evacuation system tank 1014, while keeping the liquids under pressure during handling and storage processes. Automatic liquid evacuation system tank 1014 receives liquids from various sources. The liquids are transferred to tank 1014 of ALES system via ALES liquid flow line 1, 1070. Details of operation and functionality of the ALES are disclosed in previous documents.

The vapor prevention system includes tank 1175 for receiving liquids from an automatic liquid evacuation system tank 1014 and separating the water from the condensate/liquid hydrocarbons contained in the liquids. System also includes a tank 1180 for receiving and storing condensate separated from water in tank 1175. Also included is tank 1145 for receiving and storing water separated from condensate in tank 1175.

Tank 1175 is provided with tank pressure transducer 1147 for measuring the pressure in tank 1175 and first temperature sensor 1190 for measuring the temperature of fluids in tank 1175.

Tank 1175 has dual liquid level sensor 1146 for measuring level of condensate 1181 and level of water 1182 in tank 1175. Tank heater 1168 is provided for heating liquids in tank 1175 when first temperature sensor 1190 indicates that ambient temperature poses a freezing risk to liquids in tank 1175.

In one embodiment, tank heater 1168 is comprised of a plurality of tank heater units, e.g., tank heater units 1168a, 1168b, and 1168c. Tank drain line 1166 is provided for manually draining tank 1175.

Tank 1180 is provided with tank pressure transducer 1169 for measuring the pressure in tank 1180. Tank drain line 1167 is provided for manually draining tank 1180. Tank stinger 1197 is provided as a backup to facilitate manual removal of liquids from tank 1180.

Tank 1145 is equipped with manual load line 1186 to facilitate draining water tank 1145 into truck and vent to atmosphere 1187 to prevent any pressure build up inside water tank 1145.

Liquid flow line 1084 allows liquid to flow from automatic liquid evacuation system tank 1014 to tank 1175 of the invention.

Liquid flow line 1161 allows condensate to flow from tank 1175 to tank 1180 after separation process in tank 1175.

Water flow line 1144 allows water to flow to water tank 1145 after separation process in tank 1175.

Air lines 1193 and 1149, and volume tank 1151 facilitate blowing water line 1144 clear after water flows from tank 1175 to tank 1145.

Water drain back line 1142 is provided to drain water trapped by vacuum in water line 1144 back into tank 1175.

Flow passageway 1, 1050, flow passageway 2, 1062 and flow passageway 3, 1065 provide a means to selectively pressurize either tank 1014 or tank 1175 to facilitate liquid transfer.

Tank evacuation line 1, 1030, tank evacuation line 2, 1176, and tank evacuation line 3, 1100, allow selective pressure reduction of tanks 1014, 1175, or 1180 to facilitate liquid transfer.

Air compressor 1154 is provided to compress air to clear water line 1144 of water to prevent freezing. A motor 1188, preferably a variable speed drive, powers air compressor 1154.

Air compressor 1154 has an intake 1195 and a discharge 1194. Intake communicates with atmosphere through suction line 1156. Air compressor suction line 1156 has first end 1157 in communication with atmosphere. Air compressor suction line 1156 has second end 1155 in communication with air compressor intake 1195.

Air line 1, 1193 has first end 1153 and second end 1152. Air line 1, 1193 has first end in communication with air compressor discharge 1194 and second end in communication with air volume tank 1151.

Air volume tank 1151 is provided with pressure transducer 1191. Pressure transducer 1191 is in communication with CPU 1121.

Air line 2 1149 has first end 1150 and second end 1095. First end 1150 is in communication with air volume tank 1151, preferably at the bottom of air volume tank 1151, and second end 1095 is in communication with water line 1144 at water line intermediate juncture 1, 1096.

Air line 2 has air valve 1148 for selectively isolating air volume tank 1151 and air compressor 1154 from water line 1144. Air line 2 air valve 1148 is preferably located on air line 2 1149 as close as practical to water line intermediate juncture 1, 1096.

Flow passageway 1, 1050 has upper end 1052, lower end 1056, intermediate juncture 1, 1060, and intermediate juncture 2, 1054. Flow passageway 1, 1050 upper end 1052 is in communication with compressor discharge 1044.

Flow passageway 1, 1050 has check valve, 1199. Check valve 1199 is located between intermediate juncture 1, 1060, and intermediate juncture 2, 1054, and as close as practical to intermediate juncture 2, 1054 of flow passageway 1, 1050.

Check valve 1199 permits flow of gas from compressor discharge 1044 to intermediate juncture 2, 1054, but prevents fluid from flowing towards intermediate juncture 1, 1060.

Flow passageway 2 1062 has upper end 1061, intermediate juncture 1063, and lower end 1069. Upper end 1061 is in communication with flow passageway 1, 1050 and lower end 1069 is in communication with tank 1175.

Flow passageway 2, 1062 has aging tank evacuation valve 1071 for selectively isolating tank 1175 from compressor discharge 1044.

Flow passageway 3, 1065 has upper end 1064, and lower end 1066. Upper end 1064 is in communication with flow passageway 2, 1062 and lower end 1066 is in communication with ALES tank 1014.

Flow passageway 3, 1065 has ALES tank discharge valve 1067 for selectively isolating ALES tank 1014 from compressor discharge 1044

Tank gas evacuation line 1, 1030 has first end 1032, intermediate juncture 1033, and second end 1034. Tank evacuation line 1, 1030 first end 1032 is in communication with ALES tank 1014 and second end 1034 is in communication with compressor intake 1042.

Tank evacuation line 1, 1030 has ALES tank evacuation valve 1035 for selectively isolating ALES tank 1014 from compressor intake 1042. ALES tank evacuation valve 1035 is located between intermediate juncture 1033 and first end 1032.

Tank evacuation line 2, 1176 has first end 1068, intermediate juncture 1192, and second end 1177. Tank evacuation line 2, 1176 first end 1068 is in communication with tank evacuation line 1, 1030 and second end 1177 is in communication with tank 1180.

Tank evacuation line 2, 1176 has condensate tank evacuation valve 1170 for selectively isolating condensate tank 1180 from compressor intake 1042. Condensate tank evacuation valve 1170 is located between intermediate juncture 1192 and second end 1177.

Tank evacuation line 3, 1100 has first end 1158 and second end 1160. First end 1158 is in communication with aging tank 1175 and second end 1160 is in communication with Tank evacuation line 2, 1176.

Tank evacuation line 3, 1100 has aging tank evacuation valve 1159 for selectively isolating aging tank 1175 from compressor intake 1042.

Liquid flow line 2, 1084 has inlet end 1088 and outlet end 1085. Liquid flow line 2, 1084 extends into ALES tank 1014 through ALES tank entrance 1087.

Liquid flow line 2, 1084 extends into ALES tank 1014 enough to allow liquid flow line 2 inlet end 1088 to be approximately 1 inch from the bottom of ALES tank 1014. Liquid flow line 2 inlet end 1088 is in communication with ALES tank 1014 at this point.

Liquid flow line 2, 1084 extends into aging tank 1175 through liquid flow line 2 aging tank entrance 1086. Liquid flow line 2, 1084 extends into aging tank 1175 enough, e.g., 4 inches, to allow diffuser 1091 to be fitted to liquid flow line 2 outlet end 1085.

Liquid flow line 2 outlet end 1085 is in communication with aging tank 1175 at this point. Diffuser 1091 will allow additional fluids to be received into aging tank 1175 through liquid flow line 2, 1084 with as little agitation of liquids in aging tank 1175 as possible.

Liquid flow line 2, 1084 has liquid flow line 2 liquid flow valve 1087 for selectively allowing liquid to flow from ALES tank 1014 to aging tank 1175. No part of liquid flow line 2, 1084 will be installed horizontal.

This facilitates liquid drain back to either ALES tank 1014 or aging tank 1175. Liquid flow line 2, 1084 Liquid flow line 2 liquid flow valve 1089 is located between ALES tank entrance 1087 and aging tank entrance 1086, preferably as close as practical to the highest point on liquid flow line 2, 1084.

Liquid flow line 3, 1161 has inlet end 1164 and outlet end 1163. Liquid flow line 3, 1161 extends into aging tank 1175 through aging tank entrance 1162.

Liquid flow line 3, 1161 extends into aging tank 1175 enough to allow liquid flow line 3 inlet end 1164 to be approximately midway between bottom of aging tank 1175 and top of aging tank 1175. Liquid flow line 3 inlet end 1164 is in communication with aging tank 1175 at this point.

Liquid flow line 3 outlet end 1163 is in communication with condensate tank 1180. Liquid flow line 3, 1161 has liquid flow line 3 liquid flow valve 1165 for selectively allowing condensate to flow from aging tank 1175 to condensate tank 1180.

Liquid flow line 3, 1161 liquid flow line 3 liquid flow valve 1165 is located between aging tank entrance 1162 and liquid flow line 3 outlet end 1163.

Water line, 1144 has inlet end 1189, intermediate juncture 1 1096, intermediate juncture 2 1097, and outlet end 1178. Water line, 1144 extends into aging tank 1175 through aging tank entrance 1099.

Water line, 1144 extends into aging tank 1175 enough to allow water line inlet end 1189 to be approximately 1 inch from the bottom of aging tank 1175. Water line inlet end 189 is in communication with aging tank 1175 at this point.

Water line, 1144 extends into water tank 1145 at water tank water line entrance 1143. Water line outlet end 1178 is in communication with water tank 1145 at this point. Water tank water line entrance 1143 and water line outlet end 1178 are preferably located higher than the water tank 1145 water level will be permitted.

Water line 1144 has water line isolation valve 1093 for selectively isolating water line inlet end 1189. Water line isolation valve 1093 is located on water line 1144 between intermediate junctures 1196 and 1297, and water line aging tank entrance 199, preferably as close as practical to intermediate junctures 1196 and 1297.

Water line 1144 also has water line flow valve 1094 for selectively isolating water line outlet end 1178. Water line flow valve 1094 is located on water line 1144 between intermediate junctures 1196 and 1297, and water line water tank entrance 1143, preferably as close as practical to intermediate junctures 1196 and 1297.

Water drain back line, 1142 has first end 198, and second end 1141. Water drain back line first end 1098 is in communication with water line 1144 at water line intermediate juncture 2, 1097. Water drain back line second end 1141 is in communication with aging tank 1175.

Water drain back line 1142 has water drain back valve 1092 for selectively isolating aging tank 1175 from water line 1144. Water drain back valve 1092, is located as close as practical to water drain back line first end 1098.

Water drain back line 1142 also has water drain back line check valve 1200, for preventing air from entering aging tank 1175. Water drain back line check valve 1200 is located between water drain back line second end 1141 and water drain back valve 1092, as close as practical to water drain back valve 1092.

Water drain back line check valve 1200 allows flow from water drain back line second end 1141 to water drain back line first end 1098.

Control panel 1120 is provided for receiving operator commands and for delivering operator commands to CPU 1121. CPU 1121 is provided for activating various components of system 1185, as will be explained below. Battery 1122 provides power to control panel 1120 and CPU 1121. Generator 1124 communicates with compressor 1040, tank heater 1022, and with battery 1122 for providing power as may be required. These components are shared with the associated ALES unit with which the vapor prevention system 1185 operates.

Vapor Prevention Unit Operation Sequence Step Description:

In one embodiment, vapor prevention system, 1185, operates in conjunction with an automatic liquid evacuation system, and functions by executing the following operational sequence steps; 1) aging, 2) water level adjustment, 3) condensate level adjustment, 4) ALES tank liquid transfer to aging tank, 5) repeat cycle starting with aging.

Referring to FIGS. 7A, 7B and to the flow chart in FIGS. 8A-8D, block 1900, in step 1, aging, the system allows time for liquids that have previously been transferred from the ALES tank 1014 to the aging tank 1175 to separate. This time allows water 1182 to fall to the bottom of aging tank 1175 and condensate/liquid hydrocarbons 1181 to rise to the top of the liquid level in aging tank 1175 as shown in schematic FIGS. 7A-7B.

The time duration for aging is operator specified. When the length of time specified by the operator for aging has passed, e.g., 6 hours, the system transitions to step 2 of the operation sequence, water level adjustment.

If the cut level 1182, which is the transition level between the water and condensate in aging tank 1175, and is indicated by the aging tank liquid level transducer, 1146, approaches a level too close to the liquid flow line 3 inlet end 1164, or the level of the condensate, 1181 gets to a high level set point, as described in block 1900, the system is forced to advance to step 2, water level adjustment.

If the time is less than an operator determined minimum aging time, as described in block 1902, an aging tank unload time alarm is set prior to the transition to step 2, water level adjustment, as described in block 1904. If aging tank unload time alarm is set, determination is made to proceed with tank level adjustments or not, as in block 1906.

If no, do not proceed with tank level adjustments, then shut down on aging tank unload time alarm, as in block 1908. If system shuts down on aging tank unload time alarm at this point, then no cross contamination of condensate tank 1180 or water tank 1145 can occur.

If yes, proceed with tank level adjustments, system looks at the cut level 1182 of liquids in aging tank 1175, as indicated by level transducer 1146, as shown in block 1910 and determines if cut level 1182 is at or below minimum set point.

If yes, then skip water level adjustment described in block 1912, and proceed to evaluate total liquid level as in block 1914.

If no, cut level 1182 is not at or below minimum set point, then adjust water level as shown in block 1912. A detailed description of the steps in water level adjustment are shown below in the section entitled, "Operation Sequence Steps for Step 2, Water Level Adjustment".

If water level adjustment to minimum cut level 1182 was made, as in block 1912, or if that step was skipped, as in block 1910, the total liquid level 1181 contained in aging tank 1175 is evaluated. A determination if the level is at or below the minimum level set point is made.

If yes, then skip the condensate level adjustment in block 1916, and proceed to evaluate the ALES tank 1014 liquid level as described in block 1918.

If no, the total liquid level 1181 in aging tank 1175 is not at or below minimum set point, proceed with condensate level adjustment as described in block 1916. A detailed description of the steps in condensate level adjustment are shown below in the section entitled, "Operation Sequence for Step 3, Condensate Level Adjustment".

If condensate level adjustment to minimum level was made, as in block 1916, or if that step was skipped, as in block 1914, the liquid level contained in ALES tank 1014 is evaluated, as described in block 1918. A determination if the level is at zero is made.

If yes, then skip the transfer liquids from ALES tank 1014 step described in block 1920, and begin another aging step as described in block 1900.

If no, the liquid level in ALES tank 1014 is not at zero, then transfer liquids from ALES tank 1014 to aging tank 1175 as described in block 1920. A detailed description of the steps in transferring liquids from ALES tank 1014 to aging tank 1175 are shown below in the section entitled, "Operation Sequence Steps for Step 4, Transferring Liquids from ALES Tank 1014 to Aging Tank 1175".

Operation Sequence Steps for Step 2, Water Level Adjustment.

In step 2, aging tank water level adjustment, as described in block 1912, generator 1124 is instructed to start as indicated in block 1932 and after CPU 1121 receives indication that generator 1124 is producing power, as stated in block 1934, valves are positioned as follows: ALES valves, liquid flow line 1 liquid flow valve 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170 are closed, as described in block 1936.

After valves, liquid flow line 1 liquid flow valve 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170, are verified in closed position by CPU 1121, as in block 1938, water line isolation valve 1093, and water line flow valve 1094, are instructed to open as indicated in block 1940. Water line isolation valve 1093, and water line flow valve 1094, are verified open as indicated in block 1942.

This allows water to flow from aging tank 1175 to water tank 1145 through water line 1144. Water level 1182 in aging tank 1175 is monitored as indicated in block 1946 to ensure level is decreasing, and if not, aging tank water level reduction failure alarm is set, as in block 1948.

When water level 1182 decreases to minimum water level set point in aging tank 1175, water line isolation valve 1093 is instructed to close as in block 1952. Water line isolation valve 1093 is verified to be closed as in block 1954, and then air compressor 1154 is instructed to start as in block 1956.

When pressure in air volume tank 1151 increases to high air pressure set point as indicated by air pressure transducer 1191, in block 1958, compressor 1154 is instructed to stop as in block 1960, and air valve 1148 is instructed to open as in block 1962. Air valve 1148 is verified open as in block 1964.

Air volume tank 1151 pressure is monitored and when pressure as indicated by air volume tank pressure transducer 1191 to be at atmospheric pressure, as described in block 1966, air valve, 1148, and water line flow valve, 1094 are instructed to close as indicated in block 1968. Air valve, 1148, and water line flow valve, 1094 are verified to be closed as in block 1970.

Water drain back valve 1092 and water line isolation valve 1093 are opened as in block 1972. Water drain back valve 1092 and water line isolation valve 1093 are verified opened as indicated in block 1974.

One minute wait time is provided, as described in block 1976, for water trapped in water line isolation valve 1093 and water between water line isolation valve 1093 and water line inlet end 1189, to fall back to a level approximately equal to the level of the condensate 1181 in aging tank 1175. Water drain back valve 1092 and water line isolation valve 1093 are closed as in block 1978. Water drain back valve 1092 and water line isolation valve 1093 are verified closed as indicated in block 1980.

The process of purging the water line 1144 with compressed air, as described in blocks 1956 through 1970, and allowing the trapped water to fall back into the aging tank 1175, as described in blocks 1972 through 1980, is necessary to evacuate the line of as much water as possible to prevent freezing and blockage of water line 1144.

After water drain back valve 1092 and water line isolation valve 1093 are verified closed as indicated in block 1980, then proceed to step 3, aging tank condensate level adjustment as stated in block 1982. A detailed description of the steps in aging tank condensate level adjustment are shown below in the section entitled, "Operation Sequence Steps for Step 3, Condensate Level Adjustment".

Operation Sequence Steps for Step 3, Condensate Level Adjustment

In step 3, aging tank condensate level adjustment, as described in block 1916, generator 1124 is instructed to start, if not already running, as indicated in block 2032 and after CPU 1121 receives indication that generator 1124 is producing power, as stated in block 2034, valves are positioned as follows: ALES valves, liquid flow line 1 liquid flow valve 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170 are closed, as described in block 2036.

After valves, liquid flow line 1 liquid flow valve 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170, are verified in closed position by CPU 1121, as in block 2038, then aging tank discharge valve 1071, and condensate tank evacuation valve 1170 are instructed to open as indicated in block 2040. Aging tank discharge valve 1071, and condensate tank evacuation valve 1170, are verified open as indicated in block 2042.

Compressor 1040, is instructed to start as in block 2044. Pressures in aging tank 1175 and in condensate tank 1180 are monitored, as described in block 2046, to ensure pressure in aging tank 1175 is increasing and pressure in condensate tank 1180 is decreasing.

If no, then aging tank/condensate tank differential pressure fail alarm is set, as indicated in block 2048.

If yes, pressure in aging tank 1175 is increasing and pressure in condensate tank 1180 is decreasing, then is aging tank 1175 and condensate tank differential pressure at set point, as indicated in block 2050.

If no, continue monitoring pressure changes.

If yes, aging tank 1175 pressure and condensate tank 1180 pressure differential is at or above set point pressure differential, as described in block 2050, then stop compressor 1040, as indicated in block 2052.

Aging tank discharge valve 1071 and condensate tank evacuation valve 1170 are instructed to close as indicated in block 2054. Aging tank discharge valve 1071 and condensate tank evacuation valve 1170 are verified closed as in block 2056.

Liquid flow line 3 liquid flow valve 1165 is instructed to open as indicated in block 2058, and liquid flow line 3 liquid flow valve 1165 is verified open as indicated in block 2060.

Total liquid level 1181, in aging tank 1175, is monitored and condensate tank 1180 pressure is monitored, as indicated in block 2062, to ensure liquid level 1181 in aging tank 1175 is decreasing and pressure in condensate tank 1180 is increasing.

If not, aging tank/condensate tank liquid transfer alarm is set, as in block 2064.

If yes, liquid level 1181 in aging tank 1175 is decreasing and pressure in condensate tank 1180 is increasing, as in block 2062, then is aging tank 1175 total liquid level 1181 at or below set point liquid level, as indicated in block 2066?

If no, continue to monitor aging tank 1175 liquid level 1181 and condensate tank 1180 pressure changes, as described in block 2062.

If yes, aging tank 1175 total liquid level 1181 is at or below set point liquid level, as indicated in block 2066, then close liquid flow line 3 liquid flow valve 1165, as indicated in block 2068. Liquid flow line 3 liquid flow valve 1165 is then verified closed as indicated in block 2070.

Aging tank evacuation valve 1159 and condensate tank evacuation valve 1170 are instructed to open as indicated in block 2072. Aging tank evacuation valve 1159 and condensate tank evacuation valve 1170 are verified opened as indicated in block 2074.

Wait time, e.g., 1 minute, for aging tank 1175, pressure and condensate tank 1180, pressure to equalize in value, as described in block 2076, then close aging tank evacuation valve 1159 and condensate tank evacuation valve 1170, as indicated in block 2078. Verify aging tank evacuation valve 1159, and condensate tank evacuation valve 1170, are closed as indicated in block 2080.

Then check liquid level in ALES tank 1014, as indicated in block 2082. Is ALES tank 1014 liquid level at zero?

If yes, normal shutdown and begin aging, step 1, as indicated in block 1900. Steps of Normal Shutdown are described in detail below in the section entitled, "Steps for Normal Shutdown".

If no, ALES tank 1014 liquid level is not at zero, proceed to step 4, transfer liquids from ALES tank 1014 to aging tank 1175, as described in block 2086. A detailed description of the steps in transferring liquids from ALES tank 1014 to aging tank 1175 are shown below in the section entitled, "Operation Sequence Steps for Step 4, Transferring Liquids from ALES Tank 1014 to Aging Tank 1175".

Operation Sequence Steps for Step 4, Transferring Liquids from ALES Tank 1014 to Aging Tank 1175:

In step 4, transferring liquids from ALES tank 1014 to aging tank 1175, as described in block 1920, generator 1124 is instructed to start, if not already running, as indicated in block 2132 and after CPU 1121 receives indication that generator 1124 is producing power, as stated in block 2134, valves are positioned as follows: ALES valves, liquid flow line 1 liquid flow valve, 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170 are closed, as described in block 2136.

After valves, liquid flow line 1 liquid flow valve 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170, are verified in closed position by CPU 1121, as in block 2138, then ALES tank discharge valve 1067, and aging tank evacuation valve 1159, are instructed to open as indicated in block 2140. ALES tank discharge valve 1067, and aging tank evacuation valve 1159, are verified open as indicated in block 2142.

Compressor 1040, is instructed to start as in block 2144. Pressures in ALES tank 1014 and aging tank 1175 are monitored, as described in block 2146, to ensure pressure in ALES tank 1014 is increasing and pressure in aging tank 175 is decreasing.

If no, then ALES tank/aging tank differential pressure fail alarm is set, as indicated in block 2148.

If yes, pressure in ALES tank 1014 is increasing and pressure in aging tank 1175 is decreasing, then is ALES tank 1014 pressure and aging tank 1175 pressure differential at set point, as indicated in block 2150?

If no, continue monitoring pressure changes.

If yes, ALES tank 1014 pressure and aging tank 1175 pressure differential is at or above set point pressure differential, as described in block 2150, then stop compressor 1040, as indicated in block 2152. ALES tank discharge valve 1067 and aging tank evacuation valve 1159 are instructed to close as in block 2154. ALES tank discharge valve 1067 and aging tank evacuation valve 1159 are verified closed as in block 2156.

Liquid flow line 2 liquid flow valve 1089 is instructed to open as indicated in block 2158, and liquid flow line 2 liquid flow valve 1089 is verified open as indicated in block 2160.

ALES tank 1014 pressure is monitored and total liquid level 1181 in aging tank 1175 is monitored, as indicated in block 2162, to ensure pressure in ALES tank 1014 is decreasing and total liquid level in aging tank 1175 is increasing.

If not, ALES tank/aging tank liquid transfer alarm is set, as in block 2164.

If yes, pressure in ALES tank 1014 is decreasing and total liquid level in aging tank 1175 is increasing, as in block 2162, then is ALES tank 1014 liquid level at zero, as indicated by ALES tank liquid level indicator 1201, and has sufficient blow through to clear all valves and piping occurred, as indicated in block 2166.

Sufficient gas blow through is determined by monitoring the aging tank 1175 pressure rate of change as described in detail in the section entitled, "Rate of Change Compression".

If no, ALES tank 1014 liquid level is not at zero, and sufficient blow through to clear all valves and piping has not occurred, continue to monitor ALES tank 1014, pressure changes, and aging tank 1175 total liquid level 1181, as described in block 2162.

If yes, ALES tank 1014 liquid level is at zero as indicated by ALES tank liquid level indicator 1201, and sufficient blow through to clear all valves and piping has occurred, as indicated in block 2166, then wait time, e.g., 1 minute, for ALES tank 1014 pressure, and aging tank 1175 pressure, to equalize, as indicated in block 2168.

Close liquid flow line 2 liquid flow valve 1089, as indicated in block 2170. Liquid flow line 2 liquid flow valve 1089 is then verified closed, as indicated in block 2172. Then normal shutdown is instructed, as described in block 2174. The steps for normal shutdown are described below in the section entitled, "Steps for Normal Shutdown".

Steps for Normal Shutdown:

Steps for Normal Shutdown are as follows: ALES valves, liquid flow line 1 liquid flow valve 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170 are closed, as described in block 2176.

After valves, liquid flow line 1 liquid flow valve, 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170, are verified in closed position by CPU 1121, as in block 2178.

Generator 1124, is instructed to stop as stated in block 2180. Then repeat sequence beginning at Aging, step 1, block 1900, as indicated in block 2182.

Operational Sequence Steps to Shutdown on Alarm or Fault Condition:

Alarm or fault shutdown steps are as follows: Air compressor 1154 is instructed to stop and gas compressor 1040 is instructed to stop.

Then liquid flow line 1 liquid flow valve 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170 are closed.

Liquid flow line 1 liquid flow valve 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170 are verified in closed position by CPU 1121.

Generator 1124 is instructed to stop, the system is disabled, and no further sequence steps are permitted until operator intervention.

In one embodiment, during step 1, aging, ALES isolation valve 1080, liquid flow line 1 liquid flow valve 1076, ALES tank evacuation valve 1035, aging tank evacuation valve 1159, and condensate tank evacuation valve 1170, will be opened and verified opened. This is done to ensure pressure equalization between the gas pipeline or other apparatus in which the ALES unit is connected, and the ALES tank 1014, aging tank 1175, and condensate tank 1180. This will also ensure adequate pressure is maintained on liquids contained in the ALES unit tank 1014 and the vapor prevention system 1185.

Also, in one embodiment, the ALES unit is connected to a pipeline, vessel, tank, container, or well that is operated below atmospheric pressure and the vapor prevention unit is fitted with two additional valves.

One additional valve is located in tank evacuation line 2, 1176, between tank evacuation line 2 first end 1068, and tank evacuation line 2 intermediate juncture, 1192, as indicated by 1202.

The second additional valve is located in flow passageway 1, 1050, between flow passageway 1 intermediate juncture 1, 1060, and flow passageway 1 check valve, 1199, as indicated by 1203.

In this embodiment, ALES isolation valve 1080, liquid flow line 1 liquid flow valve 1076, ALES tank evacuation valve 1035, aging tank evacuation valve 1159, and condensate tank evacuation valve 1170, the two optional valves discussed above, placed as indicated by 1202 and 1203, generator 1124, and compressor 1040, are operated in a fashion that applies an operator specified amount of positive pressure on the liquids contained in the aging tank 1175, and the condensate tank 1180.

This is done to prevent vaporization of fluids contained in these tanks, even when the ALES unit and associated pipeline, vessel, tank, container, or well is operated at or below atmospheric pressure. This also enables the vapor prevention unit to be operated at pressures well above what the ALES and associated apparatus are being operated.

Steps of the Heat Cycle:

If a determination is made that aging tank 1175 requires heating, then generator 1124 is started, if not already running.

ALES valves, liquid flow line 1 liquid flow valve 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170 are closed.

Liquid flow line 1 liquid flow valve 1076, ALES isolation valve 1080, scrubber dump valve 1, 1081, scrubber dump valve 2, 1082, and scrubber dump valve 3, 1083, and vapor prevention unit valves, ALES tank evacuation valve 1035, ALES tank discharge valve 1067, liquid flow line 2 liquid flow valve 1089, aging tank evacuation valve 1159, aging tank discharge valve 1071, water drain back valve 1092, water line isolation valve 1093, water line flow valve 1094, air valve 1148, liquid flow line 3 liquid flow valve 1165, and condensate tank evacuation valve 1170, are verified in closed position by CPU 1121.

After a short wait time, e.g., 5 seconds after voltage received from generator 1124 or 1 second if generator 1124 is already running, then power is directed to one of tank heaters 1168a, 1168b, or 1168c. Each of heat circuits 1168a, 1168b, and 1168c run sequentially for a desired length of time, e.g., 5 minutes. Upon completion of the running of each of heaters 1168a, 1168b, and 1168c, a determination is made whether a pressure relief stage for aging tank 1175 is required.

If it has been determined that pressure relief of aging tank 1175 is required, e.g., if tank pressure is 3 lbs. greater than pressure in ALES tank 1014, then liquid flow line 1 liquid flow valve 1076, ALES isolation valve 1080, ALES tank evacuation valve 1035, and aging tank evacuation valve 1159 are opened.

A wait time is implemented to allow pressure in aging tank 1175 to bleed down to within 2.0 lbs. of the pressure in ALES tank 1014. A wait time, e.g., 2 seconds, is implemented.

Then liquid flow line 1 liquid flow valve 1076, ALES isolation valve 1080, ALES tank evacuation valve 1035, and aging tank evacuation valve 1159, are closed. Liquid flow line 1 liquid flow valve 1076, ALES isolation valve 1080, ALES tank evacuation valve 1035, and aging tank evacuation valve 1159, are verified closed.

Figure 9:
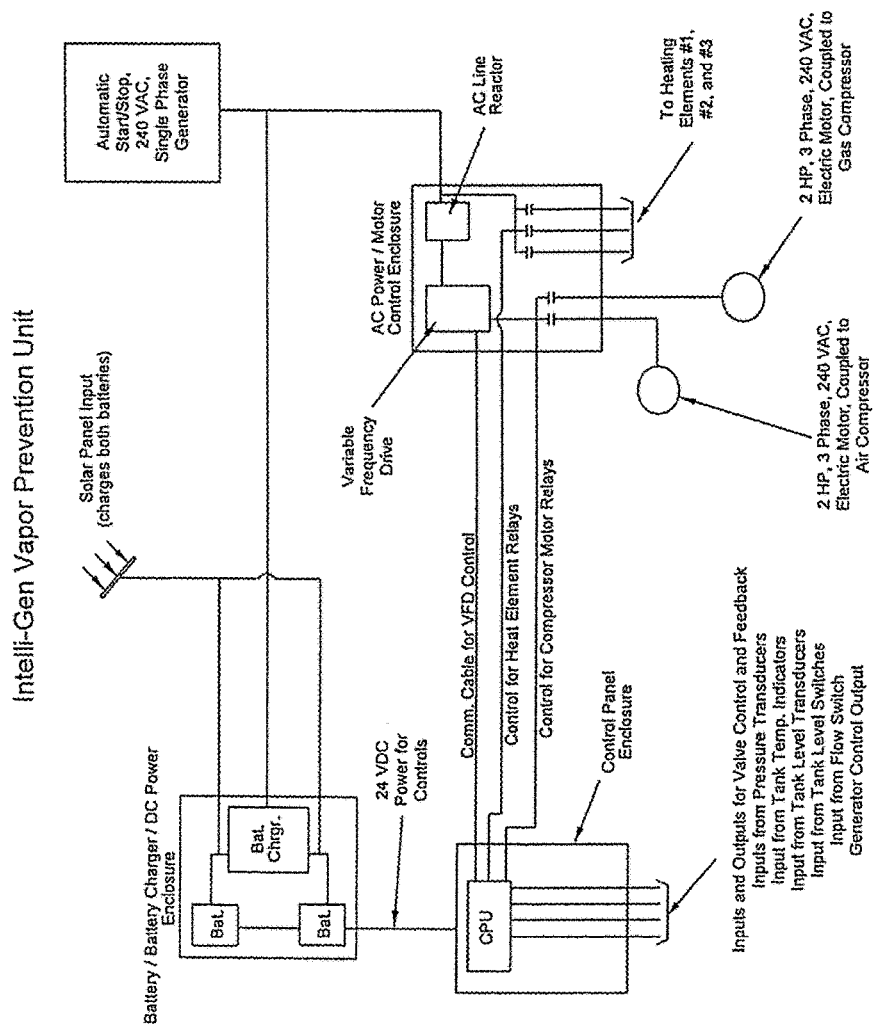
FIG. 9 is an electrical schematic of the automatic liquid evacuation system of the invention.

If it has been determined that the temperature in the aging tank 1175 has not reached the high temperature set point specified by the operator, another heat cycle is run, consisting of the steps described above in the "Steps of the Heat Cycle". An example electrical schematic is shown in FIG. 9.

These steps are repeated until one of two results occur, (1) the temp in aging tank 1175 reaches a predetermined set point, which results in a Normal Shutdown, described above, or (2) the temperature in aging tank 1175, has not reached its predetermined set point, and the number of heat cycles permitted by the operator has been reached. This results in a Temperature Control Fail alarm.

If a Temperature Control Fail alarm is set, generator 1124 is instructed to stop, and the heat functionality of the vapor prevention unit 1185 is disabled. If temperature control is critical to the particular application, all vapor prevention unit 1185 functionality would be disabled.

In one embodiment, the vapor prevention unit regulates the velocity of the fluids traveling through liquid flow line 2, 1084, during step 4, the transfer of fluids from ALES tank 1014 to aging tank 1175 to prevent agitation of fluids in aging tank 1175.

The following five paragraphs describe the process the vapor prevention unit 1185 uses to regulate the speed of the fluid, if required, as it travels through liquid flow line 2, 1084, during the transfer of fluids from the ALES tank 1014 to the aging tank 1175.

The speed of the fluid traveling through liquid flow line 2, 1084, from ALES tank 1014, is directly related to the speed in which the aging tank 1175 pressure, as indicated by the aging tank pressure transducer 1147 increases in value. Logic is in place to accurately determine the rate in which the aging tank 1175 pressure increases. This logic is described below in the following paragraphs.

An aging tank 1175 pressure rate of change set point must be determined that ensures speed of the fluid as it travels through liquid flow line 2, 1084, will be at a velocity that will not cause any agitation of the fluids in aging tank 1175. Changes in aging tank 1175 to ALES tank 1014 differential pressures, and changes in tank liquid levels may require altering the aging tank 1175 pressure rate of change set point, as the liquid flow progresses.

Using existing logic to determine aging tank 1175 pressure rate of change, the vapor prevention unit 1185 will regulate a fluid speed control valve, installed in place of liquid flow line 2 liquid flow valve 1089 in a fashion that will maintain the aging tank 1175 pressure rate of change at the tank pressure rate of change set point, described above. This functionality will ensure the speed of the fluid as it travels through liquid flow line 2, 1084, will not create excessive agitation of the fluids in aging tank 1175.

In this embodiment, when the ALES tank liquid level indicator 1201 indicates the level of fluid in the ALES tank 1014 to be zero, the regulation of the fluid speed control valve 1089 will cease and the valve will be held in the exact position to which it was last regulated, prior to the ALES tank liquid level indicator 1201 reaching zero. This will facilitate the ability of the blow through calculations to accurately determine if sufficient blow through has occurred. Blow through calculations and determination processes are described in detail in the section entitled, "Rate of Change Compression".

Method of determining aging tank 1175 pressure rate of change: Measurements from aging tank pressure transducer 1147 are taken at short intervals, e.g., every second, during the liquid flow phase. CPU 1121 uses these measurements to determine a rate of change in the measured pressure of the aging tank 1175.

The following six paragraphs describe the process the vapor prevention unit 1185 uses to determine if sufficient gas blow through has occurred after a liquid transfer from ALES tank 1014, to aging tank 1175, process. The accurate determination of this gas blow through is necessary to ensure all liquids have been successfully evacuated from above ground piping and valves in order to prevent freezing of the liquids in piping and valve assemblies.

Measurements from aging tank pressure transducer 1147 are taken at short intervals, e.g., every second, during the liquid flow phase. CPU 1121 uses these measurements to determine a rate of change in the measured pressure of the aging tank pressure transducer 1147. CPU 1121 compares this rate of change with a database of expected rates of change, e.g., when liquids are flowing in the liquid flow phase of step 4, an aging tank 1175 pressure rate of change of 0.4 lbs./minute to 0.8 lbs./minute may be expected. However, if the measured rate of change is substantially greater, e.g., 0.1 lbs./second, then the CPU determines that fluids have been removed from ALES tank 1014 and that gas blow through has occurred. A rule of thumb is that an increase in pressure rate of change of 0.8 lbs./minute to 0.1 lbs./second is indicative of a gas blow through condition. If the substantially greater rate of change is not achieved during the liquid flow phase, then CPU 1121 determines that gas blow through has not occurred, that fluids could still remain in piping and valve assemblies, and that a decision to run another cycle should be implemented.

Rate of Change Compression:

Referring to FIG. 4, shown is an example tank pressure rate of change profile for a 500 gallon tank. The numbers in the table of FIG. 4 are the values written to Register V2022 of CPU 1121 and they represent the number of 0.1 psi change per second in the tank pressure. The numbers are not the ALES tank/aging tank differential pressure, rather, the number represents the pressure in aging tank 1175. This means that with the tank level at 22", and the starting ALES tank/aging tank pressure differential at about 8.5 psi., the consistent, maximum rate of change in tank pressure observed in testing is 0.8 psi per second. This number becomes a constant for a particular tank size, tank liquid level, and piping configuration, and is written to a storage register, register V2022 of CPU 1121. After that, a momentary, instantaneous snapshot of the pressure in aging tank 1175 stored in register V2011 is then added to "storage" register, e.g., register V2022 of CPU 1121. The sum of the two is then written out to a "comparison" register, e.g., register V2024. Then the value residing in register V2024 is compared with the current pressure in aging tank 1175, e.g., register V2011, as it is continually rising in value. When the actual tank pressure register, e.g., register V2011 is greater than or equal to the value in register V2024, the logic makes a coil, C260 go high. When C260 goes high, two events take place. First a counter, CT20, is incremented 1 time, and second the logic takes the new tank pressure, register V2011, adds the constant to it again, writes the sum out to register V2024, to begin the comparison process all over again, then coil C260 is set back to low and is ready for the next comparison. Up to this point in the process, nothing is time based. We simply increment a counter each time the pressure increases to the value written in register V2024. That could take up to a minute, or as little as one second, it is irrelevant at this point in the process. All we are after at this point is a counter increment each time the pressure in aging tank 1175 rises to or above the given amount.

At this point, time is factored into the calculation. A set of timers, e.g., timers T152 and T154, are each set to time out after 3 seconds. These timers are "Fast" timers and are preferably very precise, e.g., accurate to a hundredth of a second. As these timers alternate timing and timing out, the counter, e.g., counter CT20, is reset each 3 second interval. When counter CT20 is reset, the "accumulated" value is set back to 0. The logic monitors the "accumulated" value of counter CT20 and when it sees that value equal to or greater than 3, sets another coil, e.g., coil C263, to high. Since counter CT20 only gets reset to 0 every 3 seconds, then if the "accumulated" value of counter CT20 is greater than or equal to 3, that means that during that particular 3 second time period, the "Rate of Change" in tank pressure was at least 0.8 psi per second, which equals 2.4 psi for the 3 second time period.

As shown in the chart of FIG. 4, the higher the liquid level in aging tank 1175, the faster the tank pressure rise and the shorter the time becomes to ALES tank 1014/aging tank 1175 pressure equalization. Because of this condition, to get a true indication of blow through at the lower liquid levels in aging tank 1175, we have the added benefit of looking at more than just one 3 second time period to determine blow through. As shown in the chart of FIG. 4, at 0 percent liquid level in aging tank 1175, significant "rate of change" in tank pressure continues much past one 3 second time period. For seven, 3 second intervals after the beginning of the measurement process, the rate of change is still equal to or greater than 0.1 psi per second, and 0.3 psi in a 3 second time period. A rate of change of 0.1 psi per second, which is 1 psi in 10 seconds, is a significant rate of tank pressure change for this application. This allows the rate of change calculations to be customized for each liquid level in aging tank 1175 to determine very accurately when an ALES tank 1014, blow through has occurred at the various tank liquid levels.

This brings us to where more than one 3 second time period is utilized (in the lower tank liquid levels) to determine an ALES tank 1014 blow through condition. This is accomplished with a counter, e.g., counter CT22, that counts each time the accumulated value of counter CT20 climbs higher than 3. A "preset" value is written to counter CT22 that is equal to the number of 3 second time periods desired to require in the calculation for a particular liquid level in aging tank 1175. When and if the counter CT22 "counts out", or reaches its preset value, it is then determined whether or not an ALES tank 1014 blow through permissive has occurred from the rate of change calculations. To write the number of 3 second time periods required in the calculation, we write a value to register V3004 according to the liquid level of aging tank 1175. This in turn sets the "preset value" of counter CT22 which determines the state of the permissive.

Benefits:

The application of the invention provides an ability to prevent fluids recovered from oil and natural gas production and transportation processes from vaporizing prior to sale and removal from the remote locations in which they were collected. The invention uniquely provides the ability to handle and store the liquids at pressures well above atmospheric pressure, e.g., 15 psig or even higher. These fluids contain methane, volatile organic compounds, and other harmful and dangerous air pollutants that enter the atmosphere when these liquids are allowed to vaporize at atmospheric pressure. There is equipment available that captures and recompresses these vapors into a natural gas pipeline, however the ability to retain the liquids in a liquid state offers, huge economic and environmental benefits.

The method of the invention provides an ability to do multiple secondary run cycles to remove all liquids from ALES tank 1014 during a primary run cycle.

A blow through determination made by pressure rate of change logic may be customized by logic for each specific tank liquid level.

The use of tank heaters provides an ability to prevent freezing of liquids in tank 175, and other associated tanks, if required by the application. An example detailed schematic is shown in FIG. 9.

Automatic Liquid Evacuation System for Plunger Lift Assist

Figure 10:
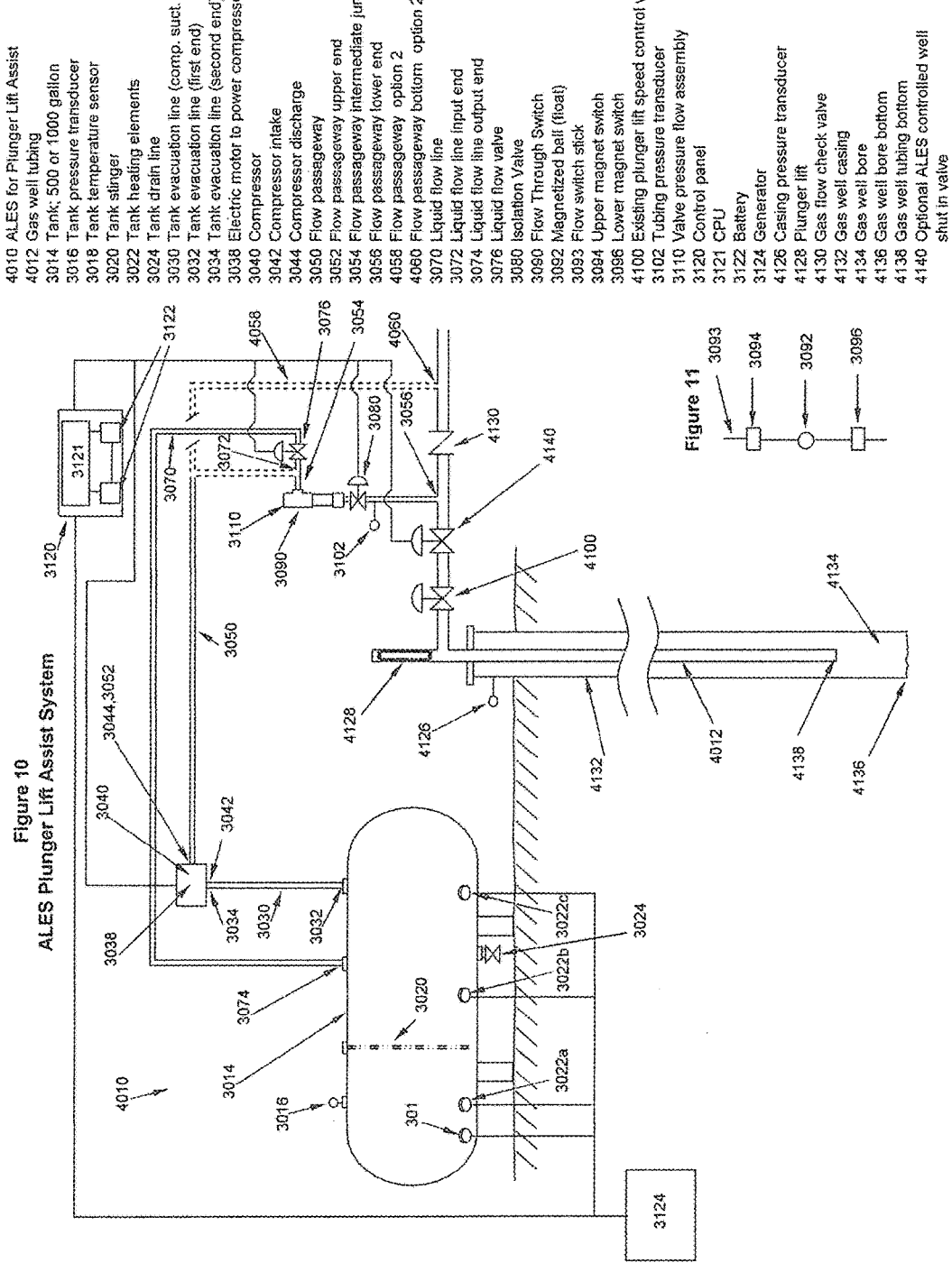
FIG. 10 is a schematic of the automatic liquid evacuation system of the invention.
Figure 11:
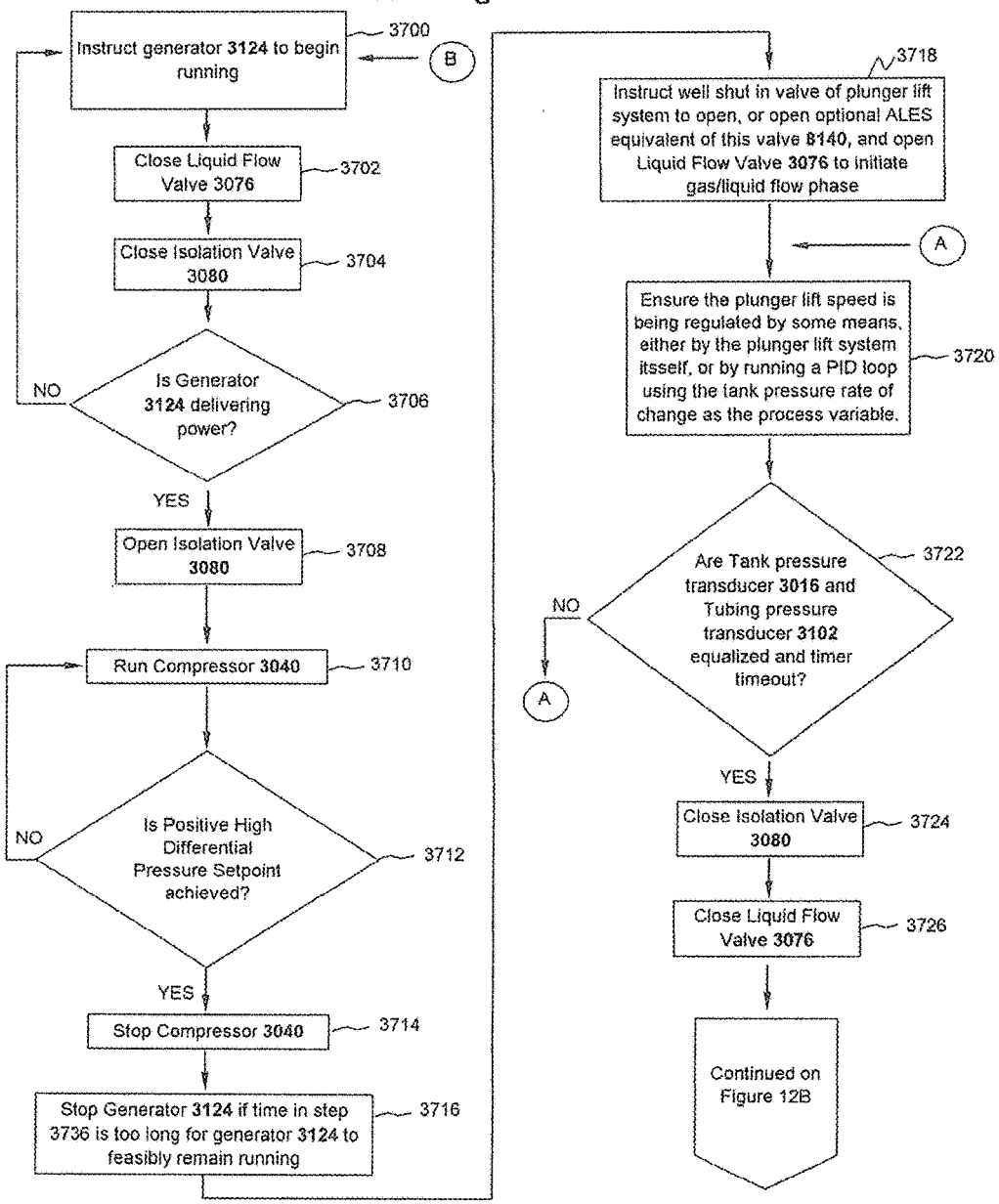
FIG. 11 is an enlarged schematic of the flow switch of the system of FIG. 10.
Figure 12:
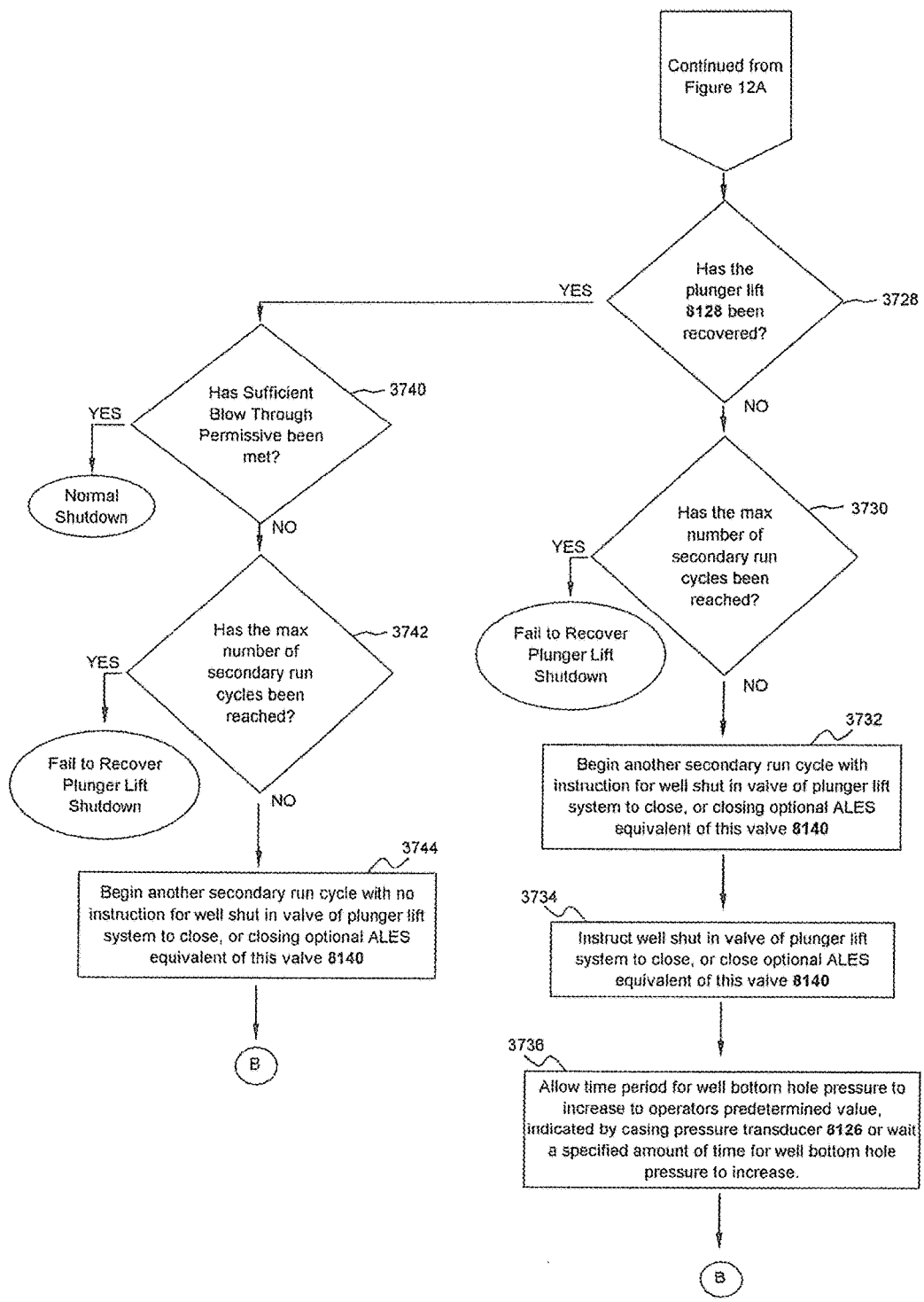
FIG. 12A is a flow diagram of the method steps that comprise a primary run cycle.
FIG. 12B is a flow diagram of the method steps that comprise a primary run cycle.

Referring to FIG. 10, shown is an automatic liquid evacuation system, designated generally 4010, for evacuating liquids from a natural gas well bore 4134. Automatic liquid evacuation system 4010 includes tank 3014 for receiving and storing liquids evacuated from gas well bore 4134. Tank 3014 is provided with tank pressure transducer 3016 for measuring the pressure in tank 3014 and first temperature sensor 3018 for measuring the temperature of fluids in tank 3014. Tank stinger 3020 is provided, as a backup, to facilitate removal of liquids from tank 3014. Tank heater 3022 is provided for heating liquids in tank 3014 when first temperature sensor 3018 indicates that ambient temperature poses a freezing risk to liquids in tank 3014. In one embodiment, tank heater 3022 is comprised of a plurality of tank heater units, e.g., tank heater units 3022a, 3022b, and 3022c. Tank drain line 3024 is provided for draining tank 3014.

Tank gas evacuation line 3030 has first end 3032 and second end 3034. First end 3032 communicates with tank 3014.

A motor 3038, preferably a variable speed drive, powers compressor 3040. Compressor 3040 has an intake 3042 and a discharge 3044. Intake 3042 communicates with tank gas evacuation line 3030.

Flow passageway 3050 has upper end 3052, intermediate juncture 3054 and lower end 3056. In a second embodiment, flow passageway 3050 has an intermediate juncture 4058 and lower end 4060. Upper end 3052 receives gas from second end 3034 of tank gas evacuation line 3030. Lower end 3056, or optional lower end 4060, is in communication with well tubing 4012. Lower end of well tubing 4138 extends to a close proximity of gas well bore bottom 4136 to allow evacuation of liquids from well casing 4132.

Liquid flow line 3070 has input end 3072 and output end 3074. Input end 3072 is in communication with intermediate juncture 3054 of flow passageway 3050. Output end 3074 is in communication with tank 3014. Liquid flow valve 3076 is located in liquid flow line 3070 for selectively opening or closing liquid flow line 3070.

Isolation valve 3080 is located on flow passageway 3050. Isolation valve 3080 is preferably located between intermediate juncture 3054 and lower end 3056 of flow passageway 3050. Isolation valve 3080 is provided for selectively isolating liquid flow line 3070 and compressor 3040 from gas well tubing 4012.

In one embodiment, flow through switch 3090 located on flow passageway 3050. Flow through switch 3090 is optional. In a preferred embodiment, flow through switch 3090 has a ball 3092 that is preferably magnetized. Ball 3092 is slidingly received on a vertical shaft or stick 3093 and is capable of travel between an upper magnet switch 3094 and a lower magnet switch 3096. Magnet switches 3094, 3096 are in communication with CPU 3121 for providing an indication of the location of ball 3092. In a preferred embodiment, flow through switch is positioned at the location of intermediate juncture 3054 so that when liquids are flowing from well tubing 4012 to tank 3014, ball 3092 is pushed upwards into contact with upper magnet switch 3094, indicating to CPU 3121 the presence of liquid flowing through liquid flow line 3070 and into tank 3014. Liquid is forced through the liquid flow line input end 3072, liquid flow line 3070, and liquid flow output end 3074, into tank 3014, because of the valve configuration in compressor 3040.

Well tubing pressure transducer 3102 is provided on flow passageway 3050. Well tubing pressure transducer 3102 is preferably located between isolation valve 3080 and plunger lift speed control valve 4100.

For purposes of this application, well tubing pressure transducer 3102, isolation valve 3080, liquid flow valve 3076, and flow through switch 3090, comprise valve pressure flow assembly 3110. One advantage of valve pressure flow assembly 3110 is that it allows discharge from compressor 3040 and tank 3014, and removal of liquids from well tubing 4012, through the same tap on the well tubing 4012.

Control panel 3120 is provided for receiving operator commands and for delivering operator commands to CPU 3121. CPU 3121 is provided for activating various components of system 4010, as will be explained below. Battery 3122 provides power to control panel 3120 and CPU 3121.

Generator 3124 communicates with compressor 3040, tank heater 3022, and with battery 3122 for providing power as may be required.

ALES Run Cycle Steps:

Referring now to FIG. 10-12B, in one embodiment, automatic liquid evacuation system 4010, in a gas well plunger lift assist application, operates as follows. After an indication of a fluid buildup in the well bore 4134, the existing plunger lift control equipment closes the well flow line valve (not shown on these drawings), or the optional ALES equivalent to this well flow line valve 4140, is closed, which begins the process of increasing the gas pressure at the bottom of the well bore 4134, and releases plunger lift 4128 to fall to bottom of well tubing 4138.

After adequate time for the plunger lift 4128 to reach the bottom of well tubing 4138, e.g., approx. 250 ft. per minute or approx. 32 minutes for an 8,000 ft. deep well, and gas well bottom hole pressure to increase to the operator specified set point, control panel 3120, powered by battery 3122, instructs generator 3124 to begin running as indicated by block 3700. Liquid flow valve 3076 is instructed to close as indicated in block 3702.

After a short wait time, e.g., one second after liquid flow valve 3076 is closed, isolation valve 3080 is instructed to close as indicated in block 3704.

After a short wait time, e.g., five seconds for new start and 2 seconds if already running, CPU 3121 verifies that generator 3124 is delivering power to battery 3122, as indicated in block 3706. If so, isolation valve 3080 is instructed to open, as indicated in block 3708. If no, then instructions are again issued to generator 3120, as indicated in block 3700.

After a short time, e.g., 5 seconds after isolation valve 3080 opens, compressor 3040 is instructed to start, as indicated in block 3710. Compressor 3040 will begin to lower pressure within tank 3014 via tank gas evacuation line 3030.

A tank evacuation wait time is provided for tank evacuation attained to go true. Tank evacuation wait time will vary depending on liquid level within tank 3014, speed of compressor 3040, and an operator setting of positive high differential pressure between readings provided by tank pressure transducer 3016 and well tubing transducer 3102. Pressure reading from transducers 3016 and 3102 are communicated to CPU 3121. In one example, the positive high differential pressure is set at 9.0 psi differential pressure but can be set to as much as 100 psi to 200 psi, or more if required. Once the positive high differential pressure set point is achieved, as indicated by block 3712, compressor 3040 is instructed to stop running, as indicated in block 3714. In one embodiment, generator 3124 is instructed to stop if the wait time in block 3736 is determined to be such that it is not feasible for generator 3124 to remain running during this wait period, as indicated in block 3716.

After a short wait time, e.g., 20 seconds, the existing plunger lift control equipment opens the well flow line valve (not shown on these drawings), or the optional ALES equivalent to this well flow line valve 4140, is opened, and liquid flow valve 3076 is instructed to open, as indicated in block 3718, which initiates a gas and liquid flow phase from well tubing 4012 to tank 3014, through liquid flow line 3070. Flow through liquid flow line 3070 occurs due to the pressure differential between tank 3014 and well tubing 4012, which is measured by monitoring tank pressure transducer 3016 and well tubing pressure transducer 3102, as explained above.

During the gas and liquid flow phase, the plunger lift 4128, which was dropped to the bottom of the well tubing

4138, as explained above, is forced upwards in the well tubing 4012 due to the pressure differential created between the tank 3014 and the well tubing 4012. During the gas and liquid flow phase, the plunger lift speed is regulated by either the existing plunger lift speed control equipment, or the optional control functionality of the automatic liquid evacuation system of the invention as indicated in block 3720. Details of this optional plunger lift 4128 speed control functionality performed by the ALES 4010 are described below.

The gas and liquid flow phase is permitted until the pressure differential approaches equalization, as indicated in block 3722, e.g., until the pressure differential is 1.5 psi, plus a short wait time, e.g., 1 minute. The gas and liquid flow time will vary depending on a volume of liquids in well tubing 4012, differential pressures achieved between tank 3014 and well tubing 4012, as well as size of tank 3014 and amount of liquid in tank 3014. After a desired pressure differential is achieved plus the desired short wait time, isolation valve 3080 is instructed to close, as indicated in block 3724. Flow valve 3076 is also instructed to close, as indicated in block 3726.

Upon closure of isolation valve 3080 and flow valve 3076, a short wait time is implemented, e.g., 10 seconds. At this time a secondary run cycle is complete.

A short wait time is implemented, e.g., 6 seconds, then a decision is made between these 4 options: (1) run another cycle including well shut in sequence steps; (2) run another cycle without well shut in sequence steps; (3) normal shutdown on a positive plunger lift recovery indication from the plunger lift system, and sufficient blow through to remove all liquids from piping and valves; or (4) set a fail to recover plunger lift alarm and shutdown. The decision is made based on the following procedure.

Has the plunger lift equipment indicated that the plunger lift 4128 has been recovered, as stated in block 3728.

If yes, plunger lift 4128 has been recovered, block 3728, then has a sufficient blow through permissive, as stated in block 3740, indicating all liquids have been evacuated from the piping and valve pressure flow assembly, been met? If yes, sufficient blow through has been attained, then normal shutdown as indicated in block 3740. If no, sufficient blow through has not been attained, block 3740, then has the maximum number of secondary run cycles permitted by the operator been reached, as indicated in block 3742. If yes, the maximum number of secondary run cycles has been reached, then set fail to recover plunger lift alarm and shutdown as described in block 3742. If no, the maximum number of secondary run cycles has not been reached, block 3742, then begin another Secondary Run Cycle with no well shut in sequence steps, as indicated in block 3744. Details concerning blow through measurement and determination are described in the section entitled, "Rate of Change Compression, below.

Secondary Run Cycle with no well shut in sequence steps, as indicated in block 3744, begins with instructing the generator 3124 to begin running as described in block 3700, if it was previously shut down as described in block 3716. If generator 3124 was not shut down in block 3716, then it is still running at this point in the sequence. Then the liquid flow valve 3076 is instructed to close as described in block 3702. The steps described in blocks 3702 through 3726 are repeated until either of 3 results occur: (1) a normal shutdown results, due to the successful recovery of the plunger lift 4128 and subsequent sufficient blow through permissive being met, as described in block 3740, (2) another Secondary Run Cycle is run because the maximum number of Secondary Run Cycles allowed by the operator was not reached, as described in block 3742, or (3) a failure to recover plunger lift 4128 alarm and shutdown results, even though the plunger lift 4128 was recovered, no sufficient blow through permissive was attained after the plunger lift 4128 was recovered, and the number of Secondary Run Cycles allowed by the operator was reached, as described in block 3742.

If no, plunger lift 4128 has not been recovered, reference block 3728, then has the maximum number of Secondary Run Cycles allowed by the operator been reached? If yes, the maximum number of Secondary Run Cycles allowed by the operator has been reached, then fail to recover plunger lift 4128 alarm and shutdown, as described in block 3730. If no, maximum number of Secondary Run Cycles allowed by operator has not been reached, then begin another Secondary Run Cycle with well shut in sequence steps, as described in block 3732.

Secondary Run Cycle with well shut in sequence steps begins with the closure of the well shut in valve of the plunger lift system, or the closure of the optional ALES equivalent of this valve 4140, as indicated in block 3734, for the purpose of increasing the gas well bottom hole pressure to push plunger lift 4128 from below, as the ALES 4010, lowers pressure above the plunger lift 4128, to facilitate recovery of plunger lift 4128.

A time period and/or well casing transducer 4126 pressure set point is predetermined by the well operator as stated in block 3736. When the pressure set point of casing transducer 4126 and/or the associated time period is reached, generator 3124 is instructed to begin running, as indicated in block 3700. If generator 3124 was not shut down in block 3716, then it is still running at this point in the sequence.

Liquid flow valve 3076 is instructed to close as indicated in block 3702.

After liquid flow valve 3076 is closed, isolation valve 3080 is instructed to close as indicated in block 3704.

A short wait time is implemented after liquid flow valve 3076 and isolation valve 3080 are verified to be closed. Isolation Valve 3080 is then instructed to open, as indicated in step 3708. Compressor 3040 is then instructed to begin running, as indicated in step 3710.

The cycle steps described in blocks 3702 through 3726 are repeated until either of 3 results occur: (1) a normal shutdown results, due to the successful recovery of the plunger lift 4128 and subsequent sufficient blow through permissive being met, as described in block 3740, (2) another Secondary Run Cycle is run because the maximum number of Secondary Run Cycles allowed by the operator was not reached, as described in block 3742, or (3) a failure to recover plunger lift 4128 alarm and shutdown results, because the plunger lift 4128 was not recovered, therefore no sufficient blow through permissive was attained following the plunger lift 4128 recovery, and the number of Secondary Run Cycles allowed by the operator was reached, as described in block 3742.

Steps if "Normal Shutdown Due to the Successful Recovery of Plunger Lift 4128 and Subsequent Sufficient Blow Through Permissive Attained":

If "Normal Shutdown" is required and permitted, a short generator cool down time, e.g., 60 seconds is implemented, then generator 3124 is instructed to shut down.

Steps if "Failure to Recover Plunger Lift 4128" is Set:

If "Failure to Recover Plunger Lift 4128' is required, Generator 3124 is instructed to start. Then isolation valve 3080 is instructed to open and compressor 3040 is instructed to begin running. In one embodiment, a variable speed drive is utilized to vary the compressor speed to a desired value.

A short waiting time, e.g., 15 seconds is implemented, after ball 3092 is seated on bottom flow switch 3096. During this 15 second time period, liquids are pushed into well tubing 4012 from ALES 4010 piping and valves to prevent freezing.

Liquid flow valve 3076 is then opened and isolation valve 3080 is closed.

A wait time, e.g., 15 seconds is implemented to wait for liquids to be pushed back into tank 3014.

Isolation valve 3080 is then opened and liquid flow valve 3076 is then closed.

A wait time, e.g., 15 seconds is implemented to wait for liquids to be pushed back into well tubing 4012.

Compressor 3040 is instructed to stop. Isolation valve 3080 is then closed. Generator 3124 is instructed to stop.

Steps of the Heat Cycle:

If a determination is made that tank 3014 requires heating, then generator 3124 is started.

Liquid flow valve 3076 is closed. After a short wait time, e.g., 1 second, isolation valve 3080 is closed. After a short wait time, e.g., 5 seconds after voltage received from generator 3124 or 1 second if generator 3124 is already running, then power is directed to one of tank heaters 3022a, 3022b, or 3022c. Each of heat circuits 3022a, 3022b, and 3022c run sequentially for a desired length of time, e.g., 5 minutes. Upon completion of the running of each of heaters 3022a, 3022b, and 3022c, a determination is made whether a pressure relief stage for tank 3014 is required.

If it has been determined that pressure relief of tank 3014 is required, e.g., if tank pressure is 3 lbs. greater than pressure in well tubing 4012, then liquid flow valve 3076 and isolation valve 3080 are opened.

A wait time is implemented to allow pressure in tank 3014 to bleed down to within 2.0 lbs. of the pressure in well tubing 4012. A wait time, e.g., 2 seconds, is implemented. Then liquid flow valve 3076 and isolation valve 3080 are closed.

If it has been determined that the temperature in the tank 3014 has not reached the high temperature set point specified by the operator, another heat cycle is run, consisting of the steps described above in the "Steps of the Heat Cycle". These steps are repeated until 1 of two results occur, (1) the temp in tank 3014 reaches a predetermined set point, which results in a Normal Shutdown, described above, or (2) the temperature in tank 3014, has not reached its predetermined set point, and the number of heat cycles permitted by the operator has been reached. This results in a Temperature Control Fail alarm.

If a Temperature Control Fail alarm is set, generator 3124 is instructed to stop, and the heat functionality of the ALES 4010 is disabled. If temperature control is critical to the particular application, all ALES 4010 functionality would be disabled.

The following 5 paragraphs describe the process the ALES 4010 uses to regulate the speed of the plunger lift 4128 during the gas and liquid flow phase of the plunger lift 4128 recovery process.

The speed of the plunger lift 4128 must be regulated during travel up the well tubing 5012 for safety and operational reasons.

The speed of the plunger lift 4128 is directly related to the speed in which the tank 3014 pressure, as indicated by the tank pressure transducer 3016, increases in value. Logic is in place to accurately determine the rate in which the tank 3014 pressure increases. This logic is described in the following paragraphs.

A tank 3014 pressure rate of change set point must be determined that ensures safe and optimum speed of the plunger lift 4128 as it travels up the well tubing 4012. Changes in tank 3014 to well tubing 4012 differential pressures, and changes in tank 3014 liquid levels may require altering the tank 3014 pressure rate of change set point, as the gas and liquid flow phase of the process proceeds, and as the plunger lift 4128 travels up the well tubing 4012.

Using existing logic to determine tank 3014 pressure rate of change, the ALES 4010, will regulate plunger lift speed control valve 4100, or equivalent valve, in a fashion that will maintain the tank 3014 pressure rate of change at the tank pressure rate of change set point, described above. This functionality will ensure the optimum speed of the plunger lift 4128 as it travels up the well tubing 4012.

Method of determining tank 3014 pressure rate of change: Measurements from tank pressure transducer 3016 are taken at short intervals, e.g., every second, during the gas and liquid flow phase. CPU 3121 uses these measurements to determine a rate of change in the measured pressure of the tank pressure transducer 3016.

The following 6 paragraphs describe the process the ALES 4010 uses to determine if a sufficient gas blow through has occurred after the recovery of the plunger lift 4128 during the gas and liquid flow phase of the plunger lift 4128 recovery process. The accurate determination of this blow through is necessary to ensure all liquids have been successfully evacuated from the piping and valves, in order to prevent freezing of the liquids.

Measurements from tank pressure transducer 3016 are taken at short intervals, e.g., every second, during the gas and liquid flow phase. CPU 3121 uses these measurements to determine a rate of change in the measured pressure of the tank pressure transducer 3016. CPU 3121 compares this rate of change with a database of expected rates of change, e.g., when liquids are flowing in the gas and liquid flow phase, a tank 3014 pressure rate of change of 0.4 lbs./minute to 0.8 lbs./minute may be expected. However, if the measured rate of change is substantially greater, e.g., 0.1 lbs./second, then the CPU determines that fluids have been removed from well tubing 4012 and that gas blow through has occurred. A rule of thumb is that an increase in pressure rate of change of 0.8 lbs./minute to 0.1 lbs./second is indicative of a gas blow through condition. If the substantially greater rate of change is not achieved during the gas and liquid flow phase, and specifically, after the indication of recovery of the plunger lift 4128, then CPU 3121 determines that gas blow through has not occurred, that fluids could still remain in piping and valve assemblies, and that a decision to run another cycle should be implemented.

Rate of Change Compression:

Referring to FIG. 4, shown is an example tank pressure rate of change profile for a 500 gallon tank. The numbers in the table of FIG. 4 are the values written to Register V2022 of CPU 3121 and they represent the number of 0.1 psi change per second in the tank pressure. The numbers are not the tank/well tubing differential pressure, rather, the number represents the pressure in tank 3014. This means that with the tank level at 22", and the starting pipeline/tank pressure differential at about 8.5 psi., the consistent, maximum rate of change in tank pressure observed in testing is 0.8 psi per second. This number becomes a constant for a particular tank size, tank liquid level, and piping configuration, and is written to a storage register, register V2022 of CPU 3121. After that, a momentary, instantaneous snapshot of the pressure in tank 3014 stored in register V2011 is then added to "storage" register, e.g., register V2022 of CPU 3121. The sum of the two is then written out to a "comparison" register, e.g., register V2024. Then the value residing in register V2024 is compared with the current pressure in tank 3014, e.g., register V2011, as it is continually rising in value. When the actual tank pressure register, e.g., register V2011 is greater than or equal to the value in register V2024, the logic makes a coil, C260 go high. When C260 goes high, two events take place. First a counter, CT20, is incremented 1 time, and second the logic takes the new tank pressure, register V2011, adds the constant to it again, writes the sum out to register V2024, to begin the comparison process all over again, then coil C260 is set back to low and is ready for the next comparison. Up to this point in the process, nothing is time based. We simply increment a counter each time the pressure increases to the value written in register V2024. That could take up to a minute, or as little as one second, it is irrelevant at this point in the process. All we are after at this point is a counter increment each time the pressure in tank 3014 rises to or above the given amount.

At this point, time is factored into the calculation. A set of timers, e.g., timers T152 and T154, are each set to time out after 3 seconds. These timers are "Fast" timers and are preferably very precise, e.g., accurate to a hundredth of a second. As these timers alternate timing and timing out, the counter, e.g., counter CT20, is reset each 3 second interval. When counter CT20 is reset, the "accumulated" value is set back to 0. The logic monitors the "accumulated" value of counter CT20 and when it sees that value equal to or greater than 3, sets another coil, e.g., coil C263, to high. Since counter CT20 only gets reset to 0 every 3 seconds, then if the "accumulated" value of counter CT20 is greater than or equal to 3, that means that during that particular 3 second time period, the "Rate of Change" in tank pressure was at least 0.8 psi per second, which equals 2.4 psi for the 3 second time period.

As shown in the chart of FIG. 4, the higher the liquid level in tank 3014, the faster the tank pressure rise and the shorter the time becomes to well tubing/tank pressure equalization. Because of this condition, to get a true indication of Well Tubing Blow Through at the lower liquid levels in tank 3014, we have the added benefit of looking at more than just one 3 second time period to determine Well Tubing Blow Through. As shown in the chart of FIG. 4, at 0 percent liquid level in tank 3014, significant "rate of change" in tank pressure continues much past one 3 second time period. For seven, 3 second intervals after the beginning of the measurement process, the rate of change is still equal to or greater than 0.1 psi per second, and 0.3 psi in a 3 second time period. A rate of change of 0.1 psi per second, which is 1 psi in 10 seconds, is a significant rate of tank pressure change for this application. This allows the rate of change calculations to be customized for each liquid level in tank 3014 to determine very accurately when a Well Tubing Blow Through has occurred at the various tank liquid levels.

This brings us to where more than one 3 second time period is utilized (in the lower tank liquid levels) to determine a Well Tubing Blow Through condition. This is accomplished with a counter, e.g., counter CT22, that counts each time the accumulated value of counter CT20 climbs higher than 3. A "preset" value is written to counter CT22 that is equal to the number of 3 second time periods desired to require in the calculation for a particular liquid level in tank 3014. When and if the counter CT22 "counts out", or reaches its preset value, it is then determined whether or not a Well Tubing Blow Through permissive has occurred from the rate of change calculations. To write the number of 3 second time periods required in the calculation, we write a value to register V3004 according to the liquid level of tank 3014. This in turn sets the "preset value" of counter CT22 which determines the state of the permissive.

Benefits:

The application of the invention provides an ability to discharge evacuation gas from tank 3014 into well tubing 4012 and to remove fluids from well tubing 4012 via the same tap, i.e., at lower end 3056 of flow passageway 3050.

The method of the invention provides an ability to do multiple secondary run cycles to remove all liquids from well tubing 4012, and recover plunger lift 4128 during a primary run cycle.

An auto tune feature may be provided wherein times between primary run cycles are adjusted according to the liquid flow timer, i.e., the time of actual liquid flow may be noted and compared to an ideal value. If the time of liquid flow is longer than the ideal value, then the time between primary run cycles may be shortened. Alternatively, if the time of liquid flow is shorter than the ideal value, then the time between primary run cycles may be lengthened.

A blow through determination made by pressure rate of change logic may be customized by logic for each specific tank liquid level.

Figure 13:
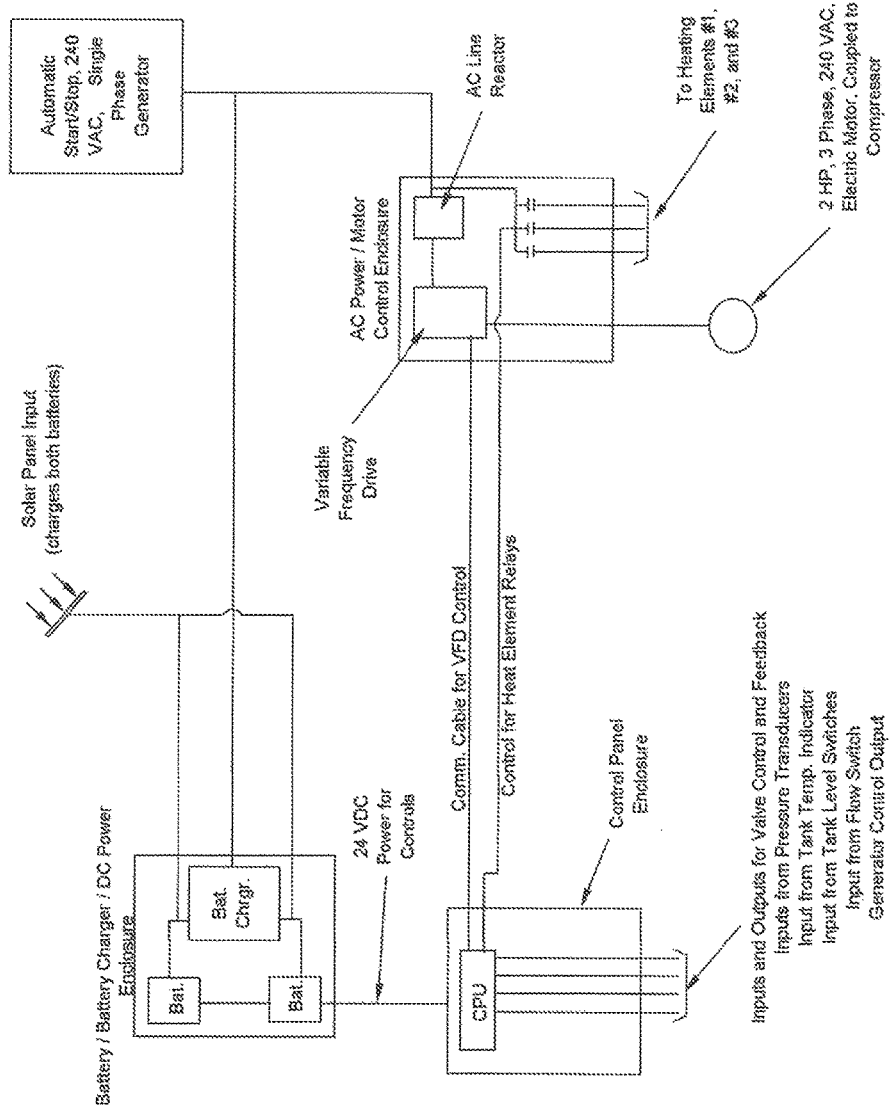
FIG. 13 is an electrical schematic of the automatic liquid evacuation system of the invention.
Figure 16B:
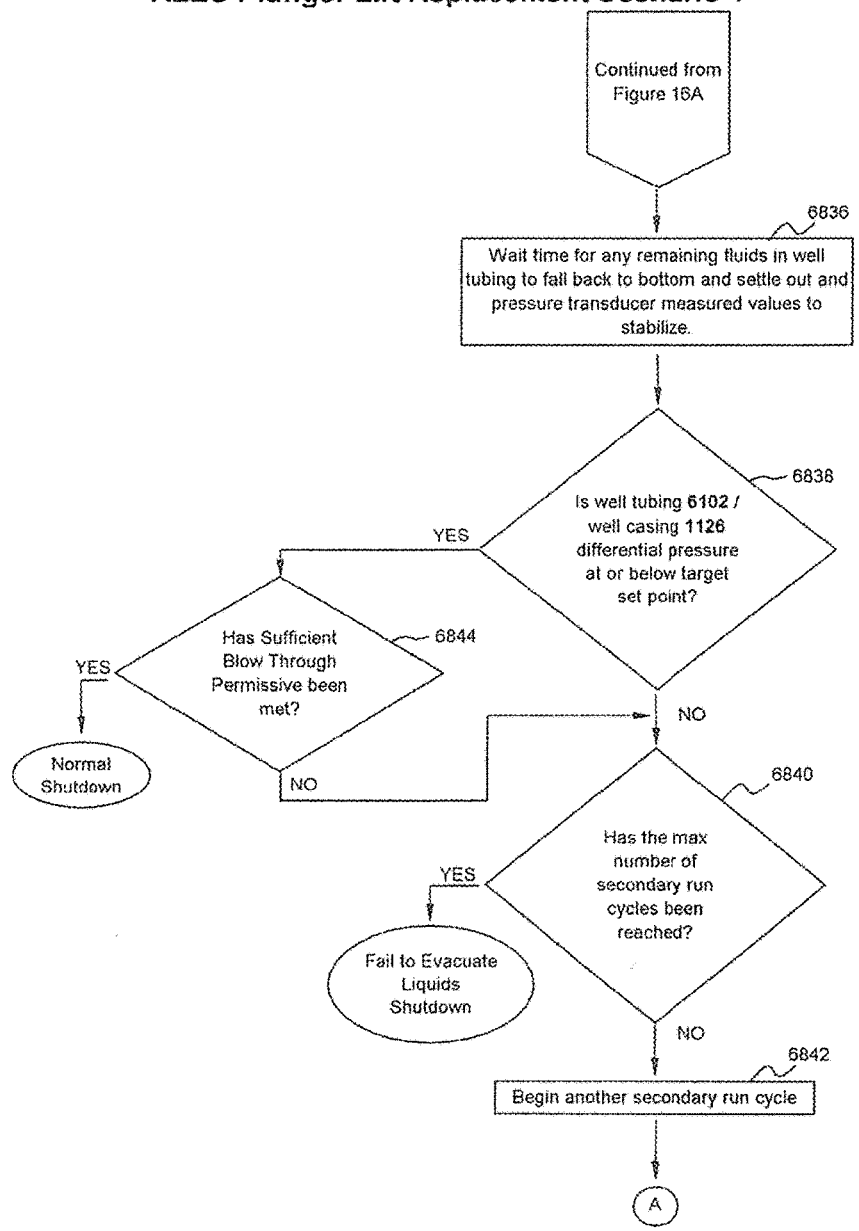
FIG. 16B is a flow diagram of the method steps that comprise a primary run cycle.

The use of tank heaters provides an ability to prevent freezing of liquids in tank 3014 and to allow emptying of liquids from tank 3014 in virtually any conditions. An example electrical schematic is shown in FIG. 13.

If liquids remain in piping or valve pressure flow assembly 3110 after a failed primary run cycle, valve 3076, valve 3080 and compressor 3040, operate in a fashion that removes all liquids from above ground assemblies and pushes the fluids back below ground or in to the tank 3014, to prevent freezing in housings and valves.

IV. Automatic Liquid Evacuation System for Plunger Lift Replacement Scenario 1

Referring to FIG. 14, shown is an automatic liquid evacuation system, designated generally 7010, for evacuating liquids from a natural gas well bore 7134. Automatic liquid evacuation system 7010 includes tank 6014 for receiving and storing liquids evacuated from gas well bore 7134. Tank 6014 is provided with tank pressure transducer 6016 for measuring the pressure in tank 6014 and first temperature sensor 6018 for measuring the temperature of fluids in tank 6014. Tank stinger 6020 is provided, as a backup, to facilitate removal of liquids from tank 6014. Tank heater 6022 is provided for heating liquids in tank 6014 when first temperature sensor 6018 indicates that ambient temperature poses a freezing risk to liquids in tank 6014. In one embodiment, tank heater 6022 is comprised of a plurality of tank heater units, e.g., tank heater units 6022a, 6022b, and 6022c. Tank drain line 6024 is provided for draining tank 6014.

Tank gas evacuation line 6030 has first end 6032 and second end 6034. First end 6032 communicates with tank 6014.

A motor 6038, preferably a variable speed drive, powers compressor 6040. Compressor 6040 has an intake 6042 and a discharge 6044. Intake 6042 communicates with tank gas evacuation line 6030.

Flow passageway 6050 has upper end 6052, intermediate juncture 6054 and lower end 6056. In a second embodiment, flow passageway 6050 has an intermediate juncture 7058 and lower end 7060. Upper end 6052 receives gas from second end 6034 of tank gas evacuation line 6030. Lower end 6056, or optional lower end 7060, is in communication with well tubing 7012. Lower end of well tubing 7138 extends to a close proximity of gas well bore bottom 7136 to allow evacuation of liquids from well casing 7132.

Liquid flow line 6070 has input end 6072 and output end 6074. Input end 6072 is in communication with intermediate juncture 6054 of flow passageway 6050. Output end 6074 is in communication with tank 6014. Liquid flow valve 6076 is located in liquid flow line 6070 for selectively opening or closing liquid flow line 6070.

Isolation valve 6080 is located on flow passageway 6050. Isolation valve 6080 is preferably located between intermediate juncture 6054 and lower end 6056 of flow passageway 6050. Isolation valve 6080 is provided for selectively isolating liquid flow line 6070 and compressor 6040 from gas well tubing 7012.

In one embodiment, flow through switch 6090 located on flow passageway 6050. Flow through switch 6090 is optional. In a preferred embodiment, flow through switch 6090 has a ball 6092 that is preferably magnetized. Ball 6092 is slidingly received on a vertical shaft or stick 6093 and is capable of travel between an upper magnet switch 6094 and a lower magnet switch 6096. Magnet switches 6094, 6096 are in communication with CPU 6121 for providing an indication of the location of ball 6092. In a preferred embodiment, flow through switch is positioned at the location of intermediate juncture 6054 so that when liquids are flowing from well tubing 7012 to tank 6014, ball 6092 is pushed upwards into contact with upper magnet switch 6094, indicating to CPU 6121 the presence of liquid flowing through liquid flow line 6070 and into tank 6014. Liquid is forced through the liquid flow line input end 6072, liquid flow line 6070, and liquid flow output end 6074, into tank 6014, because of the valve configuration in compressor 6040.

Well tubing pressure transducer 6102 is provided on flow passageway 650. Well tubing pressure transducer 6102 is preferably located between isolation valve 6080 and ALES controlled well shut in valve 7140.

Well shut in valve 7140 is provided to allow pressure to increase in well bore 7134 to aid in fluid removal from the well bore 7134.

For purposes of this application, well tubing pressure transducer 6102, isolation valve 6080, liquid flow valve 6076, and flow through switch 6090, comprise valve pressure flow assembly 6110. One advantage of valve pressure flow assembly 6110 is that it allows discharge from compressor 6040 and tank 6014, and removal of liquids from well tubing 7012, through the same tap on the well tubing 7012.

Control panel 6120 is provided for receiving operator commands and for delivering operator commands to CPU 6121. CPU 6121 is provided for activating various components of system 7010, as will be explained below. Battery 6122 provides power to control panel 6120 and CPU 6121. Generator 6124 communicates with compressor 6040, tank heater 6022, and with battery 6122 for providing power as may be required.

ALES Run Cycle Steps for Plunger Lift Replacement Application 1:

Referring now to FIGS. 14-16B, in one embodiment, automatic liquid evacuation system 7010, in a gas well plunger lift replacement application, operates as follows. After an indication of a fluid buildup in the well bore 7134, which is determined when the well tubing pressure transducer 6102 and the well casing pressure transducer 7126 indicate a pressure differential at or above an operator specified value, as described in block 6800 of FIGS. 16A and 16B, if required, the well shut in valve 7140, is closed as indicated in blocks 6802 and 6804, which begins the process of increasing the gas pressure at the bottom of the well bore 7134. This is done to push liquids up from the well bore bottom 7134, as the ALES 7010, lowers gas well tubing pressure above liquids to facilitate liquid evacuation from the bottom of the well bore 7134.

After adequate time for gas well bottom hole pressure to increase to the operator specified set point, as indicated by well casing pressure transducer 7126 in block 6806, control panel 6120, powered by battery 6122, instructs generator 6124 to begin running as indicated by block 6808. Liquid flow valve 6076 is instructed to close as indicated in block 6810.

After a short wait time, e.g., one second after liquid flow valve 6076 is closed, isolation valve 6080 is instructed to close as indicated in block 6812.

After a short wait time, e.g., five seconds for new start and 2 seconds if already running, CPU 6121 verifies that generator 6124 is delivering power to battery 6122, as indicated in block 6814. If so, isolation valve 6080 is instructed to open, as indicated in block 6816. If no, then instructions are again issued to generator 6124, as indicated in block 6808.

After a short time, e.g., 5 seconds after isolation valve 6080 opens, compressor 6040 is instructed to start, as indicated in block 6818. Compressor 6040 will begin to lower pressure within tank 6014 via tank gas evacuation line 6030.

A tank evacuation wait time is provided for tank evacuation attained to go true. Tank evacuation wait time will vary depending on liquid level within tank 6014, speed of compressor 6040, and an operator setting of positive high differential pressure between readings provided by tank pressure transducer 6016 and well tubing transducer 6102. Pressure reading from transducers 6016 and 6102 are communicated to CPU 6121. In one example, the positive high differential pressure is set at 9.0 psi differential pressure but can be set to as much as 100 psi to 200 psi, or more if required. Once the positive high differential pressure set point is achieved, as indicated by block 6820, compressor 6040 is instructed to stop running, as indicated in block 6822. In one embodiment, generator 6124 is instructed to stop if the wait time in block 6806 is determined to be such that it is not feasible for generator 6124 to remain running during this wait period, as indicated in block 6824, otherwise generator 6124 remains running.

After a short wait time, e.g., 20 seconds, if well shut in valve 7140 was closed previously in block 6804, well shut in valve 7140 instructed to open, as indicated in block 6826. Liquid flow valve 6076 is instructed to open, as indicated in block 6828, which initiates a gas and liquid flow phase from well tubing 7012 to tank 6014, through liquid flow line 6070. Flow through liquid flow line 6070 occurs due to the pressure differential between tank 6014 and well tubing 7012, which is measured by monitoring tank pressure transducer 6016 and well tubing pressure transducer 6102, as explained above.

During the gas and liquid flow phase, the liquids in the bottom of the well bore 7136 are forced upwards in the well tubing 7012 due to the pressure differential created between the tank 6014 and the well tubing 7012.

The gas and liquid flow phase is permitted until the pressure differential approaches equalization, as indicated in block 6830, e.g., until the pressure differential is 1.5 psi, plus a short wait time, e.g., 1 minute. The gas and liquid flow time will vary depending on a volume of liquids in well tubing 7012, differential pressures achieved between tank 6014 and well tubing 7012, as well as size of tank 6014 and amount of liquid in tank 6014. After a desired pressure differential is achieved plus the desired short wait time, isolation valve 6080 is instructed to close, as indicated in block 6832. Flow valve 6076 is also instructed to close, as indicated in block 834.

Upon closure of isolation valve 6080 and flow valve 6076, a short wait time is implemented, e.g., 10 seconds. At this time a secondary run cycle is complete.

A short wait time is implemented, e.g., 6 seconds, then a decision is made between these 3 options: (1) run another cycle; (2) normal shutdown on a sufficient blow through to remove all liquids from piping, valves, and well bore; or (3) set a fail to evacuate liquids from piping, valves, and well bore alarm and shutdown. The decision is made based on the following procedure.

Wait a predetermined amount of time for any remaining liquids to settle back to bottom of well bore 7136, and well tubing pressure transducer 6102 and well casing pressure transducer 7126 measured values to stabilize, as described in block 6836.

Is well tubing 7012 and well casing 7132 gas pressure differential at or below operator specified set point as indicated by well tubing pressure transducer 6102 and well casing pressure transducer 7126 as described in block 6838.

If yes, then has a sufficient blow through permissive, as stated in block 6844, indicating all liquids have been evacuated from the piping, valves, and well bore, been met. If yes, sufficient blow through has been attained, then Normal Shutdown as indicated in block 6844. If no, sufficient blow through has not been attained, as indicated in block 6844, then has the maximum number of secondary run cycles permitted by the operator been reached, as indicated in block 6840. If yes, the maximum number of secondary run cycles has been reached, then set fail to evacuate liquids alarm and shutdown as described in block 6840. If no, the maximum number of secondary run cycles has not been reached, block 6840, then begin another Secondary Run Cycle, as indicated in block 6842. Details concerning blow through measurement and determination are described in the section entitled, "Rate of Change Compression" below.

Secondary Run Cycle begins with the closure of the well shut in valve 7140, if required by the particular well, as indicated in blocks 6802 and 6804. The cycle steps described by blocks 6802 through 6838 are repeated until either of 2 results occur: (1) normal shutdown on a sufficient blow through to remove all liquids from piping, valves, and well bore; or (2) set a fail to evacuate liquids from piping, valves, and well bore alarm and shutdown if the number of Secondary Run Cycles executed becomes equal to the maximum number of Secondary Run Cycles allowed by the operator and no positive indication of a sufficient blow through to remove all liquids from piping, valves, and well bore.

Steps if "Normal Shutdown Due to the Sufficient Blow Through Permissive Attained":

If "Normal Shutdown" is required and permitted, a short generator cool down time, e.g., 60 seconds is implemented, then generator 6124 is instructed to shut down.

Steps if "Failure to Evacuate Liquids Shutdown" is Set:

If "Failure to Evacuate Liquids Shutdown' is required, Generator 6124 is instructed to start, if not already running. Then isolation valve 6080 is instructed to open and compressor 6040 is instructed to begin running. In one embodiment, a variable speed drive is utilized to vary the compressor speed to a desired value.

A short waiting time, e.g., 15 seconds is implemented, after ball 6092 is seated on bottom flow switch 6096. During this 15 second time period, liquids are pushed into well tubing 7012 from ALES 7010 piping and valves to prevent freezing.

Liquid flow valve 6076 is then opened and isolation valve 6080 is closed.

A wait time, e.g., 15 seconds is implemented to wait for liquids to be pushed back into tank 6014.

Isolation valve 6080 is then opened and liquid flow valve 6076 is then closed.

A wait time, e.g., 15 seconds is implemented to wait for liquids to be pushed back into well tubing 7012.

Compressor 6040 is instructed to stop. Isolation valve 6080 is then closed. Generator 6124 is instructed to stop.

Steps of the Heat Cycle:

If a determination is made that tank 6014 requires heating, then generator 6124 is started.

Liquid flow valve 6076 is closed. After a short wait time, e.g., 1 second, isolation valve 6080 is closed. After a short wait time, e.g., 5 seconds after voltage received from generator 6124 or 1 second if generator 124 is already running, then power is directed to one of tank heaters 6022a, 6022b, or 6022c. Each of heat circuits 6022a, 6022b, and 6022c run sequentially for a desired length of time, e.g., 5 minutes. Upon completion of the running of each of heaters 6022a, 6022b, and 6022c, a determination is made whether a pressure relief stage for tank 6014 is required.

If it has been determined that pressure relief of tank 6014 is required, e.g., if tank pressure is 3 lbs. greater than pressure in well tubing 7012, then liquid flow valve 6076 and isolation valve 6080 are opened.

A wait time is implemented to allow pressure in tank 6014 to bleed down to within 2.0 lbs. of the pressure in well tubing 7012. A wait time, e.g., 2 seconds, is implemented. Then liquid flow valve 6076 and isolation valve 6080 are closed.

If it has been determined that the temperature in the tank 6014 has not reached the high temperature set point specified by the operator, another heat cycle is run, consisting of the steps described above in the "Steps of the Heat Cycle". These steps are repeated until 1 of two results occur, (1) the temp in tank 6014 reaches a predetermined set point, which results in a Normal Shutdown, described above, or (2) the temperature in tank 6014, has not reached its predetermined set point, and the number of heat cycles permitted by the operator has been reached. This results in a Temperature Control Fail alarm.

If a Temperature Control Fail alarm is set, generator 6124 is instructed to stop, and the heat functionality of the ALES 7010 is disabled. If temperature control is critical to the particular application, all ALES 7010 functionality would be disabled.

The following 5 paragraphs describe the process the ALES 7010 uses to regulate the speed of the fluid, if required, as it travels up the well tubing during the gas and liquid flow phase of the liquid evacuation process.

The speed of the fluid may need to be regulated during travel up the well tubing 7012 for successful evacuation of the liquids from the bottom of the well bore 7134.

The speed of the fluid traveling up the well tubing 7012, is directly related to the speed in which the tank 6014 pressure, as indicated by the tank pressure transducer 6016, increases in value. Logic is in place to accurately determine the rate in which the tank 6014 pressure increases. This logic is described below in the following paragraphs.

A tank 6014 pressure rate of change set point must be determined that ensures optimum speed of the fluid as it travels up the well tubing 7012. Changes in tank 6014 to well tubing 7012 differential pressures, and changes in tank

6014 liquid levels may require altering the tank 6014 pressure rate of change set point, as the gas and liquid flow phase of the process proceeds, and as the fluid travels up the well tubing 7012.

Using existing logic to determine tank 6014 pressure rate of change, the ALES 7010, will regulate fluid speed control valve 7100, in a fashion that will maintain the tank 6014 pressure rate of change at the tank pressure rate of change set point, described above. This functionality will ensure the optimum speed of the fluid as it travels up the well tubing 7012.

Method of determining tank 6014 pressure rate of change: Measurements from tank pressure transducer 6016 are taken at short intervals, e.g., every second, during the gas and liquid flow phase. CPU 6121 uses these measurements to determine a rate of change in the measured pressure of the tank pressure transducer 6016.

The following 6 paragraphs describe the process the ALES 7010 uses to determine if sufficient gas blow through has occurred after a Secondary Run Cycle of the liquid evacuation process. The accurate determination of this gas blow through is necessary to ensure all liquids have been successfully evacuated from above ground piping and valves in order to prevent freezing of the liquids in piping and valve assemblies.

Measurements from tank pressure transducer 6016 are taken at short intervals, e.g., every second, during the gas and liquid flow phase. CPU 6121 uses these measurements to determine a rate of change in the measured pressure of the tank pressure transducer 6016. CPU 6121 compares this rate of change with a database of expected rates of change, e.g., when liquids are flowing in the gas and liquid flow phase, a tank 6014 pressure rate of change of 0.4 lbs./minute to 0.8 lbs./minute may be expected. However, if the measured rate of change is substantially greater, e.g., 0.1 lbs./second, then the CPU determines that fluids have been removed from well tubing 7012 and that gas blow through has occurred. A rule of thumb is that an increase in pressure rate of change of 0.8 lbs./minute to 0.1 lbs./second is indicative of a gas blow through condition. If the substantially greater rate of change is not achieved during the gas and liquid flow phase, then CPU 6121 determines that gas blow through has not occurred, that fluids could still remain in piping and valve assemblies, and that a decision to run another cycle should be implemented.

Rate of Change Compression:

Referring to FIG. 4, shown is an example tank pressure rate of change profile for a 500 gallon tank. The numbers in the table of FIG. 4 are the values written to Register V2022 of CPU 6121 and they represent the number of 0.1 psi change per second in the tank pressure. The numbers are not the tank/well tubing differential pressure, rather, the number represents the pressure in tank 6014. This means that with the tank level at 22", and the starting pipeline/tank pressure differential at about 8.5 psi., the consistent, maximum rate of change in tank pressure observed in testing is 0.8 psi per second. This number becomes a constant for a particular tank size, tank liquid level, and piping configuration, and is written to a storage register, register V2022 of CPU 6121. After that, a momentary, instantaneous snapshot of the pressure in tank 6014 stored in register V2011 is then added to "storage" register, e.g., register V2022 of CPU 6121. The sum of the two is then written out to a "comparison" register, e.g., register V2024. Then the value residing in register V2024 is compared with the current pressure in tank 6014, e.g., register V2011, as it is continually rising in value. When the actual tank pressure register, e.g., register V2011 is greater than or equal to the value in register V2024, the logic makes a coil, C260 go high. When C260 goes high, two events take place. First a counter, CT20, is incremented 1 time, and second the logic takes the new tank pressure, register V2011, adds the constant to it again, writes the sum out to register V2024, to begin the comparison process all over again, then coil C260 is set back to low and is ready for the next comparison. Up to this point in the process, nothing is time based. We simply increment a counter each time the pressure increases to the value written in register V2024. That could take up to a minute, or as little as one second, it is irrelevant at this point in the process. All we are after at this point is a counter increment each time the pressure in tank 6014 rises to or above the given amount.

At this point, time is factored into the calculation. A set of timers, e.g., timers T152 and T154, are each set to time out after 3 seconds. These timers are "Fast" timers and are preferably very precise, e.g., accurate to a hundredth of a second. As these timers alternate timing and timing out, the counter, e.g., counter CT20, is reset each 3 second interval. When counter CT20 is reset, the "accumulated" value is set back to 0. The logic monitors the "accumulated" value of counter CT20 and when it sees that value equal to or greater than 3, sets another coil, e.g., coil C263, to high. Since counter CT20 only gets reset to 0 every 3 seconds, then if the "accumulated" value of counter CT20 is greater than or equal to 3, that means that during that particular 3 second time period, the "Rate of Change" in tank pressure was at least 0.8 psi per second, which equals 2.4 psi for the 3 second time period.

As shown in the chart of FIG. 4, the higher the liquid level in tank 6014, the faster the tank pressure rise and the shorter the time becomes to well tubing/tank pressure equalization. Because of this condition, to get a true indication of Well Tubing Blow Through at the lower liquid levels in tank 6014, we have the added benefit of looking at more than just one 3 second time period to determine Well Tubing Blow Through. As shown in the chart of FIG. 4, at 0 percent liquid level in tank 6014, significant "rate of change" in tank pressure continues much past one 3 second time period. For seven, 3 second intervals after the beginning of the measurement process, the rate of change is still equal to or greater than 0.1 psi per second, and 0.3 psi in a 3 second time period. A rate of change of 0.1 psi per second, which is 1 psi in 10 seconds, is a significant rate of tank pressure change for this application. This allows the rate of change calculations to be customized for each liquid level in tank 6014 to determine very accurately when a Well Tubing Blow Through has occurred at the various tank liquid levels.

This brings us to where more than one 3 second time period is utilized (in the lower tank liquid levels) to determine a Well Tubing Blow Through condition. This is accomplished with a counter, e.g., counter CT22, that counts each time the accumulated value of counter CT20 climbs higher than 3. A "preset" value is written to counter CT22 that is equal to the number of 3 second time periods desired to require in the calculation for a particular liquid level in tank 6014. When and if the counter CT22 "counts out", or reaches its preset value, it is then determined whether or not a Well Tubing Blow Through permissive has occurred from the rate of change calculations. To write the number of 3 second time periods required in the calculation, we write a value to register V3004 according to the liquid level of tank 6014. This in turn sets the "preset value" of counter CT22 which determines the state of the permissive.

Benefits:

The application of the invention provides an ability to discharge evacuation gas from tank 6014 into well tubing 7012 and to remove fluids from well tubing 7012 via the same tap, i.e., at lower end 6056 of flow passageway 6050.

The method of the invention provides an ability to do multiple secondary run cycles to remove all liquids from well tubing 7012, and well bore 7134 during a primary run cycle.

An auto tune feature may be provided wherein times between primary run cycles are adjusted according to the liquid flow timer, i.e., the time of actual liquid flow may be noted and compared to an ideal value. If the time of liquid flow is longer than the ideal value, then the time between primary run cycles may be shortened. Alternatively, if the time of liquid flow is shorter than the ideal value, then the time between primary run cycles may be lengthened.

A blow through determination made by pressure rate of change logic may be customized by logic for each specific tank liquid level.

Figure 17:
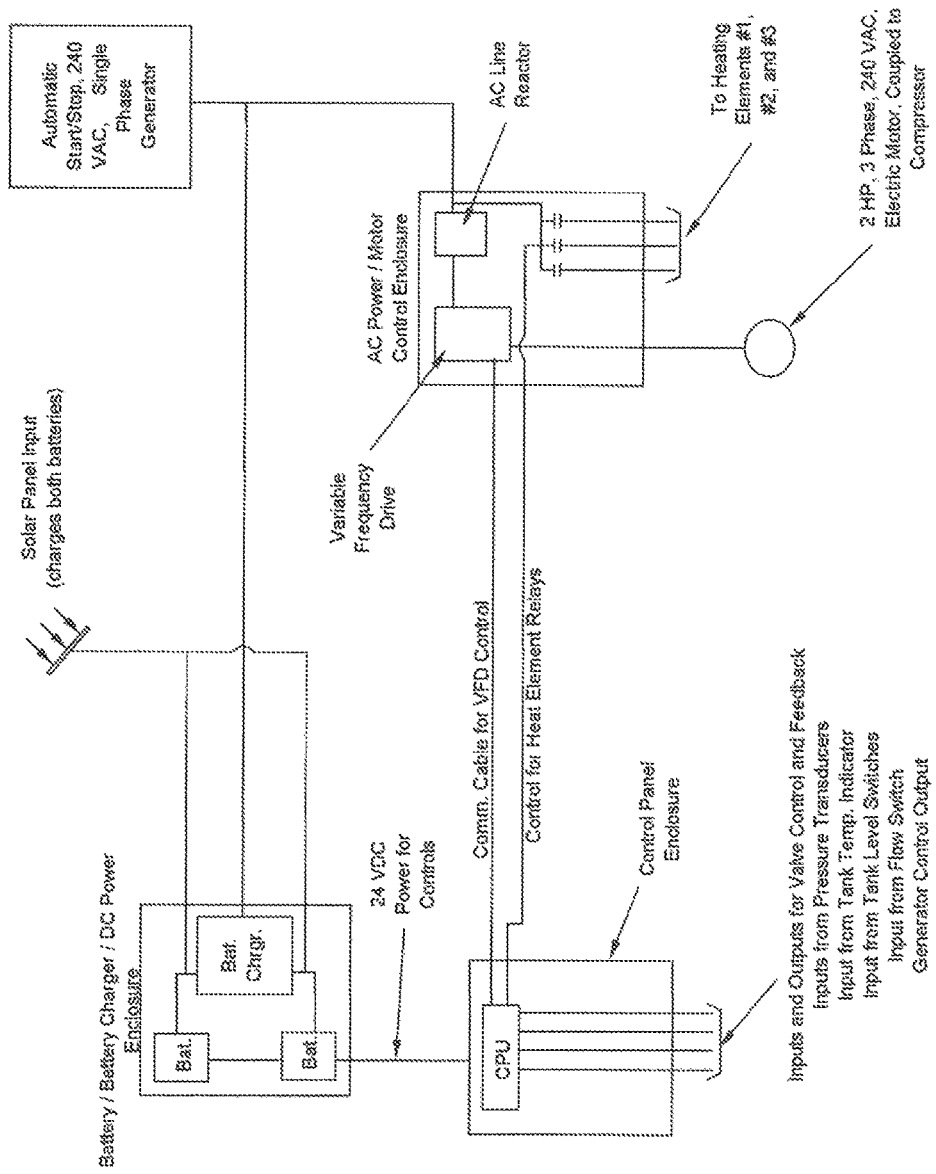
FIG. 17 is an electrical schematic of the automatic liquid evacuation system of the invention.
Figure 20B:
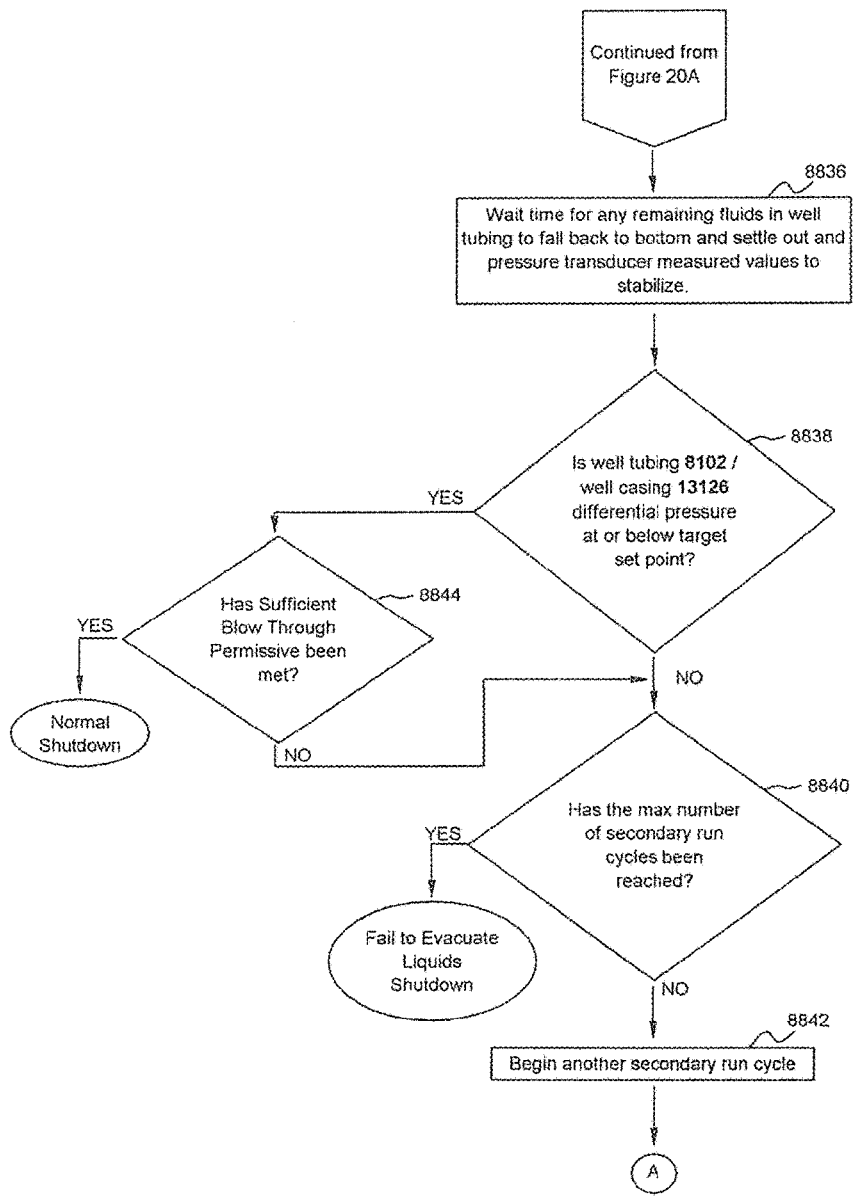
FIG. 20B is a flow diagram of the method steps that comprise a primary run cycle.

The use of tank heaters provides an ability to prevent freezing of liquids in tank 6014 and to allow emptying of liquids from tank 6014 in virtually any conditions. An example detailed schematic is shown in FIG. 17.

If liquids remain in piping or valve pressure flow assembly 6110 after a failed primary run cycle, valve 6076, valve 6080 and compressor 6040, operate in a fashion that removes all liquids from above ground assemblies and pushes the fluids back below ground or in to the tank 6014, to prevent freezing in housings and valves.

V. Automatic Liquid Evacuation System for Plunger Lift Replacement Scenario 2

Referring to FIG. 18, shown is an automatic liquid evacuation system, designated generally 9010, for evacuating liquids from a natural gas well bore 9134. Automatic liquid evacuation system 9010 includes tank 8014 for receiving and storing liquids evacuated from gas well bore 9134. Tank 8014 is provided with tank pressure transducer 8016 for measuring the pressure in tank 8014 and first temperature sensor 8018 for measuring the temperature of fluids in tank 8014. Tank stinger 8020 is provided, as a backup, to facilitate removal of liquids from tank 8014. Tank heater 8022 is provided for heating liquids in tank 8014 when first temperature sensor 8018 indicates that ambient temperature poses a freezing risk to liquids in tank 8014. In one embodiment, tank heater 8022 is comprised of a plurality of tank heater units, e.g., tank heater units 8022*a*, 8022*b*, and 8022*c*. Tank drain line 8024 is provided for draining tank 8014.

Tank gas evacuation line 8030 has first end 8032 and second end 8034. First end 8032 communicates with tank 8014.

A motor 8038, preferably a variable speed drive, powers compressor 8040. Compressor 8040 has an intake 8042 and a discharge 8044. Intake 8042 communicates with tank gas evacuation line 8030.

Flow passageway 8050 has upper end 8052, intermediate juncture 8054 and lower end 8056. In a second embodiment, flow passageway 8050 has an intermediate juncture 9058 and lower end 9060. Upper end 8052 receives gas from second end 8034 of tank gas evacuation line 8030. Lower end 8056 is in communication with gas well bore 9134 and preferably slightly lower, e.g., 6 inches, than well tubing bottom end 9138. Optional lower end 9060, is in communication with well tubing 9012. Lower end of well tubing 9138 extends to a close proximity of gas well bore bottom 9136 to allow gas flow from well bore 9134.

Liquid flow line 8070 has input end 8072 and output end 8074. Input end 8072 is in communication with intermediate juncture 8054 of flow passageway 8050. Output end 8074 is in communication with tank 8014. Liquid flow valve 8076 is located in liquid flow line 8070 for selectively opening or closing liquid flow line 8070.

Isolation valve 8080 is located on flow passageway 8050. Isolation valve 8080 is preferably located between intermediate juncture 8054 and lower end 8056 of flow passageway 8050. Isolation valve 8080 is provided for selectively isolating liquid flow line 8070 and compressor 8040 from gas well bore 9134.

In one embodiment, flow through switch 8090 located on flow passageway 8050. Flow through switch 8090 is optional. In a preferred embodiment, flow through switch 8090 has a ball 8092 that is preferably magnetized. Ball 8092 is slidingly received on a vertical shaft or stick 8093 and is capable of travel between an upper magnet switch 8094 and a lower magnet switch 8096. Magnet switches 8094, 8096 are in communication with CPU 8121 for providing an indication of the location of ball 8092. In a preferred embodiment, flow through switch is positioned at the location of intermediate juncture 8054 so that when liquids are flowing from well bore 9134 to tank 8014, ball 8092 is pushed upwards into contact with upper magnet switch 8094, indicating to CPU 8121 the presence of liquid flowing through liquid flow line 8070 and into tank 8014. Liquid is forced through the liquid flow line input end 8072, liquid flow line 8070, and liquid flow output end 8074, into tank 8014, because of the valve configuration in compressor 8040.

Well tubing pressure transducer 8102 is provided on well tubing 9012. Well tubing pressure transducer 8102 is preferably located between bottom end of well tubing 9138 and well shut in valve 9140.

Well shut in valve 9140 is provided to allow pressure to increase in well bore 9134 to aid in fluid removal from the well bore 9134.

For purposes of this application, isolation valve 8080, liquid flow valve 8076, and flow through switch 8090, comprise valve flow assembly 8110. One advantage of valve flow assembly 8110 is that it allows discharge from compressor 8040 and tank 8014, and removal of liquids from well bore 9134, through the same flow line.

Control panel 8120 is provided for receiving operator commands and for delivering operator commands to CPU 8121. CPU 8121 is provided for activating various components of system 9010, as will be explained below. Battery 8122 provides power to control panel 8120 and CPU 8121. Generator 8124 communicates with compressor 8040, tank heater 8022, and with battery 8122 for providing power as may be required.

ALES Run Cycle Steps for Plunger Lift Replacement Application 1:

Referring now to FIGS. 18-20B, in one embodiment, automatic liquid evacuation system 9010, in a gas well plunger lift replacement application, operates as follows. After an indication of a fluid buildup in the well bore 9134, which is determined when the well tubing pressure transducer 8102 and the well casing pressure transducer 9126 indicate a pressure differential at or above an operator specified value, as described in block 8800 of FIGS. 20A and 20B, if required, the well shut in valve 9140, is closed as indicated in blocks 8802 and 8804, which begins the process of increasing the gas pressure at the bottom of the well bore 9134. This is done to push liquids up from the well bore bottom 9134, as the ALES 9010, lowers gas pressure above the liquids in flow passage 8070 to facilitate liquid evacuation from the bottom of the well bore 9134.

After adequate time for gas well bottom hole pressure to increase to the operator specified set point, as indicated by well casing pressure transducer 9126 in block 8806, control panel 8120, powered by battery 8122, instructs generator 8124 to begin running as indicated by block 8808. Liquid flow valve 8076 is instructed to close as indicated in block 8810.

After a short wait time, e.g., one second after liquid flow valve 8076 is closed, isolation valve 8080 is instructed to close as indicated in block 8812.

After a short wait time, e.g., five seconds for new start and 2 seconds if already running, CPU 8121 verifies that generator 8124 is delivering power to battery 8122, as indicated in block 8814. If so, isolation valve 8080 is instructed to open, as indicated in block 8816. If no, then instructions are again issued to generator 8124, as indicated in block 8808.

After a short time, e.g., 5 seconds after isolation valve 8080 opens, compressor 8040 is instructed to start, as indicated in block 8818. Compressor 8040 will begin to lower pressure within tank 8014 via tank gas evacuation line 8030.

A tank evacuation wait time is provided for tank evacuation attained to go true. Tank evacuation wait time will vary depending on liquid level within tank 8014, speed of compressor 8040, and an operator setting of positive high differential pressure between readings provided by tank pressure transducer 8016 and well casing transducer 9126. Pressure reading from transducers 8016 and 9126 are communicated to CPU 121. In one example, the positive high differential pressure is set at 9.0 psi differential pressure but can be set to as much as 100 psi to 200 psi, or more if required. Once the positive high differential pressure set point is achieved, as indicated by block 8820, compressor 8040 is instructed to stop running, as indicated in block 8822. In one embodiment, generator 8124 is instructed to stop if the wait time in block 8806 is determined to be such that it is not feasible for generator 8124 to remain running during this wait period, as indicated in block 8824, otherwise generator 8124 remains running.

After a short wait time, e.g., 20 seconds, if well shut in valve 9140 was closed previously in block 8804, well shut in valve 9140 instructed to open, as indicated in block 8826. Liquid flow valve 8076 is instructed to open, as indicated in block 8828, which initiates a gas and liquid flow phase from well bore 9134 to tank 8014, through liquid flow line 8070, having the lower end 8056 slightly lower, e.g., 6 inches, in the gas well bore 9134 than the well tubing bottom end 9138. Flow through liquid flow line 8070 occurs due to the pressure differential between tank 8014 and well bore 9134, which is measured by monitoring tank pressure transducer 8016 and well casing pressure transducer 9126, as explained above.

During the gas and liquid flow phase, the liquids in the bottom of the well bore 9136 are forced upwards in liquid flow passage 8070 through liquid flow passage lower end 8056, due to the pressure differential created between the tank 8014 and the well bore 9134.

The gas and liquid flow phase is permitted until the pressure differential approaches equalization, as indicated in block 8830, e.g., until the pressure differential is 1.5 psi, plus a short wait time, e.g., 1 minute. The gas and liquid flow time will vary depending on a volume of liquids in well bore 9134, differential pressures achieved between tank 8014 and well bore 9134, as well as size of tank 8014 and amount of liquid in tank 8014. After a desired pressure differential is achieved plus the desired short wait time, isolation valve 8080 is instructed to close, as indicated in block 8832. Flow valve 8076 is also instructed to close, as indicated in block 8834.

Upon closure of isolation valve 8080 and flow valve 8076, a short wait time is implemented, e.g., 10 seconds. At this time a secondary run cycle is complete.

A short wait time is implemented, e.g., 6 seconds, then a decision is made between these 3 options: (1) run another cycle; (2) normal shutdown on a sufficient blow through to remove all liquids from piping, valves, and well bore; or (3) set a fail to evacuate liquids from piping, valves, and well bore alarm and shutdown. The decision is made based on the following procedure.

Wait a predetermined amount of time for any remaining liquids to settle back to bottom of well bore 9136, and well tubing pressure transducer 8102 and well casing pressure transducer 9126 measured values to stabilize, as described in block 8836.

Is well tubing 9012 and well casing 9132 gas pressure differential at or below operator specified set point as indicated by well tubing pressure transducer 8102 and well casing pressure transducer 9126 as described in block 8838.

If yes, then has a sufficient blow through permissive, as stated in block 8844, indicating all liquids have been evacuated from the piping, valves, and well bore, been met. If yes, sufficient blow through has been attained, then Normal Shutdown as indicated in block 8844. If no, sufficient blow through has not been attained, as indicated in block 8844, then has the maximum number of secondary run cycles permitted by the operator been reached, as indicated in block 8840. If yes, the maximum number of secondary run cycles has been reached, then set fail to evacuate liquids alarm and shutdown as described in block 8840. If no, the maximum number of secondary run cycles has not been reached, block 8840, then begin another Secondary Run Cycle, as indicated in block 8842. Details concerning blow through measurement and determination are described in the section entitled, "Rate of Change Compression" below.

Secondary Run Cycle begins with the closure of the well shut in valve 9140, if required by the particular well, as indicated in blocks 8802 and 8804. The cycle steps described by blocks 8802 through 8838 are repeated until either of 2 results occur: (1) normal shutdown on a sufficient blow through to remove all liquids from piping, valves, and well bore; or (2) set a fail to evacuate liquids from piping, valves, and well bore alarm and shutdown if the number of Secondary Run Cycles executed becomes equal to the maximum number of Secondary Run Cycles allowed by the operator and no positive indication of a sufficient blow through to remove all liquids from piping, valves, and well bore.

Steps if "Normal Shutdown Due to the Sufficient Blow Through Permissive Attained":

If "Normal Shutdown" is required and permitted, a short generator cool down time, e.g., 60 seconds is implemented, then generator 8124 is instructed to shut down.

Steps if "Failure to Evacuate Liquids Shutdown" is Set:

If "Failure to Evacuate Liquids Shutdown' is required, Generator 8124 is instructed to start, if not already running. Then isolation valve 8080 is instructed to open and compressor 8040 is instructed to begin running. In one embodiment, a variable speed drive is utilized to vary the compressor speed to a desired value.

A short waiting time, e.g., 15 seconds is implemented, after ball 8092 is seated on bottom flow switch 8096. During this 15 second time period, liquids are pushed into well bore 9134 from ALES 9010 piping and valves to prevent freezing.

Liquid flow valve 8076 is then opened and isolation valve 8080 is closed.

A wait time, e.g., 15 seconds is implemented to wait for liquids to be pushed back into tank 8014.

Isolation valve 8080 is then opened and liquid flow valve 8076 is then closed.

A wait time, e.g., 15 seconds is implemented to wait for liquids to be pushed back into well bore 9134.

Compressor 8040 is instructed to stop. Isolation valve 8080 is then closed. Generator 8124 is instructed to stop.

Steps of the Heat Cycle:

If a determination is made that tank 8014 requires heating, then generator 8124 is started.

Liquid flow valve 8076 is closed. After a short wait time, e.g., 1 second, isolation valve 8080 is closed. After a short wait time, e.g., 5 seconds after voltage received from generator 8124 or 1 second if generator 8124 is already running, then power is directed to one of tank heaters 8022a, 8022b, or 8022c. Each of heat circuits 8022a, 8022b, and 8022c run sequentially for a desired length of time, e.g., 5 minutes. Upon completion of the running of each of heaters 8022a, 8022b, and 8022c, a determination is made whether a pressure relief stage for tank 8014 is required.

If it has been determined that pressure relief of tank 8014 is required, e.g., if tank pressure is 3 lbs. greater than pressure in well tubing 9012, then liquid flow valve 8076 and isolation valve 8080 are opened.

A wait time is implemented to allow pressure in tank 8014 to bleed down to within 2.0 lbs. of the pressure in well bore 9134. A wait time, e.g., 2 seconds, is implemented. Then liquid flow valve 8076 and isolation valve 8080 are closed.

If it has been determined that the temperature in the tank 8014 has not reached the high temperature set point specified by the operator, another heat cycle is run, consisting of the steps described above in the "Steps of the Heat Cycle". These steps are repeated until 1 of two results occur, (1) the temp in tank 8014 reaches a predetermined set point, which results in a Normal Shutdown, described above, or (2) the temperature in tank 8014, has not reached its predetermined set point, and the number of heat cycles permitted by the operator has been reached. This results in a Temperature Control Fail alarm.

If a Temperature Control Fail alarm is set, generator 8124 is instructed to stop, and the heat functionality of the ALES 9010 is disabled. If temperature control is critical to the particular application, all ALES 9010 functionality would be disabled.

The following 5 paragraphs describe the process the ALES 9010 uses to regulate the speed of the fluid, if required, as it travels up the liquid flow line 8070 during the gas and liquid flow phase of the liquid evacuation process.

The speed of the fluid may need to be regulated during travel up the liquid flow line 8070 for successful evacuation of the liquids from the bottom of the well bore 9134.

The speed of the fluid traveling up the liquid flow line 8070, is directly related to the speed in which the tank 8014 pressure, as indicated by the tank pressure transducer 8016, increases in value. Logic is in place to accurately determine the rate in which the tank 8014 pressure increases. This logic is described below in the following paragraphs.

A tank 8014 pressure rate of change set point must be determined that ensures optimum speed of the fluid as it travels up the liquid flow line 8070. Changes in tank 8014 to well bore 9134 differential pressures, and changes in tank 8014 liquid levels may require altering the tank 8014 pressure rate of change set point, as the gas and liquid flow phase of the process proceeds, and as the fluid travels up the liquid flow line 8070.

Using existing logic to determine tank 8014 pressure rate of change, the ALES 9010, will regulate fluid speed control valve 9100, in a fashion that will maintain the tank 8014 pressure rate of change at the tank pressure rate of change set point, described above. This functionality will ensure the optimum speed of the fluid as it travels up the liquid flow line 8070.

Method of determining tank 8014 pressure rate of change: Measurements from tank pressure transducer 8016 are taken at short intervals, e.g., every second, during the gas and liquid flow phase. CPU 8121 uses these measurements to determine a rate of change in the measured pressure of the tank pressure transducer 8016.

The following 6 paragraphs describe the process the ALES 9010 uses to determine if sufficient gas blow through has occurred after a Secondary Run Cycle of the liquid evacuation process. The accurate determination of this gas blow through is necessary to ensure all liquids have been successfully evacuated from above ground piping and valves in order to prevent freezing of the liquids in piping and valve assemblies.

Measurements from tank pressure transducer 8016 are taken at short intervals, e.g., every second, during the gas and liquid flow phase. CPU 8121 uses these measurements to determine a rate of change in the measured pressure of the tank pressure transducer 8016. CPU 8121 compares this rate of change with a database of expected rates of change, e.g., when liquids are flowing in the gas and liquid flow phase, a tank 8014 pressure rate of change of 0.4 lbs./minute to 0.8 lbs./minute may be expected. However, if the measured rate of change is substantially greater, e.g., 0.1 lbs./second, then the CPU determines that fluids have been removed from well bore 9134 and that gas blow through has occurred. A rule of thumb is that an increase in pressure rate of change of 0.8 lbs./minute to 0.1 lbs./second is indicative of a gas blow through condition. If the substantially greater rate of change is not achieved during the gas and liquid flow phase, then CPU 8121 determines that gas blow through has not occurred, that fluids could still remain in piping and valve assemblies, and that a decision to run another cycle should be implemented.

Rate of Change Compression:

Referring to FIG. 4, shown is an example tank pressure rate of change profile for a 500 gallon tank. The numbers in the table of FIG. 4 are the values written to Register V2022 of CPU 8121 and they represent the number of 0.1 psi change per second in the tank pressure. The numbers are not the tank/well tubing differential pressure, rather, the number represents the pressure in tank 8014. This means that with the tank level at 22", and the starting pipeline/tank pressure differential at about 8.5 psi., the consistent, maximum rate of change in tank pressure observed in testing is 0.8 psi per second. This number becomes a constant for a particular tank size, tank liquid level, and piping configuration, and is written to a storage register, register V2022 of CPU 8121. After that, a momentary, instantaneous snapshot of the pressure in tank 8014 stored in register V2011 is then added to "storage" register, e.g., register V2022 of CPU 8121. The sum of the two is then written out to a "comparison" register, e.g., register V2024. Then the value residing in register V2024 is compared with the current pressure in tank 8014, e.g., register V2011, as it is continually rising in value. When the actual tank pressure register, e.g., register V2011 is greater than or equal to the value in register V2024, the logic makes a coil, C260 go high. When C260 goes high, two events take place. First a counter, CT20, is incremented 1 time, and second the logic takes the new tank pressure, register V2011, adds the constant to it again, writes the sum out to register V2024, to begin the comparison process all over again, then coil C260 is set back to low and is ready for the next comparison. Up to this point in the process, nothing is time based. We simply increment a counter each time the pressure increases to the value written in register V2024. That could take up to a minute, or as little as one second, it is irrelevant at this point in the process. All we are after at this point is a counter increment each time the pressure in tank 8014 rises to or above the given amount.

At this point, time is factored into the calculation. A set of timers, e.g., timers T152 and T154, are each set to time out after 3 seconds. These timers are "Fast" timers and are preferably very precise, e.g., accurate to a hundredth of a second. As these timers alternate timing and timing out, the counter, e.g., counter CT20, is reset each 3 second interval. When counter CT20 is reset, the "accumulated" value is set back to 0. The logic monitors the "accumulated" value of counter CT20 and when it sees that value equal to or greater than 3, sets another coil, e.g., coil C263, to high. Since counter CT20 only gets reset to 0 every 3 seconds, then if the "accumulated" value of counter CT20 is greater than or equal to 3, that means that during that particular 3 second time period, the "Rate of Change" in tank pressure was at least 0.8 psi per second, which equals 2.4 psi for the 3 second time period.

As shown in the chart of FIG. 4, the higher the liquid level in tank 8014, the faster the tank pressure rise and the shorter the time becomes to well tubing/tank pressure equalization. Because of this condition, to get a true indication of Well Tubing Blow Through at the lower liquid levels in tank 8014, we have the added benefit of looking at more than just one 3 second time period to determine Well Tubing Blow Through. As shown in the chart of FIG. 4, at 0 percent liquid level in tank 8014, significant "rate of change" in tank pressure continues much past one 3 second time period. For seven, 3 second intervals after the beginning of the measurement process, the rate of change is still equal to or greater than 0.1 psi per second, and 0.3 psi in a 3 second time period. A rate of change of 0.1 psi per second, which is 1 psi in 10 seconds, is a significant rate of tank pressure change for this application. This allows the rate of change calculations to be customized for each liquid level in tank 8014 to determine very accurately when a Well Tubing Blow Through has occurred at the various tank liquid levels.

This brings us to where more than one 3 second time period is utilized (in the lower tank liquid levels) to determine a Well Tubing Blow Through condition. This is accomplished with a counter, e.g., counter CT22, that counts each time the accumulated value of counter CT20 climbs higher than 3. A "preset" value is written to counter CT22 that is equal to the number of 3 second time periods desired to require in the calculation for a particular liquid level in tank 8014. When and if the counter CT22 "counts out", or reaches its preset value, it is then determined whether or not a Well Tubing Blow Through permissive has occurred from the rate of change calculations. To write the number of 3 second time periods required in the calculation, we write a value to register V3004 according to the liquid level of tank 8014. This in turn sets the "preset value" of counter CT22 which determines the state of the permissive.

Benefits:

The application of the invention provides an ability to discharge evacuation gas from tank 8014 into well bore 9134 and to remove fluids from well bore 9134 via the same passage.

The method of the invention provides an ability to do multiple secondary run cycles to remove all liquids from well bore 9134 during a primary run cycle.

An auto tune feature may be provided wherein times between primary run cycles are adjusted according to the liquid flow timer, i.e., the time of actual liquid flow may be noted and compared to an ideal value. If the time of liquid flow is longer than the ideal value, then the time between primary run cycles may be shortened. Alternatively, if the time of liquid flow is shorter than the ideal value, then the time between primary run cycles may be lengthened.

A blow through determination made by pressure rate of change logic may be customized by logic for each specific tank liquid level.

Figure 21:
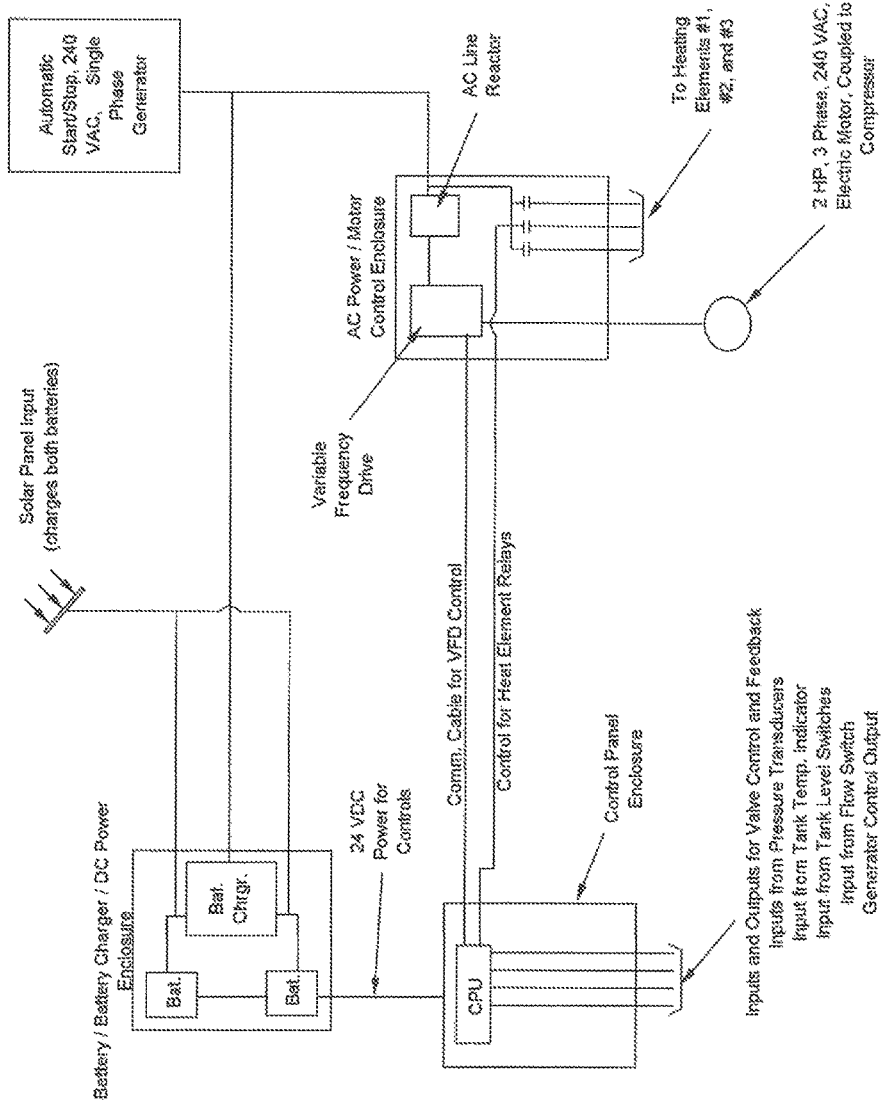
FIG. 21 is an electrical schematic of the automatic liquid evacuation system of the invention.

The use of tank heaters provides an ability to prevent freezing of liquids in tank 8014 and to allow emptying of liquids from tank 8014 in virtually any conditions. An example electrical schematic is shown in FIG. 21.

If liquids remain in piping or valve flow assembly 8110 after a failed primary run cycle, valve 8076, valve 8080 and compressor 8040, operate in a fashion that removes all liquids from above ground assemblies and pushes the fluids back below ground or in to the tank 8014, to prevent freezing in housings and valves.

VI. Automatic Liquid Evacuation System for Plunger Lift Replacement Scenario 3

Referring to FIG. 22, shown is an automatic liquid evacuation system, designated generally 11010, for evacuating liquids from a natural gas well bore 11134. Automatic liquid evacuation system 11010 includes tank 10014 for receiving and storing liquids evacuated from gas well bore 11134. Tank 10014 is provided with tank pressure transducer 10016 for measuring the pressure in tank 10014 and first temperature sensor 10018 for measuring the temperature of fluids in tank 10014. Tank stinger 10020 is provided, as a backup, to facilitate removal of liquids from tank 10014. Tank heater 10022 is provided for heating liquids in tank 10014 when first temperature sensor 10018 indicates that ambient temperature poses a freezing risk to liquids in tank 10014. In one embodiment, tank heater 10022 is comprised of a plurality of tank heater units, e.g., tank heater units 10022a, 10022b, and 10022c. Tank drain line 10024 is provided for draining tank 10014.

Tank gas evacuation line 10030 has first end 10032 and second end 10034. First end 10032 communicates with tank 10014.

A motor 10038, preferably a variable speed drive, powers compressor 10040.

Compressor 10040 has an intake 10042 and a discharge 10044. Intake 10042 communicates with tank gas evacuation line 10030.

Flow passageway 10050 has upper end 10052, intermediate juncture 10054 and lower end 10056. In a second embodiment, flow passageway 10050 has an intermediate juncture 11058 and lower end 11060. Upper end 10052 receives gas from second end 10034 of tank gas evacuation line 10030. Lower end 10056 is in communication with gas well bore 11134. Optional lower end 11060, is in communication with well tubing 11012. In this embodiment, lower end of well tubing 11138 extends to just inside well casing 11132 to allow gas flow from well bore 11134 to be accomplished via the well casing 11132. This is done to simplify the gas production process.

Liquid flow line 10070 has input end 10072 and output end 10074. Input end 10072 is in communication with intermediate juncture 10054 of flow passageway 10050. Output end 10074 is in communication with tank 10014. Liquid flow valve 10076 is located in liquid flow line 10070 for selectively opening or closing liquid flow line 10070.

Isolation valve 10080 is located on flow passageway 10050. Isolation valve 10080 is preferably located between intermediate juncture 10054 and lower end 10056 of flow passageway 10050. Isolation valve 10080 is provided for selectively isolating liquid flow line 10070 and compressor 10040 from gas well bore 11134.

In one embodiment, flow through switch 10090 located on flow passageway 10050. Flow through switch 10090 is optional. In a preferred embodiment, flow through switch 10090 has a ball 10092 that is preferably magnetized. Ball 10092 is slidingly received on a vertical shaft or stick 10093 and is capable of travel between an upper magnet switch 10094 and a lower magnet switch 10096. Magnet switches 10094, 10096 are in communication with CPU 10121 for providing an indication of the location of ball 10092. In a preferred embodiment, flow through switch is positioned at the location of intermediate juncture 10054 so that when liquids are flowing from well bore 11134 to tank 10014, ball 10092 is pushed upwards into contact with upper magnet switch 10094, indicating to CPU 10121 the presence of liquid flowing through liquid flow line 10070 and into tank 10014. Liquid is forced through the liquid flow line input end 10072, liquid flow line 10070, and liquid flow output end 10074, into tank 10014, because of the valve configuration in compressor 10040.

Well tubing pressure transducer 10102 is provided on well tubing 11012. Well tubing pressure transducer 10102 is preferably located between bottom end of well tubing 11138 and well shut in valve 11140.

Well shut in valve 11140 is provided to allow pressure to increase in well bore 11134 to aid in fluid removal from the well bore 11134.

For purposes of this application, isolation valve 10080, liquid flow valve 10076, and flow through switch 10090, comprise valve flow assembly 10110. One advantage of valve flow assembly 10110 is that it allows discharge from compressor 10040 and tank 10014, and removal of liquids from well bore 11134, through the same flow line.

Control panel 10120 is provided for receiving operator commands and for delivering operator commands to CPU 10121. CPU 10121 is provided for activating various components of system 11010, as will be explained below. Battery 10122 provides power to control panel 10120 and CPU 10121. Generator 10124 communicates with compressor 10040, tank heater 10022, and with battery 10122 for providing power as may be required.

ALES Run Cycle Steps for Plunger Lift Replacement Application 1:

Referring now to FIGS. 22-24B, in one embodiment, automatic liquid evacuation system 11010, in a gas well plunger lift replacement application, operates as follows. After an indication of a fluid buildup in the well bore 11134, if required the well shut in valve 11140, is closed as indicated in blocks 10802 and 10804 of FIG. 24, which begins the process of increasing the gas pressure at the bottom of the well bore 11134. This is done to push liquids up from the well bore bottom 11134, as the ALES 11010, lowers gas pressure above the liquids in flow passage 10070 to facilitate liquid evacuation from the bottom of the well bore 11134.

After adequate time for gas well bottom hole pressure to increase to the operator specified set point, as indicated by well casing pressure transducer 11126 in block 10806, control panel 10120, powered by battery 10122, instructs generator 10124 to begin running as indicated by block 10808. Liquid flow valve 10076 is instructed to close as indicated in block 10810.

After a short wait time, e.g., one second after liquid flow valve 10076 is closed, isolation valve 10080 is instructed to close as indicated in block 10812.

After a short wait time, e.g., five seconds for new start and 2 seconds if already running, CPU 10121 verifies that generator 10124 is delivering power to battery 10122, as indicated in block 10814. If so, isolation valve 10080 is instructed to open, as indicated in block 10816. If no, then instructions are again issued to generator 10124, as indicated in block 10808.

After a short time, e.g., 5 seconds after isolation valve 10080 opens, compressor 10040 is instructed to start, as indicated in block 10818. Compressor 10040 will begin to lower pressure within tank 10014 via tank gas evacuation line 10030.

A tank evacuation wait time is provided for tank evacuation attained to go true. Tank evacuation wait time will vary depending on liquid level within tank 10014, speed of compressor 10040, and an operator setting of positive high differential pressure between readings provided by tank pressure transducer 10016 and well casing transducer 11126. Pressure reading from transducers 10016 and 11126 are communicated to CPU 10121. In one example, the positive high differential pressure is set at 9.0 psi differential pressure but can be set to as much as 100 psi to 200 psi, or more if required. Once the positive high differential pressure set point is achieved, as indicated by block 10820, compressor 10040 is instructed to stop running, as indicated in block 10822. In one embodiment, generator 10124 is instructed to stop if the wait time in block 10806 is determined to be such that it is not feasible for generator 10124 to remain running during this wait period, as indicated in block 10824, otherwise generator 10124 remains running.

After a short wait time, e.g., 20 seconds, if well shut in valve 11140 was closed previously in block 10804, well shut in valve 11140 instructed to open, as indicated in block 10826. Liquid flow valve 10076 is instructed to open, as indicated in block 10828, which initiates a gas and liquid flow phase from well bore 11134 to tank 10014, through liquid flow line 10070. Flow through liquid flow line 10070 occurs due to the pressure differential between tank 10014 and well bore 11134, which is measured by monitoring tank pressure transducer 10016 and well casing pressure transducer 11126, as explained above.

During the gas and liquid flow phase, the liquids in the bottom of the well bore 11136 are forced upwards in liquid flow passage 10070 through liquid flow passage lower end 10056, due to the pressure differential created between the tank 10014 and the well bore 1134.

The gas and liquid flow phase is permitted until the pressure differential approaches equalization, as indicated in block 10830, e.g., until the pressure differential is 1.5 psi, plus a short wait time, e.g., 1 minute. The gas and liquid flow time will vary depending on a volume of liquids in well bore 11134, differential pressures achieved between tank 10014 and well bore 11134, as well as size of tank 10014 and amount of liquid in tank 10014. After a desired pressure differential is achieved plus the desired short wait time, isolation valve 10080 is instructed to close, as indicated in block 10832. Flow valve 10076 is also instructed to close, as indicated in block 10834.

Upon closure of isolation valve 10080 and flow valve 10076, a short wait time is implemented, e.g., 10 seconds. At this time a secondary run cycle is complete.

A short wait time is implemented, e.g., 6 seconds, then a decision is made between these 3 options: (1) run another cycle; (2) normal shutdown on a sufficient blow through to remove all liquids from piping, valves, and well bore; or (3) set a fail to evacuate liquids from piping, valves, and well bore alarm and shutdown. The decision is made based on the following procedure.

Wait a predetermined amount of time for any remaining liquids to settle back to bottom of well bore 11136, and well tubing pressure transducer 10102 and well casing pressure transducer 11126 measured values to stabilize, as described in block 10836.

Is well tubing 11012 and well casing 11132 gas pressure differential at or below operator specified set point as indicated by well tubing pressure transducer 10102 and well casing pressure transducer 11126 as described in block 10838.

If yes, then has a sufficient blow through permissive, as stated in block 10844, indicating all liquids have been evacuated from the piping, valves, and well bore, been met. If yes, sufficient blow through has been attained, then Normal Shutdown as indicated in block 10844. If no, sufficient blow through has not been attained, as indicated in block 10844, then has the maximum number of secondary run cycles permitted by the operator been reached, as indicated in block 10840. If yes, the maximum number of secondary run cycles has been reached, then set fail to evacuate liquids alarm and shutdown as described in block 10840. If no, the maximum number of secondary run cycles has not been reached, block 10840, then begin another Secondary Run Cycle, as indicated in block 10842. Details concerning blow through measurement and determination are described in the section entitled, "Rate of Change Compression" below.

Secondary Run Cycle begins with the closure of the well shut in valve 11140, if required by the particular well, as indicated in blocks 10802 and 10804. The cycle steps described by blocks 10802 through 10838 are repeated until either of 2 results occur: (1) normal shutdown on a sufficient blow through to remove all liquids from piping, valves, and well bore; or (2) set a fail to evacuate liquids from piping, valves, and well bore alarm and shutdown if the number of Secondary Run Cycles executed becomes equal to the maximum number of Secondary Run Cycles allowed by the operator and no positive indication of a sufficient blow through to remove all liquids from piping, valves, and well bore.

Steps if "Normal Shutdown Due to the Sufficient Blow Through Permissive Attained":

If "Normal Shutdown" is required and permitted, a short generator cool down time, e.g., 60 seconds is implemented, then generator 10124 is instructed to shut down.

Steps if "Failure to Evacuate Liquids Shutdown" is Set:

If "Failure to Evacuate Liquids Shutdown' is required, Generator 10124 is instructed to start, if not already running. Then isolation valve 10080 is instructed to open and compressor 10040 is instructed to begin running. In one embodiment, a variable speed drive is utilized to vary the compressor speed to a desired value.

A short waiting time, e.g., 15 seconds is implemented, after ball 10092 is seated on bottom flow switch 10096. During this 15 second time period, liquids are pushed into well bore 11134 from ALES 11010 piping and valves to prevent freezing.

Liquid flow valve 10076 is then opened and isolation valve 10080 is closed.

A wait time, e.g., 15 seconds is implemented to wait for liquids to be pushed back into tank 10014.

Isolation valve 10080 is then opened and liquid flow valve 10076 is then closed.

A wait time, e.g., 15 seconds is implemented to wait for liquids to be pushed back into well bore 11134.

Compressor 10040 is instructed to stop. Isolation valve 10080 is then closed. Generator 10124 is instructed to stop.

Steps of the Heat Cycle:

If a determination is made that tank 10014 requires heating, then generator 10124 is started.

Liquid flow valve 10076 is closed. After a short wait time, e.g., 1 second, isolation valve 10080 is closed. After a short wait time, e.g., 5 seconds after voltage received from generator 10124 or 1 second if generator 10124 is already running, then power is directed to one of tank heaters 10022a, 10022b, or 10022c. Each of heat circuits 10022a, 10022b, and 10022c run sequentially for a desired length of time, e.g., 5 minutes. Upon completion of the running of each of heaters 10022a, 10022b, and 10022c, a determination is made whether a pressure relief stage for tank 10014 is required.

If it has been determined that pressure relief of tank 10014 is required, e.g., if tank pressure is 3 lbs. greater than pressure in well tubing 11012, then liquid flow valve 10076 and isolation valve 10080 are opened.

A wait time is implemented to allow pressure in tank 10014 to bleed down to within 2.0 lbs. of the pressure in well bore 11134. A wait time, e.g., 2 seconds, is implemented. Then liquid flow valve 10076 and isolation valve 10080 are closed.

If it has been determined that the temperature in the tank 10014 has not reached the high temperature set point specified by the operator, another heat cycle is run, consisting of the steps described above in the "Steps of the Heat Cycle". These steps are repeated until 1 of two results occur, (1) the temp in tank 10014 reaches a predetermined set point, which results in a Normal Shutdown, described above, or (2) the temperature in tank 10014, has not reached its predetermined set point, and the number of heat cycles permitted by the operator has been reached. This results in a Temperature Control Fail alarm.

If a Temperature Control Fail alarm is set, generator 10124 is instructed to stop, and the heat functionality of the ALES 11010 is disabled. If temperature control is critical to the particular application, all ALES 11010 functionality would be disabled.

The following 5 paragraphs describe the process the ALES 11010 uses to regulate the speed of the fluid, if required, as it travels up the liquid flow line 10070 during the gas and liquid flow phase of the liquid evacuation process.

The speed of the fluid may need to be regulated during travel up the liquid flow line 10070 for successful evacuation of the liquids from the bottom of the well bore 11134.

The speed of the fluid traveling up the liquid flow line 10070, is directly related to the speed in which the tank 10014 pressure, as indicated by the tank pressure transducer 10016, increases in value. Logic is in place to accurately determine the rate in which the tank 10014 pressure increases. This logic is described below in the following paragraphs.

A tank 10014 pressure rate of change set point must be determined that ensures optimum speed of the fluid as it travels up the liquid flow line 10070. Changes in tank 10014 to well bore 11134 differential pressures, and changes in tank 10014 liquid levels may require altering the tank 10014 pressure rate of change set point, as the gas and liquid flow phase of the process proceeds, and as the fluid travels up the liquid flow line 10070.

Using existing logic to determine tank 10014 pressure rate of change, the ALES 11010, will regulate fluid speed control valve 11100, in a fashion that will maintain the tank 10014 pressure rate of change at the tank pressure rate of change set point, described above. This functionality will ensure the optimum speed of the fluid as it travels up the liquid flow line 10070.

Method of determining tank 10014 pressure rate of change: Measurements from tank pressure transducer 10016 are taken at short intervals, e.g., every second, during the gas and liquid flow phase. CPU 10121 uses these measurements to determine a rate of change in the measured pressure of the tank pressure transducer 10016.

The following 6 paragraphs describe the process the ALES 1010 uses to determine if sufficient gas blow through has occurred after a Secondary Run Cycle of the liquid evacuation process. The accurate determination of this gas blow through is necessary to ensure all liquids have been successfully evacuated from above ground piping and valves in order to prevent freezing of the liquids in piping and valve assemblies.

Measurements from tank pressure transducer 10016 are taken at short intervals, e.g., every second, during the gas and liquid flow phase. CPU 100121 uses these measurements to determine a rate of change in the measured pressure of the tank pressure transducer 10016. CPU 10121 compares this rate of change with a database of expected rates of change, e.g., when liquids are flowing in the gas and liquid flow phase, a tank 10014 pressure rate of change of 0.4 lbs./minute to 0.8 lbs./minute may be expected. However, if the measured rate of change is substantially greater, e.g., 0.1 lbs./second, then the CPU determines that fluids have been removed from well bore 11134 and that gas blow through has occurred. A rule of thumb is that an increase in pressure rate of change of 0.8 lbs./minute to 0.1 lbs./second is indicative of a gas blow through condition. If the substantially greater rate of change is not achieved during the gas and liquid flow phase, then CPU 10121 determines that gas blow through has not occurred, that fluids could still remain in piping and valve assemblies, and that a decision to run another cycle should be implemented.

Rate of Change Compression:

Referring to FIG. 4, shown is an example tank pressure rate of change profile for a 500 gallon tank. The numbers in the table of FIG. 4 are the values written to Register V2022 of CPU 10121 and they represent the number of 0.1 psi change per second in the tank pressure. The numbers are not the tank/well tubing differential pressure, rather, the number represents the pressure in tank 10014. This means that with the tank level at 22", and the starting pipeline/tank pressure differential at about 8.5 psi., the consistent, maximum rate of change in tank pressure observed in testing is 0.8 psi per second. This number becomes a constant for a particular tank size, tank liquid level, and piping configuration, and is written to a storage register, register V2022 of CPU 10121. After that, a momentary, instantaneous snapshot of the pressure in tank 10014 stored in register V2011 is then added to "storage" register, e.g., register V2022 of CPU 10121. The sum of the two is then written out to a "comparison" register, e.g., register V2024. Then the value residing in register V2024 is compared with the current pressure in tank 10014, e.g., register V2011, as it is continually rising in value. When the actual tank pressure register, e.g., register V2011 is greater than or equal to the value in register V2024, the logic makes a coil, C260 go high. When C260 goes high, two events take place. First a counter, CT20, is incremented 1 time, and second the logic takes the new tank pressure, register V2011, adds the constant to it again, writes the sum out to register V2024, to begin the comparison process all over again, then coil C260 is set back to low and is ready for the next comparison. Up to this point in the process, nothing is time based. We simply increment a counter each time the pressure increases to the value written in register V2024. That could take up to a minute, or as little as one second, it is irrelevant at this point in the process. All we are after at this point is a counter increment each time the pressure in tank 10014 rises to or above the given amount.

At this point, time is factored into the calculation. A set of timers, e.g., timers T152 and T154, are each set to time out after 3 seconds. These timers are "Fast" timers and are preferably very precise, e.g., accurate to a hundredth of a second. As these timers alternate timing and timing out, the counter, e.g., counter CT20, is reset each 3 second interval. When counter CT20 is reset, the "accumulated" value is set back to 0. The logic monitors the "accumulated" value of counter CT20 and when it sees that value equal to or greater than 3, sets another coil, e.g., coil C263, to high. Since counter CT20 only gets reset to 0 every 3 seconds, then if the "accumulated" value of counter CT20 is greater than or equal to 3, that means that during that particular 3 second time period, the "Rate of Change" in tank pressure was at least 0.8 psi per second, which equals 2.4 psi for the 3 second time period.

As shown in the chart of FIG. 4, the higher the liquid level in tank 10014, the faster the tank pressure rise and the shorter the time becomes to well bore/tank pressure equalization. Because of this condition, to get a true indication of Well Bore Blow Through at the lower liquid levels in tank 10014, we have the added benefit of looking at more than just one 3 second time period to determine Well Bore Blow Through. As shown in the chart of FIG. 4, at 0 percent liquid level in tank 10014, significant "rate of change" in tank pressure continues much past one 3 second time period. For seven, 3 second intervals after the beginning of the measurement process, the rate of change is still equal to or greater than 0.1 psi per second, and 0.3 psi in a 3 second time period. A rate of change of 0.1 psi per second, which is 1 psi in 10 seconds, is a significant rate of tank pressure change for this application. This allows the rate of change calculations to be customized for each liquid level in tank 10014 to determine very accurately when a Well Bore Blow Through has occurred at the various tank liquid levels.

This brings us to where more than one 3 second time period is utilized (in the lower tank liquid levels) to determine a Well Bore Blow Through condition. This is accomplished with a counter, e.g., counter CT22, that counts each time the accumulated value of counter CT20 climbs higher than 3. A "preset" value is written to counter CT22 that is equal to the number of 3 second time periods desired to require in the calculation for a particular liquid level in tank 10014. When and if the counter CT22 "counts out", or reaches its preset value, it is then determined whether or not a Well Bore Blow Through permissive has occurred from the rate of change calculations. To write the number of 3 second time periods required in the calculation, we write a value to register V3004 according to the liquid level of tank 10014.

This in turn sets the "preset value" of counter CT22 which determines the state of the permissive.

Benefits:

The application of the invention provides an ability to discharge evacuation gas from tank 10014 into well bore 11134 and to remove fluids from well bore 11134 via the same passage.

The method of the invention provides an ability to do multiple secondary run cycles to remove all liquids from well bore 11134 during a primary run cycle.

An auto tune feature may be provided wherein times between primary run cycles are adjusted according to the liquid flow timer, i.e., the time of actual liquid flow may be noted and compared to an ideal value. If the time of liquid flow is longer than the ideal value, then the time between primary run cycles may be shortened. Alternatively, if the time of liquid flow is shorter than the ideal value, then the time between primary run cycles may be lengthened.

A blow through determination made by pressure rate of change logic may be customized by logic for each specific tank liquid level.

Figure 25:
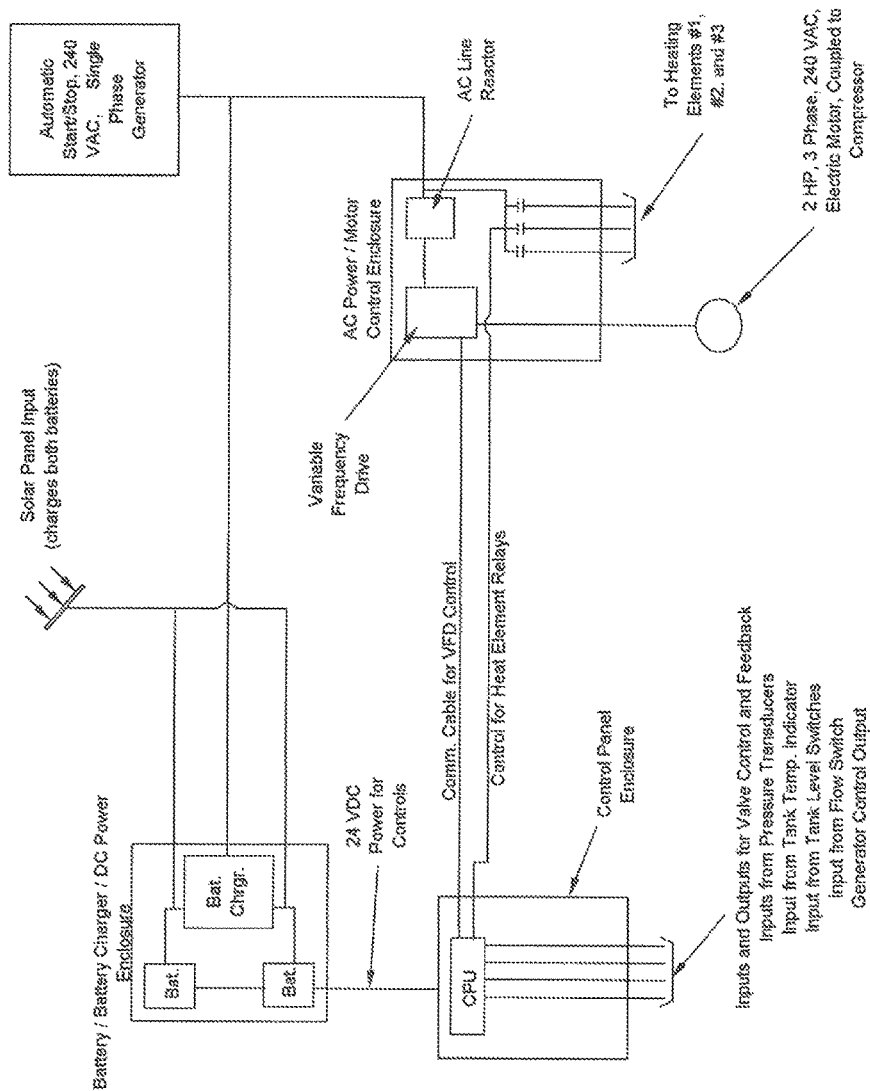
FIG. 25 is an electrical schematic of the automatic liquid evacuation system of the invention.

The use of tank heaters provides an ability to prevent freezing of liquids in tank 10014 and to allow emptying of liquids from tank 10014 in virtually any conditions. An example electrical schematic is shown in FIG. 25.

If liquids remain in piping or valve flow assembly 10010 after a failed primary run cycle, valve 10076, valve 10080 and compressor 10040, operate in a fashion that removes all liquids from above ground assemblies and pushes the fluids back below ground or in to the tank 10014, to prevent freezing in housings and valves.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. An automatic liquid evacuation system for evacuating liquids from a pipe, said system comprising:
   a tank for receiving liquids;
   a first pressure transducer for measuring pressure in said tank;
   a tank gas evacuation line having a first end and a second end, said first end in communication with said tank;
   a compressor in communication with said tank gas evacuation line, said compressor for removing gas from said tank;
   a flow passageway having an upper end, an intermediate juncture and a lower end, said upper end for receiving gas from said second end of said tank gas evacuation line, said lower end in communication with said pipe;
   a siphon in communication with said lower end of said flow passageway, said siphon extending into the pipe for evacuating liquids from said pipe;
   a liquid flow line having an input end and an output end, said input end in communication with said intermediate juncture of said flow passageway and said output end in communication with said tank;
   a flow valve in said liquid flow line for selectively opening or closing said liquid flow line;
   an isolation valve on said flow passageway, said isolation valve between said intermediate juncture and said lower end, said isolation valve for selectively closing said flow passageway;
   a drip valve on said flow passageway, said drip valve between said isolation valve and said lower end of said flow passageway, said drip valve for selectively closing said flow passageway to said siphon;
   a pipe pressure transducer on said flow passageway between said isolation valve and said pipe;
   wherein said drip valve, said pipe pressure transducer, said isolation valve, and said flow valve comprise a valve pressure flow assembly;
   a processer in communication with said first pressure transducer and said pipe pressure transducer for comparing tank pressure readings taken at time intervals for calculating a rate of change of said pressure readings.

2. The system according to claim 1 wherein said pipe is a gas pipeline.

3. The system according to claim 1 wherein said pipe is a gas well bore.

4. The system according to claim 1 further comprising:
   a temperature sensor on said tank for measuring the temperature of liquids in said tank.

5. The system according to claim 1 further comprising:
   a tank stinger extending into said tank for backup removal of liquids from said tank.

6. The system according to claim 1 further comprising:
   a tank heater for heating tank liquids when ambient temperature poses a freezing risk to liquids in said tank.

7. The system according to claim 6 wherein:
   said tank heater is comprised of a plurality of tank heaters.

8. The system according to claim 1 further comprising:
   a generator for providing electrical power to said compressor.

9. The system according to claim 1 wherein:
   said compressor removes said gas from said tank and passes said gas through said compressor as compressor discharge;
   in a first system configuration, said lower end of said flow passageway passes said compressor discharge into said pipe for preventing an escape of said gas into the atmosphere;
   in a second system configuration, said lower end of said flow passageway receives evacuated liquids from said pipe through said siphon;
   whereby said lower end of said first passageway delivers gas to said pipe and transports liquids out of said pipe, thereby facilitating a single tap into said pipe.

* * * * *